US011151992B2

(12) United States Patent
Cui et al.

(10) Patent No.: US 11,151,992 B2
(45) Date of Patent: Oct. 19, 2021

(54) CONTEXT AWARE INTERACTIVE ROBOT

(71) Applicant: AIBrain Corporation, Seoul (KR)

(72) Inventors: Run Cui, Seoul (KR); Won Taek Chung, Seoul (KR); Hye Jun Yu, Seoul (KR); Hong Shik Shinn, Seoul (KR)

(73) Assignee: AIBrain Corporation

( * ) Notice: Subject to any disclaimer, the term of this patent is extended or adjusted under 35 U.S.C. 154(b) by 177 days.

(21) Appl. No.: 16/227,474

(22) Filed: Dec. 20, 2018

(65) Prior Publication Data

US 2019/0206400 A1    Jul. 4, 2019

Related U.S. Application Data

(63) Continuation-in-part of application No. 15/946,646, filed on Apr. 5, 2018, now Pat. No. 10,810,371.
(Continued)

(51) Int. Cl.
*B25J 9/16*    (2006.01)
*B25J 11/00*    (2006.01)
(Continued)

(52) U.S. Cl.
CPC .............. *G10L 15/22* (2013.01); *B25J 9/163* (2013.01); *B25J 9/1697* (2013.01); *B25J 11/0005* (2013.01); *B25J 13/003* (2013.01); *G05D 1/0016* (2013.01); *G05D 1/0231* (2013.01); *G05D 1/0274* (2013.01); *G06K 9/00228* (2013.01); *G06K 9/00664* (2013.01);
(Continued)

(58) Field of Classification Search
CPC . G05D 1/0274; G10L 15/22; G10L 2015/223; B25J 9/1697; G06K 9/00664; G06K 9/00228
See application file for complete search history.

(56) References Cited

U.S. PATENT DOCUMENTS 4,638,445 A    1/1987 Mattaboni
4,815,005 A    3/1989 Oyanagi
(Continued)

OTHER PUBLICATIONS

Agichtein et al., Learning Search Engine Specific Query Transformations for Question Answering, 10th International World Wide Web Conference, World Academy of Science, Engineering and Technology, 2001, pp. 169-178.
(Continued)

*Primary Examiner* — Daniel C Washburn
*Assistant Examiner* — Oluwadamilola M Ogunbiyi
(74) *Attorney, Agent, or Firm* — Van Pelt, Yi & James LLP

(57) ABSTRACT

A plurality of images captured using a camera included in a robotic system are analyzed. A spatial map is generated using a sensor included in the robotic system. A semantic location map is generated using at least the analyzed plurality of captured images and the generated spatial map. A natural language input referencing a desired product item is received from a user. A speech recognition result is recognized from the natural language input and sent to a reasoning engine. In response to sending the recognized speech recognition result, one or more commands for the robotic system are received from the reasoning engine. The received one or more commands are performed and feedback to the user based on at least one of the one or more commands is provided.

20 Claims, 42 Drawing Sheets

Related U.S. Application Data

(60) Provisional application No. 62/609,237, filed on Dec. 21, 2017, provisional application No. 62/482,631, filed on Apr. 6, 2017.

(51) Int. Cl.

| | | |
|---|---|---|
| *B25J 13/00* | (2006.01) | |
| *G05D 1/00* | (2006.01) | |
| *G05D 1/02* | (2020.01) | |
| *G06K 9/00* | (2006.01) | |
| *G10L 15/18* | (2013.01) | |
| *G10L 15/22* | (2006.01) | |

(52) U.S. Cl.
CPC ...... *G06K 9/00832* (2013.01); *G10L 15/1815* (2013.01); *G10L 2015/223* (2013.01)

(56) References Cited

U.S. PATENT DOCUMENTS

| | | |
|---|---|---|
| 5,581,664 A | 12/1996 | Allen |
| 5,761,717 A | 6/1998 | Vishlitzky |
| 5,875,331 A | 2/1999 | Lindsey |
| 6,542,242 B1* | 4/2003 | Yost ............... G01N 21/3504 356/438 |
| 6,859,931 B1 | 2/2005 | Cheyer |
| 7,386,449 B2 | 6/2008 | Sun |
| 7,426,500 B2 | 9/2008 | Dragojlovic |
| 7,545,965 B2 | 6/2009 | Suzuki |
| 7,925,605 B1 | 4/2011 | Rubin |
| 8,073,804 B1 | 12/2011 | Rubin |
| 8,365,138 B2 | 1/2013 | Iborra |
| 8,392,921 B2 | 3/2013 | Song |
| 8,495,002 B2 | 7/2013 | Nelken |
| 8,924,011 B2 | 12/2014 | Park |
| 9,239,382 B2* | 1/2016 | Paglieroni ............. G01S 13/885 |
| 9,261,978 B2* | 2/2016 | Liberty ............ H04N 21/42222 |
| 9,373,086 B1 | 6/2016 | Allen |
| 9,380,017 B2 | 6/2016 | Gelfenbeyn |
| 9,424,523 B2 | 8/2016 | Koll |
| 9,471,668 B1 | 10/2016 | Alupului |
| 9,555,326 B2 | 1/2017 | Scott |
| 9,564,149 B2 | 2/2017 | Gelfenbeyn |
| 9,568,909 B2 | 2/2017 | Lawson |
| 9,569,425 B2 | 2/2017 | Jackson |
| 9,659,052 B1 | 5/2017 | Glennon |
| 9,747,901 B1 | 8/2017 | Gentry |
| 9,792,434 B1* | 10/2017 | Li ...................... G06F 21/577 |
| 9,801,517 B2 | 10/2017 | High |
| 10,068,031 B2 | 9/2018 | Moore |
| 10,297,253 B2 | 5/2019 | Walker, II |
| 10,318,907 B1* | 6/2019 | Bergstrom ........ G06Q 10/0637 |
| 10,341,304 B1 | 7/2019 | Boutros |
| 10,395,173 B1 | 8/2019 | Heidenreich |
| 10,410,328 B1* | 9/2019 | Liu ................... H04N 5/23229 |
| 10,418,032 B1 | 9/2019 | Mohajer |
| 10,432,789 B2* | 10/2019 | Winter .................. G06F 40/30 |
| 10,453,117 B1 | 10/2019 | Reavely |
| 10,514,776 B2* | 12/2019 | Liberty ................. G06F 1/3215 |
| 10,613,527 B2 | 4/2020 | D'Andrea |
| 2003/0130827 A1 | 7/2003 | Bentzien |
| 2004/0013295 A1 | 1/2004 | Sabe |
| 2004/0044657 A1 | 3/2004 | Lee |
| 2004/0182614 A1 | 9/2004 | Wakui |
| 2004/0193322 A1 | 9/2004 | Pirjanian |
| 2004/0228456 A1* | 11/2004 | Glynn ................. G06Q 10/087 379/88.01 |
| 2005/0005266 A1 | 1/2005 | Datig |
| 2005/0028133 A1 | 2/2005 | Ananth |
| 2005/0058066 A1 | 3/2005 | Sung |
| 2005/0096790 A1* | 5/2005 | Tamura ................. G06N 3/008 700/245 |
| 2005/0165508 A1 | 7/2005 | Kanda |
| 2005/0256882 A1 | 11/2005 | Able |
| 2005/0262130 A1 | 11/2005 | Mohan |
| 2006/0041722 A1 | 2/2006 | Hakura |
| 2006/0072738 A1 | 4/2006 | Louis |
| 2006/0080382 A1 | 4/2006 | Dutta |
| 2006/0150119 A1 | 7/2006 | Chesnais |
| 2006/0195407 A1 | 8/2006 | Athelogou |
| 2007/0070069 A1* | 3/2007 | Samarasekera ....... G06F 16/748 345/427 |
| 2007/0192910 A1* | 8/2007 | Vu ........................ G05D 1/0274 700/245 |
| 2007/0200920 A1 | 8/2007 | Walker |
| 2007/0294337 A1* | 12/2007 | Gaos ...................... H04L 67/14 709/203 |
| 2008/0015418 A1 | 1/2008 | Jarrell |
| 2008/0133052 A1 | 6/2008 | Jones |
| 2008/0177683 A1 | 7/2008 | No |
| 2008/0222077 A1 | 9/2008 | Duan |
| 2008/0243305 A1 | 10/2008 | Lee ...................... G05D 1/0297 700/246 |
| 2009/0019058 A1 | 1/2009 | Jung |
| 2009/0063373 A1* | 3/2009 | Howard ................ A63F 13/822 706/11 |
| 2009/0148034 A1 | 6/2009 | Higaki |
| 2009/0175545 A1 | 7/2009 | Cancedda |
| 2009/0192968 A1 | 7/2009 | Tunstall-Pedoe |
| 2010/0013153 A1 | 1/2010 | Yourlo |
| 2010/0036802 A1 | 2/2010 | Tsuruta |
| 2010/0082513 A1 | 4/2010 | Liu |
| 2010/0211340 A1 | 8/2010 | Lowenthal |
| 2010/0222957 A1 | 9/2010 | Ohta |
| 2011/0010013 A1 | 1/2011 | Ruan |
| 2011/0054689 A1 | 3/2011 | Nielsen |
| 2011/0090787 A1 | 4/2011 | Smith |
| 2011/0106436 A1* | 5/2011 | Bill ...................... G01C 21/3492 701/467 |
| 2011/0224828 A1 | 9/2011 | Breznak |
| 2011/0288684 A1 | 11/2011 | Farlow |
| 2011/0307435 A1 | 12/2011 | Overell |
| 2012/0010900 A1 | 1/2012 | Kaniadakis |
| 2012/0016678 A1* | 1/2012 | Gruber ................... G10L 13/08 704/275 |
| 2012/0095619 A1 | 4/2012 | Pack |
| 2012/0117005 A1 | 5/2012 | Spivack |
| 2012/0130270 A1* | 5/2012 | Imamura ............... A61B 3/12 600/558 |
| 2012/0233152 A1 | 9/2012 | Vanderwende |
| 2012/0238366 A1 | 9/2012 | Tedder |
| 2013/0086105 A1* | 4/2013 | Hammontree ........ G06F 16/248 707/769 |
| 2013/0103195 A1 | 4/2013 | Anhalt |
| 2013/0110764 A1 | 5/2013 | Wilf |
| 2013/0138425 A1 | 5/2013 | Luke |
| 2013/0188886 A1* | 7/2013 | Petrou ..................... G06K 9/228 382/305 |
| 2013/0246430 A1 | 9/2013 | Szucs |
| 2013/0253977 A1 | 9/2013 | Vibhor |
| 2013/0289984 A1 | 10/2013 | Hakkani-Tur |
| 2013/0337916 A1 | 12/2013 | Saretto |
| 2014/0046891 A1* | 2/2014 | Banas ..................... G06N 5/022 706/46 |
| 2014/0070947 A1 | 3/2014 | Ionson |
| 2014/0075004 A1 | 3/2014 | Van Dusen |
| 2014/0100012 A1 | 4/2014 | Miller |
| 2014/0108303 A1 | 4/2014 | Cheyer |
| 2014/0132767 A1 | 5/2014 | Sonnabend |
| 2014/0164533 A1 | 6/2014 | Lynch |
| 2014/0223408 A1 | 8/2014 | Wunderlich, Jr. |
| 2014/0279807 A1 | 9/2014 | Dimitrijevic |
| 2014/0279971 A1 | 9/2014 | Bobick |
| 2014/0280210 A1 | 9/2014 | Ritchie |
| 2014/0281909 A1* | 9/2014 | Pinto ....................... G06F 16/958 715/234 |
| 2014/0298358 A1* | 10/2014 | Tian ...................... G06Q 10/1093 719/318 |
| 2014/0316570 A1* | 10/2014 | Sun ......................... B25J 11/0005 700/255 |
| 2014/0324747 A1* | 10/2014 | Crowder ................. G06N 3/086 706/18 |
| 2015/0025708 A1 | 1/2015 | Anderson |

(56) References Cited

U.S. PATENT DOCUMENTS

| | | |
|---|---|---|
| 2015/0032254 A1 | 1/2015 | Ishiguro |
| 2015/0046181 A1 | 2/2015 | Adjaoute |
| 2015/0066520 A1 | 3/2015 | Leon |
| 2015/0066836 A1 | 3/2015 | Midmore |
| 2015/0089515 A1 | 3/2015 | Bondada |
| 2015/0106308 A1 | 4/2015 | Harrison |
| 2015/0142704 A1 | 5/2015 | London |
| 2015/0168954 A1 | 6/2015 | Hickerson |
| 2015/0193186 A1 | 7/2015 | Lee |
| 2015/0197007 A1 | 7/2015 | Pack |
| 2015/0248525 A1 | 9/2015 | Ury |
| 2015/0269139 A1 | 9/2015 | McAteer |
| 2015/0279348 A1 | 10/2015 | Cao |
| 2015/0285644 A1 | 10/2015 | Pfaff |
| 2015/0290795 A1 | 10/2015 | Oleynik |
| 2015/0310446 A1 | 10/2015 | Tuchman |
| 2015/0326832 A1 | 11/2015 | Zhang |
| 2015/0356144 A1 | 12/2015 | Chawla |
| 2015/0378984 A1 | 12/2015 | Ateya |
| 2016/0004826 A1 | 1/2016 | Van Arkel |
| 2016/0062882 A1 | 3/2016 | Bonwick |
| 2016/0068267 A1 | 3/2016 | Liu |
| 2016/0103653 A1 | 4/2016 | Jang |
| 2016/0110422 A1 | 4/2016 | Roytman |
| 2016/0117593 A1* | 4/2016 | London ............... G10L 15/1822 706/11 |
| 2016/0132789 A1 | 5/2016 | Flinn |
| 2016/0167226 A1 | 6/2016 | Schnittman |
| 2016/0170742 A1 | 6/2016 | Pallath |
| 2016/0188595 A1 | 6/2016 | Chen |
| 2016/0189035 A1 | 6/2016 | Shakeri |
| 2016/0255969 A1 | 9/2016 | High |
| 2016/0261771 A1 | 9/2016 | Fujii |
| 2016/0271795 A1 | 9/2016 | Vicenti |
| 2016/0275941 A1* | 9/2016 | Bellegarda ............... G06F 3/023 |
| 2016/0303738 A1 | 10/2016 | Laurent |
| 2016/0350685 A1 | 12/2016 | Helbing |
| 2016/0350930 A1* | 12/2016 | Lin ....................... G06K 9/4628 |
| 2016/0378586 A1* | 12/2016 | Cocagne ................. G06F 3/067 714/57 |
| 2016/0378752 A1 | 12/2016 | Anderson |
| 2016/0379092 A1* | 12/2016 | Kutliroff ............ G06K 9/00664 382/158 |
| 2016/0379106 A1 | 12/2016 | Qi |
| 2016/0379120 A1 | 12/2016 | Merdivan |
| 2016/0379121 A1 | 12/2016 | Ge |
| 2017/0004199 A1 | 1/2017 | Häusler et al. |
| 2017/0010830 A1 | 1/2017 | Ishikawa |
| 2017/0017838 A1 | 1/2017 | Biswas |
| 2017/0024392 A1 | 1/2017 | Shah |
| 2017/0038846 A1* | 2/2017 | Minnen ................. G06F 3/1423 |
| 2017/0052905 A1 | 2/2017 | Lin |
| 2017/0061302 A1 | 3/2017 | Subasi |
| 2017/0078224 A1 | 3/2017 | Chander |
| 2017/0099200 A1 | 4/2017 | Ellenbogen |
| 2017/0109355 A1 | 4/2017 | Li |
| 2017/0116187 A1 | 4/2017 | Erickson |
| 2017/0212681 A1* | 7/2017 | Narubin ................. G06N 3/002 |
| 2017/0250930 A1 | 8/2017 | Ben-Itzhak |
| 2017/0255884 A1 | 9/2017 | Visvanathan |
| 2017/0277619 A1 | 9/2017 | Liu |
| 2017/0278110 A1 | 9/2017 | Ezry |
| 2017/0293610 A1 | 10/2017 | Tran |
| 2017/0297588 A1 | 10/2017 | Doshi |
| 2017/0307391 A1* | 10/2017 | Mason ............... G06Q 10/0833 |
| 2017/0308521 A1 | 10/2017 | Bruno |
| 2017/0311863 A1 | 11/2017 | Matsunaga |
| 2017/0318919 A1 | 11/2017 | Gharabegian |
| 2017/0323285 A1 | 11/2017 | Xing |
| 2017/0323356 A1 | 11/2017 | Gharabegian |
| 2017/0330106 A1 | 11/2017 | Lindsley |
| 2017/0337620 A1 | 11/2017 | Yu |
| 2017/0364747 A1 | 12/2017 | Ekambaram |
| 2018/0043532 A1 | 2/2018 | Lection |
| 2018/0052876 A1 | 2/2018 | Liu |
| 2018/0052913 A1 | 2/2018 | Gaskill |
| 2018/0053114 A1 | 2/2018 | Adjaoute |
| 2018/0054507 A1 | 2/2018 | Bentitou |
| 2018/0068031 A1 | 3/2018 | Hewavitharana |
| 2018/0075403 A1* | 3/2018 | Mascorro Medina ....................... G06Q 10/087 |
| 2018/0082230 A1 | 3/2018 | Rosenberg |
| 2018/0092559 A1* | 4/2018 | Wybo .................. A61B 5/4893 |
| 2018/0099846 A1 | 4/2018 | High |
| 2018/0107917 A1 | 4/2018 | Hewavitharana |
| 2018/0108443 A1 | 4/2018 | Li |
| 2018/0114111 A1 | 4/2018 | Gill |
| 2018/0121098 A1 | 5/2018 | Gill |
| 2018/0127211 A1* | 5/2018 | Jarvis ................... G01C 21/206 |
| 2018/0127212 A1* | 5/2018 | Jarvis .................. G05D 1/0225 |
| 2018/0136615 A1 | 5/2018 | Kim |
| 2018/0137155 A1 | 5/2018 | Majumdar |
| 2018/0143634 A1 | 5/2018 | Ott |
| 2018/0143978 A1 | 5/2018 | Chang |
| 2018/0144208 A1 | 5/2018 | Lu |
| 2018/0144248 A1 | 5/2018 | Lu |
| 2018/0144257 A1 | 5/2018 | Ankisettipalli |
| 2018/0150740 A1* | 5/2018 | Wang ................... G06K 9/2054 |
| 2018/0157902 A1 | 6/2018 | Tu |
| 2018/0165518 A1 | 6/2018 | Assaf |
| 2018/0165625 A1 | 6/2018 | Modi |
| 2018/0169865 A1 | 6/2018 | Kou |
| 2018/0173459 A1 | 6/2018 | Katarki |
| 2018/0189269 A1 | 7/2018 | Quirk |
| 2018/0190377 A1 | 7/2018 | Schneemann |
| 2018/0197275 A1* | 7/2018 | Price ...................... H04N 5/332 |
| 2018/0218266 A1 | 8/2018 | Halim |
| 2018/0218472 A1 | 8/2018 | Riabov |
| 2018/0225281 A1 | 8/2018 | Song |
| 2018/0233141 A1 | 8/2018 | Solomon |
| 2018/0256989 A1 | 9/2018 | Adekunle |
| 2018/0267540 A1* | 9/2018 | Sonoura ............... G05D 1/0221 |
| 2018/0268699 A1 | 9/2018 | Ohsawa |
| 2018/0275677 A1 | 9/2018 | Hamada |
| 2018/0275913 A1 | 9/2018 | Mitkar |
| 2018/0281191 A1* | 10/2018 | Sinyavskiy .......... B25J 11/0085 |
| 2018/0284735 A1 | 10/2018 | Cella |
| 2018/0285359 A1 | 10/2018 | Bostick |
| 2018/0285413 A1* | 10/2018 | Vora ...................... G06N 5/041 |
| 2018/0285595 A1 | 10/2018 | Jessen |
| 2018/0292827 A1 | 10/2018 | Artes |
| 2018/0314603 A1 | 11/2018 | Gibbons, Jr. |
| 2018/0314689 A1 | 11/2018 | Wang |
| 2018/0336271 A1 | 11/2018 | Chandrasekaran |
| 2018/0349485 A1 | 12/2018 | Carlisle |
| 2019/0035083 A1* | 1/2019 | Lin ......................... G10L 15/26 |
| 2019/0053856 A1 | 2/2019 | Weber |
| 2019/0154439 A1 | 5/2019 | Binder |
| 2019/0179329 A1* | 6/2019 | Keivan ................ G05D 1/0246 |
| 2019/0180195 A1* | 6/2019 | Terry ...................... G06F 16/34 |
| 2019/0193273 A1 | 6/2019 | Favis |
| 2019/0220774 A1 | 7/2019 | Terry |
| 2019/0255703 A1 | 8/2019 | Izhikevich |
| 2019/0273619 A1 | 9/2019 | Campagna |
| 2019/0278796 A1 | 9/2019 | Lellis |
| 2019/0286996 A1 | 9/2019 | Tian |
| 2019/0290209 A1 | 9/2019 | Fu |
| 2019/0347120 A1 | 11/2019 | Kottomtharayil |
| 2019/0351558 A1 | 11/2019 | Park |
| 2019/0361457 A1 | 11/2019 | Johnson |
| 2019/0370096 A1 | 12/2019 | Grewal |
| 2019/0378019 A1 | 12/2019 | Scheutz |
| 2020/0035110 A1 | 1/2020 | Priest |
| 2020/0061839 A1* | 2/2020 | Deyle .................... B25J 9/1664 |
| 2020/0117187 A1 | 4/2020 | Kothari |
| 2020/0152084 A1 | 5/2020 | Kumar |
| 2020/0215698 A1* | 7/2020 | Bogolea ................. B25J 11/008 |

OTHER PUBLICATIONS

Kambhampati et al, "Multiresolution Path Planning For Mobile Robots," IEEE Journal on Robotics and Automation, vol. 2 Issue 3, pp. 135-145. (Year: 1986).

(56) References Cited

OTHER PUBLICATIONS

Kangavari et al., Information Retrieval: Improving Question Answering Systems by Query Reformulation and Answer Validation, World Academy of Science, Engineering and Technology, 2008, pp. 303-310, Issue 48.

Kamel et al., "A graph based knowledge retrieval system." 1990 IEEE International Conference on Systems, Man, and Cybernetics Conference Proceedings. IEEE, 1990. (Year: 1990).

* cited by examiner

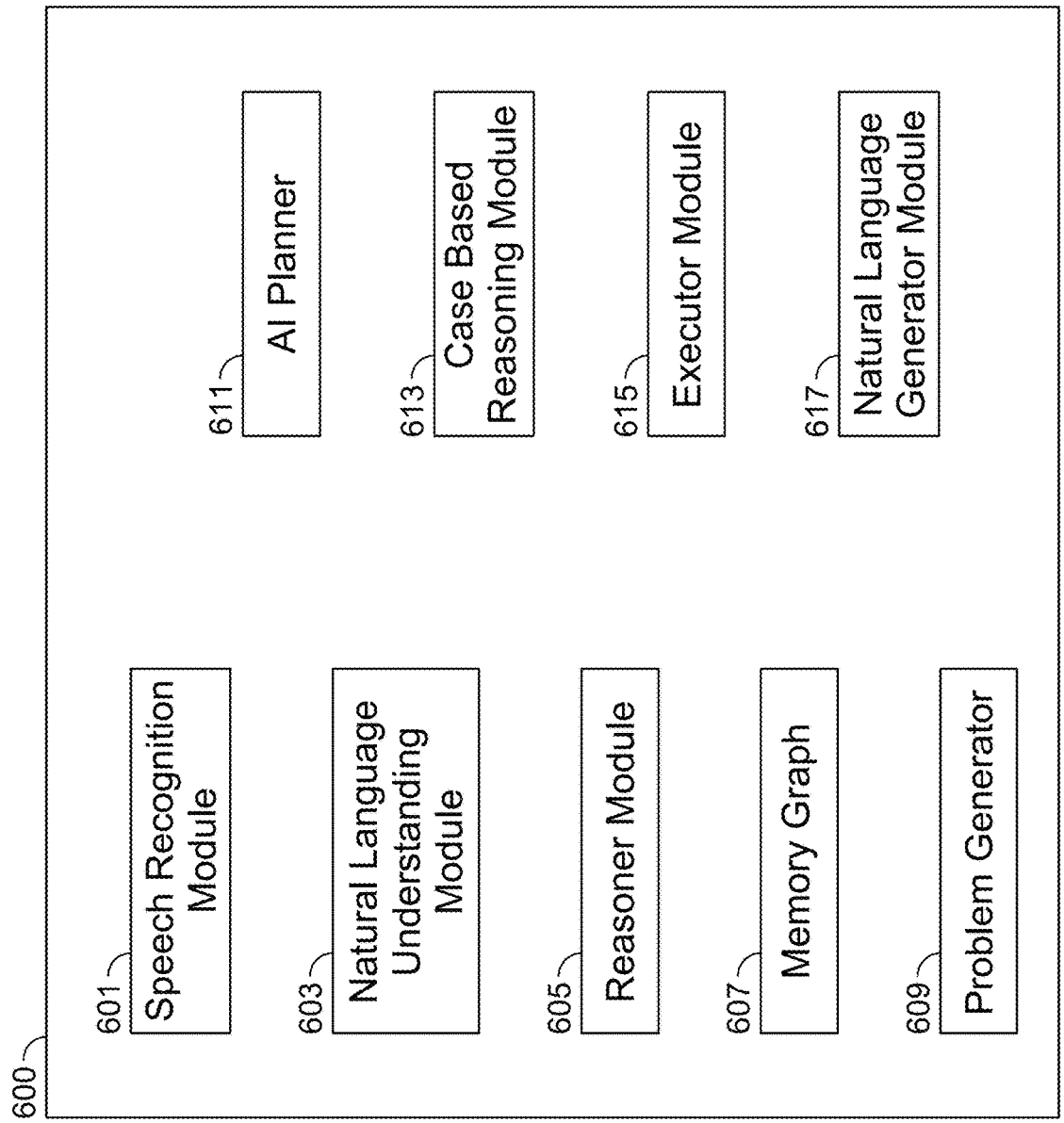

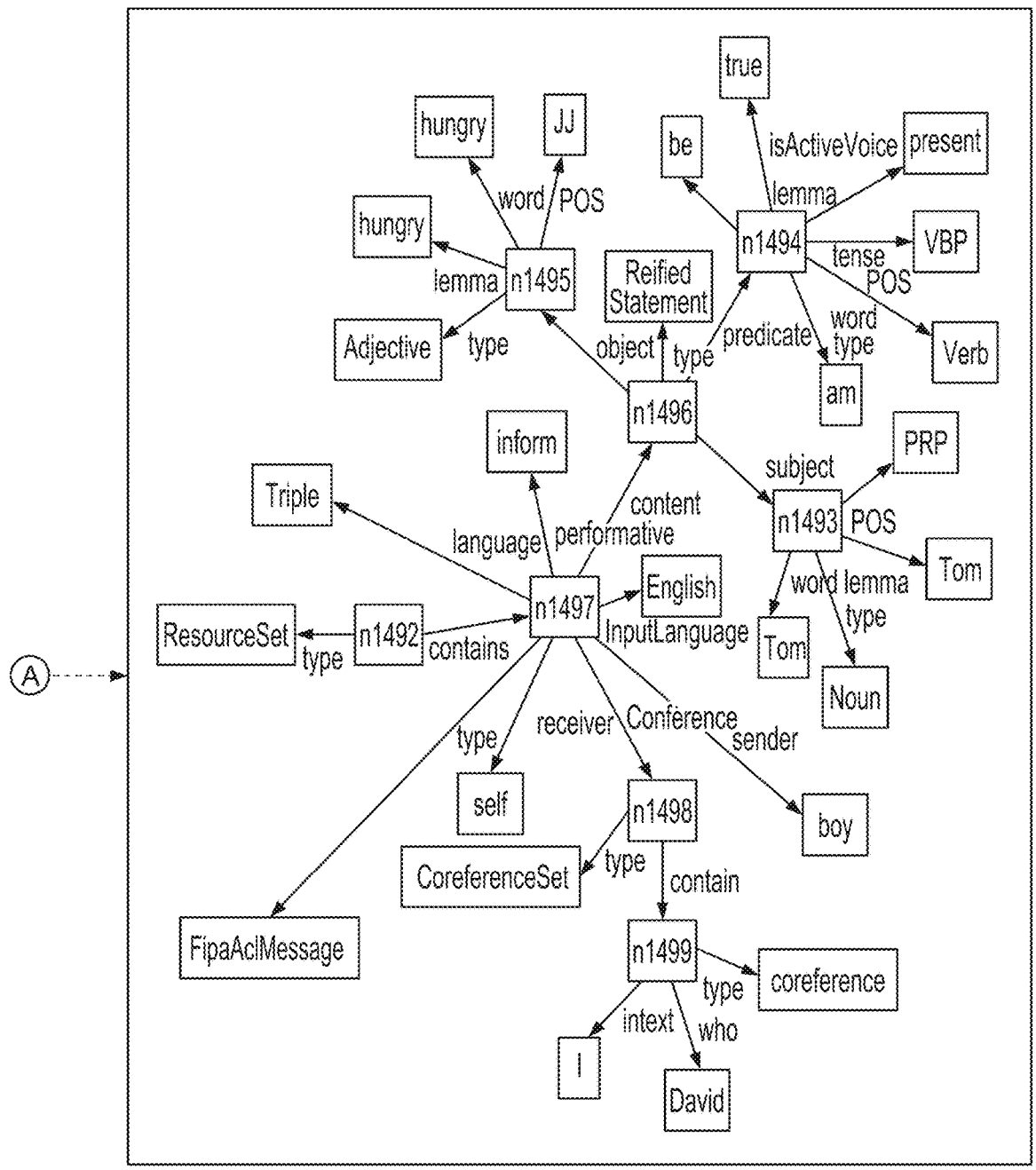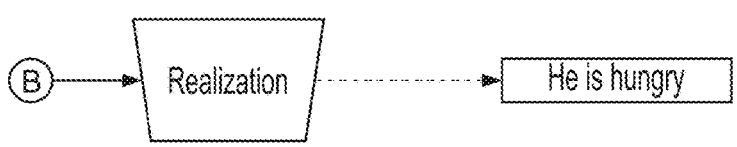
FIG. 14 (Cont.)

```
1. Initialize state
2. Repeat - Overall works
        1) Get new external events
        2) Sequence for determining plan
                * Repeat to select most proper module
                        1/Select the highest priority module
                        2/Execute Planner or selected module
                                (if planner works)
                                >> Generate Domain & Problem
                                >> Set a goal
                                >> Run planner to get a plan
                                (If other module works)
                                >> Execute each module's work
                                >> Set a plan for module
                        3/Investigate if plan is proper
                * Repeat end (if plan is proper)
        3) Execute plan with executor
        4) Generate natural language
        5) Output generated response
3. End Repeat - Overall works
```

FIG. 18

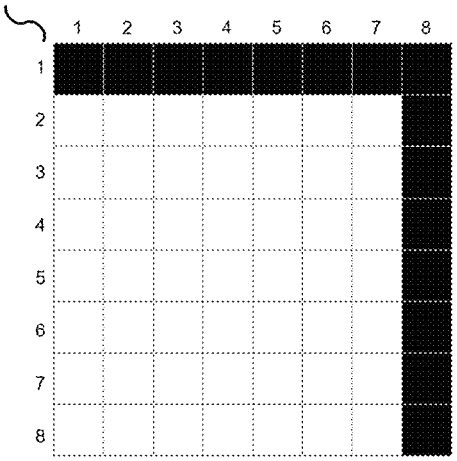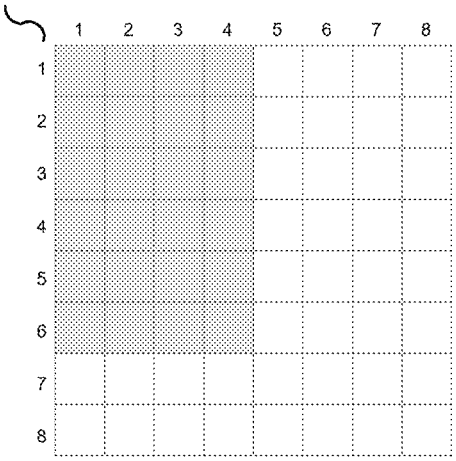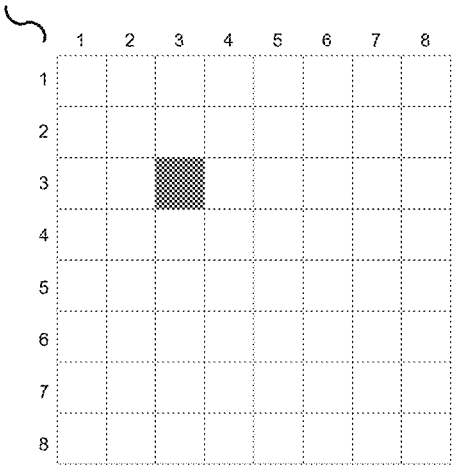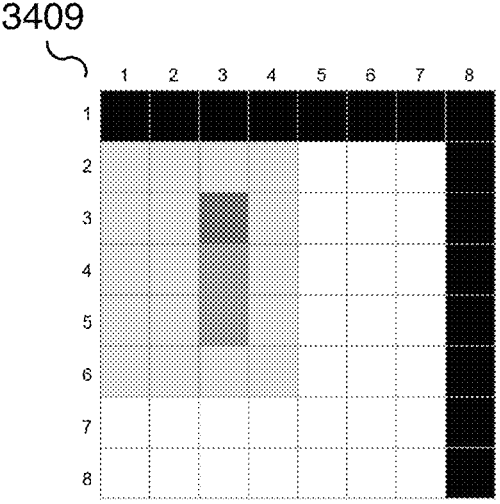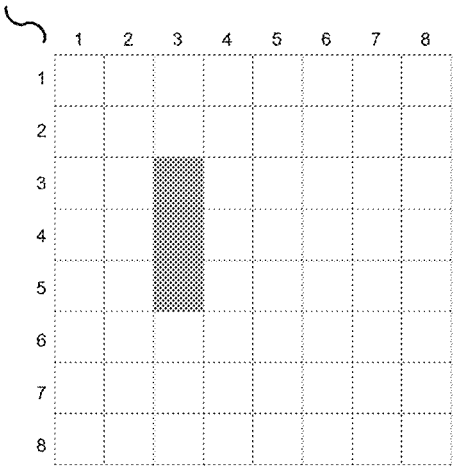
FIG. 34

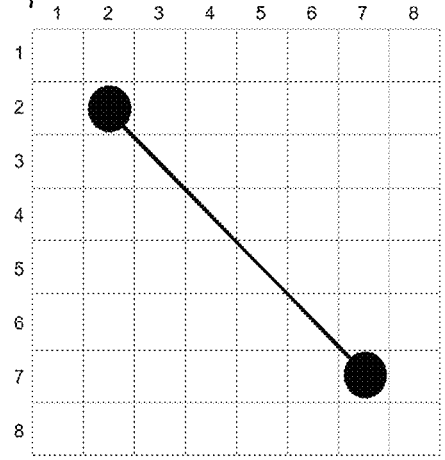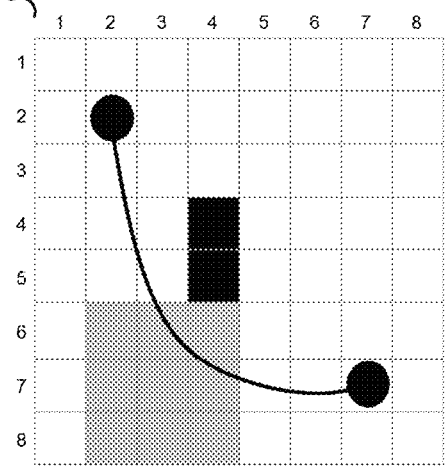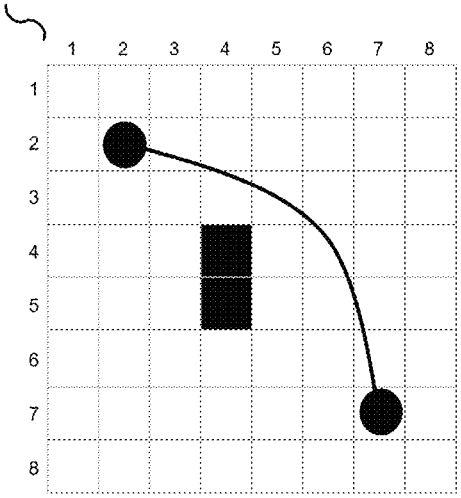
FIG. 35

CONTEXT AWARE INTERACTIVE ROBOT

CROSS REFERENCE TO OTHER APPLICATIONS

This application is a continuation-in-part of co-pending U.S. patent application Ser. No. 15/946,646 entitled ADAPTIVE, INTERACTIVE, AND COGNITIVE REASONER OF AN AUTONOMOUS ROBOTIC SYSTEM filed Apr. 5, 2018, which claims priority to U.S. Provisional Patent Application No. 62/482,631 entitled ADAPTIVE, INTERACTIVE, AND COGNITIVE REASONER OF AN AUTONOMOUS ROBOTIC SYSTEM filed Apr. 6, 2017, both of which are incorporated herein by reference for all purposes.

This application claims priority to U.S. Provisional Patent Application No. 62/609,237 entitled CONTEXT AWARE INTERACTIVE ROBOT filed Dec. 21, 2017 which is incorporated herein by reference for all purposes.

BACKGROUND OF THE INVENTION

The traditional retail shopping experience can be tedious and burdensome. For example, finding a desired product at a large retail location may be difficult. Inventory systems are often hard for both customers and work staff to access and finding the correct shelf location for a product can be challenging. Similarly, retail stores may often be understaffed or the staff poorly trained, which results in potential customers with unanswered questions. Therefore, there exists a need for a context aware interactive robot powered by an artificial intelligence reasoning agent that responds to conversational language requests to provide interactive customer and staff services to solve customer and staff problems.

BRIEF DESCRIPTION OF THE DRAWINGS

Various embodiments of the invention are disclosed in the following detailed description and the accompanying drawings.

FIG. 6 is a functional block diagram illustrating an embodiment of an autonomous robotic system for responding to voice input using an adaptive, interactive, and cognitive reasoner.

FIG. 18 is a pseudo-code description illustrating an embodiment of a process for solving an artificial intelligence problem using adaptive, interactive, and cognitive reasoning.

FIG. 34 is diagram illustrating the progression of an embodiment of a process for creating a semantic location map.

FIG. 35 is diagram illustrating several embodiments of a costmap used for path planning.

DETAILED DESCRIPTION

Figure 1:
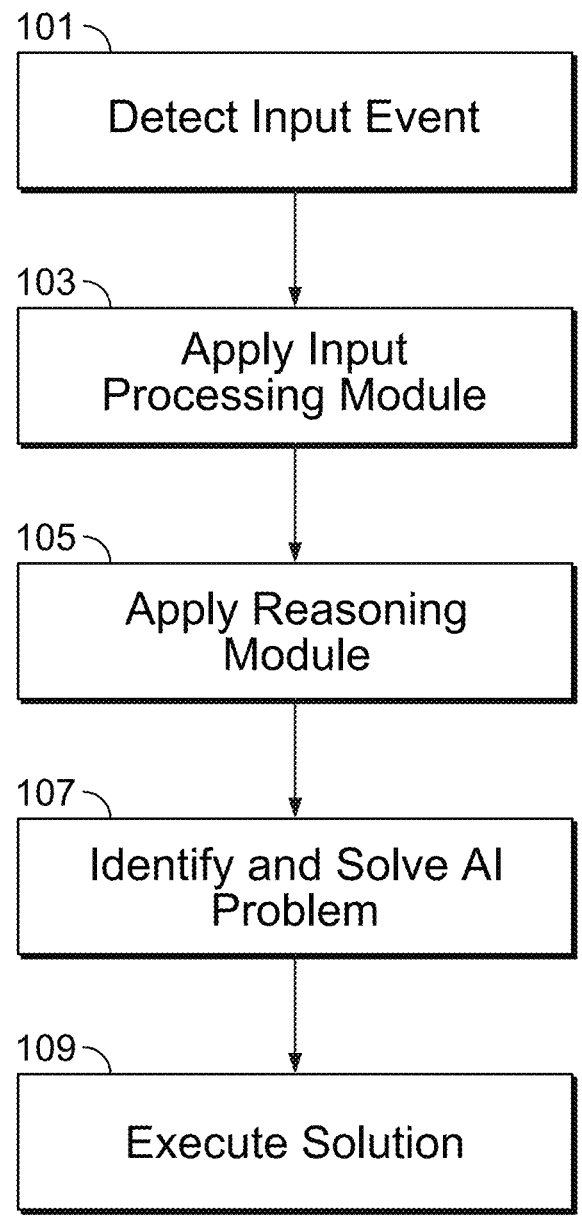
FIG. 1 is a flow diagram illustrating an embodiment of a process for responding to an input event using an adaptive, interactive, and cognitive reasoner.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A context aware interactive robot is disclosed. For example, a context aware interactive robot is deployed in a retail environment such as a supermarket, mall, store, or another similar place. The robot provides interactive services to robot users, such as customers as well as retail staff, and the provided services are context aware. For example, a customer can participate in a conversation with the robot about currently stocked retail products. The robot can also guide a customer to the location of a desired product on store shelves. While navigating a retail environment, the robot can scan its surroundings and identify products on shelves. In some embodiments, the robot is able to perform inventory checks and other related retail tasks. For example, a retail staff member can command the robot to check for the storage locations of a particular product. The robot with the help of an adaptive interactive cognitive reasoning engine (AICoRE) plans a path through the retail environment. Using the path to navigate through the store, the robot performs an inventory count on the product. The count results may be referenced with expected inventory to determine whether the product should be restocked.

In some embodiments, a context aware interactive robot is equipped with a 2D/3D lidar sensor, a depth camera sensor, a display, speakers, microphones, and other sensors and components. Utilizing computer vision techniques, speech recognition techniques, an artificial intelligent (AI) server, and robot simultaneous localization and mapping (SLAM) functionality, the context aware interactive robot can automatically generate a semantic location map of a retail environment. The robot can interact with customers and provides a variety of services including answering customer's questions, guiding customer to locations of products, etc.

In some embodiments, a context aware interactive robot includes conversation functionality, scene/surroundings understanding functionality, and an information fusion module, among other functionality. The robot can automatically scan its surrounding environment, extract environment information from the images captured by its cameras (for example, product tags, recognized object descriptions or shapes, etc.), generate a 2D/3D map using its 2D/3D sensor, and create a semantic location map, which can be used for autonomous navigation and robot guidance. While scanning the environment, the robot can detect and identify whether items on retail shelves are sold out (or not) and notify staff of the need to replenish the stock of goods that are low or sold out. The warehouse storage information extracted by the robot can be used to analyze customer behavior.

In some embodiments, the disclosed context aware interactive robot system provides a variety of customer facing applications. For example, the robot includes a conversation functionality that can recognize a customer's speech. The robot can further recognize objects from the photos that a customer shows the robot. Received information can be sent to a reasoning engine server, such as an adaptive interactive cognitive reasoning engine (AICoRE) server, for in-depth analysis. Based on the customer's specific input and analysis results received from an AICoRE server, the robot provides context specific feedback for each customer. For example, the robot can answer a customer's question on products and show related product information on its display screen. The robot can further recognize objects from photos that a customer shows to the robot. Based on a generated semantic location map, the robot can guide a customer to an appointed product location while performing autonomous navigation to avoid obstacles in a retail environment.

In some embodiments, an adaptive interactive cognitive reasoning engine (AICoRE) includes a human-like agent reasoner that functions as the human mind in a robot with the ability to perceive, reason, remember, and respond. The AICoRE utilizes learning, problem solving, and automated reasoning to interact with humans. An AICoRE server can be used for implementing speech communication as well as to understand and respond to visual information. For example, an AICoRE module can be implemented as a general conversation agent that can also use visual information. The AICoRE module can provide feedback to a robot in a variety of scenarios based on the input received. Example scenarios include providing feedback in the event a user talks to a robot in a retail environment, a user shows a photo to the robot in a retail environment, a user asks the robot questions, and a user commands the robot to perform an action, among others. An AICoRE module can provide analysis and feedback to support robot hardware status changes, robot movement in a retail environment including movement for creating a map of the environment, and robot scans the environment, among others.

In various embodiments, a context aware interactive robot can interact with a user in a natural way. Utilizing, in part, speech and vision functionality as well as backend analysis provided by an AICoRE module, the robot can provide context specific feedback to a robot user. Being context-based, the robot's response is customized to different scenarios. Using a 2D/3D lidar and other equipped sensors, the robot can scan its environment, perform autonomous navigation, and generate a map of a retail environment. Utilizing its visual processing functionality, the robot can recognize objects from the images captured by its cameras, scan products on retail shelves, and check the inventory for different products. An information fusion module of the robot system can fuse information extracted from its environment and generate a semantic location map.

In some embodiments, a context aware interactive robot includes conversation functionality, visual recognition functionality, autonomous navigation functionality, information fusion function, and reasoning and planning functionality (e.g., using an AICoRE server), among other functionality. Robot users, such as customers and retail staff, can interact with the robot in a natural manner such as by using conversational language. Users can obtain needed information and ask the robot to accomplish instructed tasks. For example, a user can ask the robot to guide the user to an appointed product location, ask the robot to scan goods located on a shelf, and ask the robot to provide answers to the user's questions, etc. In various embodiments, the robot system is used to perform repetitive work for staff in a retail environment and to also provide convenient, fast, and humanized services for customers.

In some embodiments, a context aware interactive robot system provides a variety of services include providing a response to natural language questions related to product items in a retail environment. A context aware interactive robot system analyzes a plurality of images captured using a camera of the robotic system. For example, a robot camera captures images of a robot's surrounding environment for tag and object recognition. A spatial map is generated by the robotic system using a sensor of the robotic system such as a lidar sensor. The robot system generates a semantic location map using at least the analyzed plurality of captured images and the generated spatial map. For example, by compositing a tag layer and object layer using tag and object recognition results with the generated spatial map, a semantic location map is generated that fuses product and navigation information. The robot receives a natural language input from a user referencing a desired product item. For example, a customer asks the robot whether the retail store sells a particular product. The robot uses speech recognition to recognize a speech recognition result from the natural language input. The speech recognition result is sent to a reasoning engine. For example, a remote server hosts a reasoning engine such as an adaptive interactive cognitive reasoning engine. The robot receives one or more commands for the robot system from the reasoning engine in response to sending the recognized speech recognition result. For example, the reasoning engine performs additional analysis on the recognized speech recognition result such as determining whether the desired product is stocked by the retail location. The robot performs the received one or more commands. For example, the robot prepares a response to the user using natural language generation. The robot provides feedback to the user based on at least one of the one or more commands. For example, the robot plays the natural language generated to the user using speakers of the robot. The generated natural language informs the potential customer whether the retail location has the desired product in stock and information on the item such as the item's price and shelf location. The robot may also provide the customer a list of complementary items for suggested purchase and a path to the desired product item that also includes passing by interested complementary items.

In some embodiments, a natural language artificial intelligence (AI) problem is solved. For example, a user asks a voice AI agent a query and the voice AI agent solves the natural language AI problem and provides a vocal response. For example, a user asks a voice AI agent a query and the voice AI agent solves the natural language AI problem and provides a vocal response. Initially, a natural language input is received. For example, a user speaks a query to a robotic system such as a voice AI agent. The natural language input is processed to classify components of the natural language input. For example, the voice is processed into a structured format that identifies a subject, object, and predicate. In some embodiments, one or more lemma are identified as well as a performative classification, a sender of the input, and a receiver of the input. A starting node of an artificial intelligence memory graph data structure is selected to begin a search for one or more supporting knowledge data nodes associated with the classified components, wherein the artificial intelligence memory graph comprises one or more data nodes. For example, an artificial intelligence memory graph is made up of one or more nodes including root nodes that are each associated with a different user that has interacted with the robotic system. The speaker of the natural language input is identified and the user root node associated with the speaker is selected as a starting node. Starting at the starting node, the artificial intelligence memory graph data structure is searched using a lexical database to identify the one or more supporting knowledge data nodes. For example, the starting nodes may serve as a starting node to begin a search for data nodes relevant to the classified components. In some embodiments, one or more nodes based on previous input are identified as supporting knowledge and are associated with the example query. In some embodiments, a lexical database is used to identify words and/or nodes that are related to the input. In some embodiments, a lexical database is utilized for co-referencing. An artificial intelligence problem is identified. For example, a query is identified as an AI problem that is different from a declaration. In one scenario, a user may ask "What is my name?" and in the other scenario a user makes the assertion "My name is Alice." In various embodiments, the identified AI problem is generated using the processed natural language input and identified supporting knowledge data nodes. The artificial intelligence problem is solved using the one or more identified supporting knowledge nodes of the artificial intelligence memory graph data structure. For example, using the identified nodes as supporting knowledge, an AI planning problem is created and solved. In some embodiments, the AI problem is an AI planning problem solved using an AI planner.

In some embodiments, the classified components of the natural language input are recorded in one or more nodes of an artificial intelligence memory graph data structure. As an example, certain words or variations of words of an input sentence are classified into word components and recorded as nodes in a memory graph data structure for processing and retrieval at a later date. The nodes may identify the part of speech of the word and its relation to the sentence as well as previously received input. In some embodiments, the solution to the identified artificial intelligence problem is also stored in the artificial intelligence memory graph data structure.

Cognitive Science and other related fields have brought us closer to the understanding of the human mind and brain and how they work. True AI has the very purpose of mapping the human knowledge and how it is acquired, processed, and used into artificial intelligent agents. The adaptive interactive cognitive reasoning engine (AICoRE) is an agent reasoner that is meant to be the encapsulation of the components of the human mind in any agent with a robot body. The integration of the human knowledge traits from language, memory, visual perception, thinking and reasoning to decision making and social cognition can be shown in a practical implementation of the general conversational agent.

In various embodiments, the adaptive interactive cognitive reasoning engine (AICoRE) is a cognitive reasoning engine that unifies problem solving and learning. It may fully automate the reasoning process from end to end. In some embodiments, the AICoRE is an incremental holistic human-like reasoner, covering the full spectrum of reasoning from sensing, reasoning, discovering, planning, learning and remembering until responding and performing.

In order to have such a significant improvement over the general conversation agent (GCA), the depth and breadth of the research that was undertaken includes fields like audio-visual sensory techniques, natural language understanding (NLU), reasoning, planning, natural language generation (NLG), case based reasoning (CBR), inter-agent communication (iAC) and memory graph (MG). In some embodiments, these modules constitute the AICoRE, and are closely related to each other.

In some embodiment, the NLU module tries to find triples from a sentence using a natural language processing tool and co-reference modules. In some embodiments, the NLU module parses sentences based on constituency first, and then adds more information such as the subject, verb, and object of the sentence. It not only parses the grammatical structure of the sentence, but also analyzes the performative and language of the sentence. In addition, the co-reference module checks not only objects in sentences, but also the relationships between the speaker and the object.

In some embodiments, the output of NLU is transferred into a reasoner module to retrieve information that will help the next module, the planner, generate a response fit for general conversation. Using a supporting knowledge retriever sub-function, the reasoner gathers a list of resources from the memory graph corresponding to knowledge that are related to the given input, and ranks these resources in order of importance. After that, an open-ended conversation generator sub-module determines possible response types that will serve as templates for generating more various natural responses.

In some embodiments, using the output of the reasoner module, the problem generator generates an artificial intelligence problem and the planner solves the problem. For example, in some embodiments, the problem generator generates a PDDL domain/problem description, and the planner module solves the PDDL problem specified by the description. In various embodiments, the planner module is capable of dealing with both physical and cognitive (speech) actions, and also dealing with real world problems while interacting with multiple agents and humans. Unlike traditional conversation agents, the disclosed autonomous robotic system can use the planner module itself to get solutions.

In various embodiments, the generated solution is used in a NLG module for generating answers in a natural language format. For example, a NLG module is utilized to generate natural language from a machine-based representation such as a knowledge base or a logical form.

In some embodiments, all of the generated data is saved in memory. The AICoRE can manage and use the saved data efficiently, for example, by using its memory structure. In various embodiments, the CBR is the process of solving new problems based on the solutions of similar past problems. The CBR compares the current case against previous ones based on a description of the problem, such as a PDDL problem description, and the action plan made by the planner module. In the event the CBR module determines a previously solved problem is similar to the current one, a previous case may be reused.

In various embodiments, inter-agent communication (iAC) is utilized for communication between different agents. The iAC may include two modules, an iACManager and an iAC Server. The iACManager module represents the client side of the iAC. The iACManager module generates ACLMessages and sends the messages via an inter-agent communication platform. In some embodiments, the ACLMessages are based on the FIPA-ACL standard. In some embodiments, the inter-agent communication platform is the JADE Platform. In some embodiments, the iACServer module runs on the same inter-agent communication platform as the iACManager and can send and receive ACLMessages. In various embodiments, messages are sent based on whether the appropriate receiver exists.

An example process of the AICoRE is as follows: the chosen event, represented in natural language format, gets put into the natural language understanding module of the AICoRE. Next, the planner module of the AICoRE uses a set of internal rules to set the most proper goal and plan to get the best solution for the given event. The AICoRE relies on rules of the planner module as well as rules from other modules within the system. In some embodiments, an iterative sequence is required within the main repeat sequence in order to account for all the various rules. Examples of rules not from the planner module include rules from the reasoner module that are used to map data to the event, based on various characteristics of the event. Once a plan is set for executing a solution for a given event, the AICoRE executes the plan with an executor module. Using the steps generated by the execution of the plan, the AICoRE can generate responses in a natural language form that satisfies the actions required to accomplish the goal set by the input event.

FIG. 1 is a flow diagram illustrating an embodiment of a process for responding to an input event using an adaptive, interactive, and cognitive reasoner. In the example shown, the process of FIG. 1 may be used by an autonomous robotic system to create and execute a voice response to a received query, such as a voice query. As another example, the result of FIG. 1 may be movement performed by an autonomous robotic system in response to a movement command. In various embodiments, the process of FIG. 1 may be implemented on a computer programmed system including a mobile device. In some embodiments, portions of the process of FIG. 1 are performed across one or more computer programmed systems including remote servers such as cloud computing servers. In some embodiments, the process of FIG. 1 is implemented by an autonomous robotic system in response to an input event.

At 101, an input event is detected. In various embodiments, the input event is a triggering event that initiates the processing of FIG. 1. In some embodiments, the input detected is voice input from a human user such as a spoken sentence. In some embodiments, the input detected includes not only voice input but also visual input. In various embodiments, the input detected may be voice input, visual input (e.g., gestures, the presentation of a face, an object moving, etc.), and network communication, among others. In some embodiments, the input detected is received from an autonomous agent and/or autonomous robot.

At 103, an input processing module is applied to the input detected at 101. In various embodiments, an autonomous robotic system includes one or more input processing modules. In various embodiments, a conversation module is used to process voice input. In some embodiments, visual input such as a gesture is processed by a vision module, remote communication is processed using a remote communication module, movement instructions are processed by a plan & move module, etc. In the example shown, the appropriate input processing module is determined and applied. For example, a conversation module is selected and applied when the input detected at 101 is determined to be a voice sentence that initiates or continues a conversation.

At 105, a reasoning module is applied. For example, an autonomous robotic system includes a reasoning module that identifies and retrieves supporting knowledge related to the input event detected at 101. In some embodiments, the knowledge is retrieved from a knowledge store such as a memory graph data structure that captures and organizes data previously learned including data from sources such as conversations, actions, and/or observations, etc. In some embodiments, a reasoning module determines which data of the knowledge store is supporting knowledge in part by utilizing a lexical database. For example, a remote lexical database may be utilized for co-referencing to identify data as relevant to the received input. In various embodiments, a reasoning module may access remote data stores for supporting knowledge in addition to the knowledge store of the system. In various embodiments, the knowledge store may be local and/or remote to the system. In some embodiments, the knowledge store may be partitioned by the entity that generates, creates, and/or receives the knowledge. For example, a knowledge store may contain a separate partition of the data associated with each different user that interacts with the system. In some embodiments, the knowledge store may contain a separate partition of data for the autonomous system. In various embodiments, the knowledge store may be located on a server system and/or in the cloud. In some embodiments, the knowledge store is maintained on the local system and/or device and may be encrypted to limit access to only processes local the knowledge store. In various embodiments, the knowledge store may reside in one or more locations. In some embodiments, the reasoning modules updates the knowledge store based on the input event.

At 107, an artificial intelligence (AI) problem is identified and solved. In some embodiments, the supporting knowledge retrieved at 105 is used to identify and construct an AI planning problem. In various embodiments, the AI planning problem is solved using an AI planner. In some embodiments, once solved, the solution is saved for potential reuse if the same problem is encountered again. In some embodiments, previously solved problems are analyzed to determine the appropriate solution for the current problem. For example, previous solved problems may be matched using a case based reasoning module and the solution re-used for a subsequently generated AI planning problem. In various embodiments, case based reasoning improves the performance of the system compared to a solution that relies solely on an AI planner. In various embodiments, the solution is used to create a response to the input received at 101.

At 109, a solution is executed. For example, in response to a voice input at 101, the solution solved at 107 is executed by generating a voice response that is played to the user. In various embodiments, a voice response is generated using natural language generation. In some embodiments, the executed solution and/or output are added to the knowledge store of the system. As another example, in response to input that is a movement request, an autonomous robotic system will move based on its understanding of the received movement instruction. For example, an autonomous robot may determine to move to a certain location, at a certain speed, using a certain movement pattern (walking, running, crawling, 4-wheel drive, 2-wheel drive, slithering, etc.). In various embodiments, the execution of the solution is performed by an executor module. In some embodiments, the executor module relies on one or more different sub-modules depending on type of input event detected at 101. For example, in the case of a movement request input event, the executor module executes a solution that physically moves the autonomous robotic system and may engage different mechanical control systems including those configured to manipulate motor and steering functionality.

Figure 2:
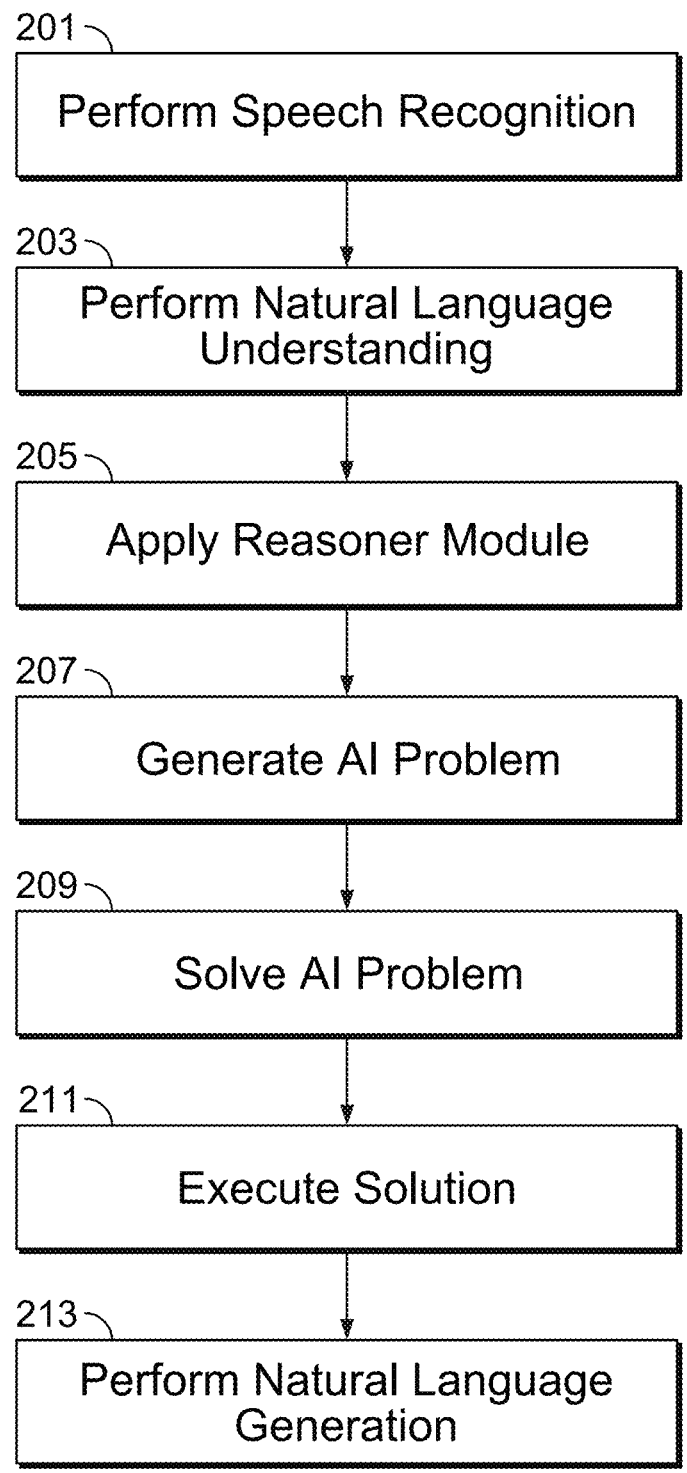
FIG. 2 is a flow diagram illustrating an embodiment of a process for responding to voice input using an adaptive, interactive, and cognitive reasoner with a voice response.

FIG. 2 is a flow diagram illustrating an embodiment of a process for responding to voice input using an adaptive, interactive, and cognitive reasoner with a voice response. In the example shown, the process of FIG. 2 may be used by an autonomous robotic system to create and execute a voice response to a received voice query. For example, a voice artificial intelligence (AI) agent can generate a response to the voice query "What fruit do I like?" that answers the fruit the user previously told the agent that she or he likes. In some embodiments, the process of FIG. 2 is performed using the process of FIG. 1.

At 201, speech recognition is performed. In various embodiments, speech recognition is performed on detected voice input. For example, an input event associated with a spoken sentence is detected as a sound and recognized as human speech. In some embodiments, the speech recognition identifies the beginning and end of a voice input. In some embodiments, the step of 201 is performed as part of the step of 101 and/or 103 of FIG. 1.

At 203, natural language understanding is performed. For example, a natural language understanding process is performed by a natural language understanding module on the speech recognized at 201 to derive meaning from the received human or natural language input. In some embodiments, the natural language understanding functionality is performed by a conversation input processing module. In some embodiments, the step of 203 is performed at 103 of FIG. 1 in response to applying a conversation input processing module to detected voice input.

In some embodiments, the natural language understanding module attempts to identify triples from a sentence. For example, a sentence recognized as speech at 201 is parsed and triples are extracted. In some embodiments, triples are extracted using a parse tree. In some embodiments, reified triples are extracted from the sentence. In some embodiments, the system uses labeled-links to find appropriate modifiers from an element. In various embodiments, reification is utilized to further annotate the recognized sentence.

In some embodiments, the natural language understanding processing includes adding missing punctuation to improve the accuracy of the syntactic parsing. For example, a first set of words of the sentence and corresponding parts of speech tags are analyzed and punctuation may be added. In some embodiments, co-referencing is performed to identify referents prior to creating a parse tree. In some embodiments, the initial parse tree is corrected using a set of pre-defined rules. In various embodiments, the sentence's performative classification is determined and may be utilized to determine the appropriate response. Examples of performative classifications include inform, query-ref, query-if, and request types and may be used to denote the type of communicative act. In various embodiments, fewer or more performatives types may be supported. In some embodiments, the performatives are based on the Foundation for Intelligent Physical Agents-Agent Communication Language (FIPA-ACL) specification. For example, a query-if performative denotes a query (e.g., "Do you like apples?" and "Am I a student?") that expects a true or false response. A query-ref performative denotes a query (e.g., "What fruit do I like?" and "How is the weather today?") that expects a response using an object answer. A request performative is a request directed to the autonomous robotic system. Examples include: "Move forward" and "Turn the light on."

In various embodiments, the natural language understanding process parses the received sentence based on constituency and then added additional information such as the identified subject, verb, and/or object. The module identifies the grammatical structure of the sentence and determines the sentence's performative classification and language.

At 205, a reasoner module is applied. In various embodiments, the reasoner module is implemented using an adaptive, interactive, and cognitive reasoner. For example, an adaptive, interactive, and cognitive reasoner is applied to the voice input processed at 201 and 203. In some embodiments, the reasoner provides data for creating an artificial intelligence (AI) planning problem. For example, the reasoner may retrieve data used to generate an AI problem based on the relevance of stored data to the input to the reasoner. In some embodiments, the data is retrieved from a memory graph data structure that stores episodic memory relevant to each user the robotic system interacts with. In some embodiments, the step of 205 is performed at 105 of FIG. 1.

At 207, an artificial intelligence (AI) problem is generated. In some embodiments, the problem is generated by an AI problem generator using the information provided by applying a reasoner module at 205. In some embodiments, the planning problem is described using an artificial intelligence planning language such as the language described by the Planning Domain Definition Language (PDDL) specification and/or a multi-agent extension of PDDL. In some embodiments, the specifications are Multi-Agent PDDL (MA-PDDL) descriptions that include a domain description and a problem description. In various embodiments, the problem generation includes converting the extracted triple at 203 to an artificial intelligence planning language. The generated problem includes a description of the current status and/or state of the system and one or more goals to achieve. In some embodiments, the step of 207 is performed as part of 107 of FIG. 1.

In some embodiments, the generated artificial intelligence (AI) problem uses a predefined problem domain and includes one or more actions appropriate for the domain. In various embodiments, the actions are defined based on the performative of the input sentence. For example, in some embodiments, the performative classifications include inform, query-ref, query-if, and request to denote the type of communicative act. In various embodiments, fewer or more performative types may be supported. In some embodiments, the performatives are based on the Foundation for Intelligent Physical Agents-Agent Communication Language (FIPA-ACL) specification.

At 209, an artificial intelligence (AI) problem is solved. In various embodiments, the solution is solved using an AI planner. In some embodiments, the AI planner utilizes a machine learning model such as a deep convolutional neural network (DCNN). In various embodiments, a traditional AI planner is utilized to solve the AI planning problem. For example, the planner determines a sequence of actions based on an AI planning problem generated at 207. In some embodiments, once solved, the solution is saved for potential reuse in the event the same or a similar problem is encountered again. For example, the problem, the solution, and the context related to the two are saved in a knowledge store such as a memory graph data structure. In some embodiments, the step of 209 is performed as part of 107 of FIG. 1.

In some embodiments, a case based reasoning (CBR) module is used in addition to an AI planner. For example, a CBR module is utilized to increase the performance of AI problem solving by relying on previously solved AI problems and their solutions. Previous solutions are stored as case data using the CBR module. In some embodiments, the data for a case includes at least the problem and an associated sequence of actions determined to solve the problem. In response to a new AI planning problem that matches a previous case, the previously solved solution is utilized instead of re-solving the same problem. In various embodiments, utilizing the CBR module reduces the response time for solving an AI problem.

In some embodiments, case data are stored in a knowledge store such as a memory graph data structure. For example, case data stored may include sender, receiver, time, planner, problem, and solution information. In various embodiments, the sender information identifies the speaker, the receiver information identifies the listener, the time information is the time associated with the conversation, the planner information includes the type of planner used for generating the solution, and the solution information is the action plan of the selected planner.

At 211, the solved artificial intelligence (AI) problem solution is executed. In some embodiments, an executor module executes the solution plan to the AI problem. In various embodiments, the executor module uses one or more different sub-modules to execute the solution based on the input event. For an input event requiring a voice response, the executor module utilizes a natural language generation sub-module and processing continues to 213 where a voice response is generated. In some embodiments, the step of 211 is performed as part of 109 of FIG. 1

At 213, natural language generation (NLG) is performed. In various embodiments, a NLG module performs NLG processing to generate a voice response based on the AI solution solved at 209. In some embodiments, the NLG module performs reconstruction, fixes grammatical errors, and corrects person discrepancies detected in the AI solution to create a more accurate natural language response before converting the solved solution to a voice response. In some embodiments, the step of 213 is performed as part of 109 of FIG. 1.

In some embodiments, the natural language generation (NLG) processing includes parsing string of triples and making a graph of the solution solved at 209. A parsed tree is created using the graph to determine the ordering of the sentence and the subject, predicate, and object(s) of the sentence. In some embodiments, the data is coreferenced. For example, names may be replaced with personal pronouns. In some embodiments, the NLG module utilizes the entire (i.e. whole) sentence without omission of words or changes in grammatical structure to generate a natural language response.

Figure 3:
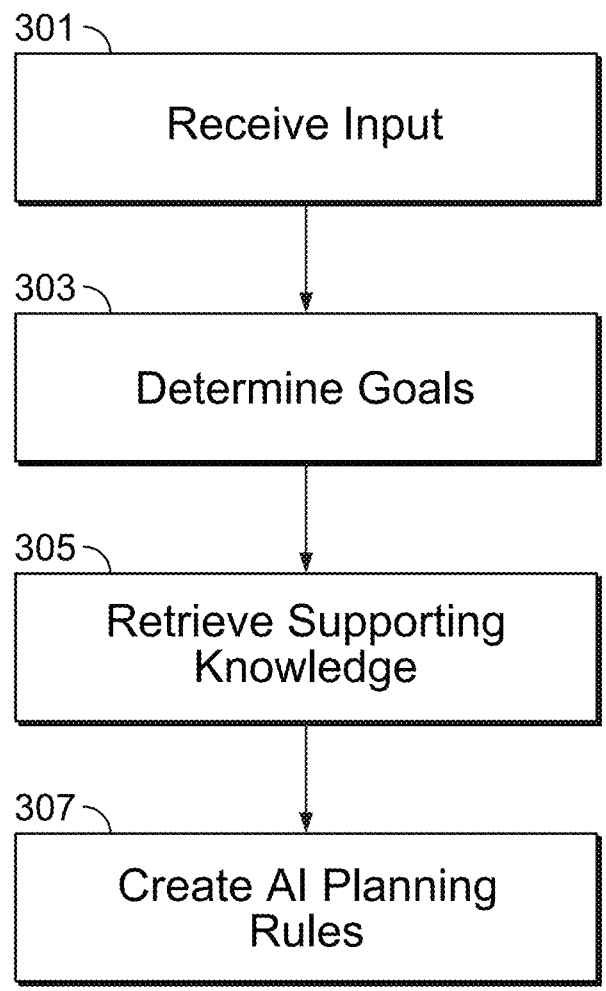
FIG. 3 is a flow diagram illustrating an embodiment of a process for performing reasoning by an adaptive, interactive, and cognitive reasoner.

FIG. 3 is a flow diagram illustrating an embodiment of a process for performing reasoning by an adaptive, interactive, and cognitive reasoner. In various embodiments, the process of FIG. 3 identifies and retrieves supporting knowledge and goals and creates artificial intelligence (AI) planning rules based on the determined information. In some embodiments, AI planning rules are utilized to create an AI planning problem. In some embodiments, the process of FIG. 3 is performed at 105 of FIG. 1 and/or 205 of FIG. 2.

At 301, input is received. For example, a reasoner module receives input such as the input sentence. In some embodiments, an input sentence and a talk mode is received. Examples of talk mode include a query mode and a quiz mode. In some embodiments, a query mode is used for retrieving information from a robotic system. In some embodiments, a query talk mode is also referred to as a conversation and/or normal talk mode. In some embodiments, a quiz mode is used for testing the user on a particular subject, such as a language, using the robotic system. For example, in quiz mode, the robotic system may quiz the user on a subject matter that the user is learning. In some embodiments, the input is received by a reasoner module and the reasoner module invokes one or more sub-functions to retrieve information that is appended to the processed input. In some embodiments, a data structure such as an IntentInformation object is used to encapsulate the retrieved information.

At 303, one or more goals are determined. In some embodiments, each goal represents a goal of the speaker and the reasoner module will attempt to achieve one or more of the determined goals. For example, a basic and common goal may be to make the speaker happy. In some embodiments, a goal predicate is determined based on the one or more goals. In various embodiments, the determined goal is based on the needs of the speaker and determined using the input sentence and goal hierarchy. For example, a goal hierarchy may be represented as a goal hierarchy tree where nodes in the tree correspond to the speaker's needs. The goals may be ranked. For example, each goal within the sub-tree may be assigned a score based on how urgent the goal needs to be satisfied. Using the goal rankings, one or more goals may be selected and the selected goals may be prioritized.

At 305, supporting knowledge is retrieved. In various embodiments, the supporting knowledge retrieved is based on the talk mode of the input received at 301. For example, a query and/or conversation talk mode retrieves supporting knowledge based at least on previous conversations. In various embodiments, the retrieved supporting knowledge is provided to a subsequent module, such as a planner module for artificial intelligence (AI) planning to generate a response appropriate for the received input. In various embodiments, the retrieved supporting knowledge is ranked. For example, the ranking is used to prioritize the knowledge.

In some embodiments, the supporting knowledge retrieved is based on a quiz talk mode. For example, in a quiz talk mode, supporting knowledge is retrieved based on the quiz subject. In some embodiments, the supporting knowledge retrieved is information for administering an IQ quiz session. In some embodiments, the retrieved information is based on the current IQ quiz state.

At 307, artificial intelligence (AI) planning rules are created. For example, based on the supporting knowledge retrieved at 305, planning rules are created that may be utilized for AI planning problem creation. In some embodiments, the created rules are based on the priority assigned to each set of data of the retrieved supporting knowledge. For example, in some embodiments, each set of data retrieved is assigned a rank. The supporting knowledge is then prioritized using AI planning rules. In some embodiments, the rules created are used to map retrieved supporting data to an event, such as a user's voice query. In some embodiments, the rules are based on the characteristics of the event. In various embodiments, the resulting rules are provided to an AI planning problem generator step such as step 207 of FIG. 2.

Figure 4:
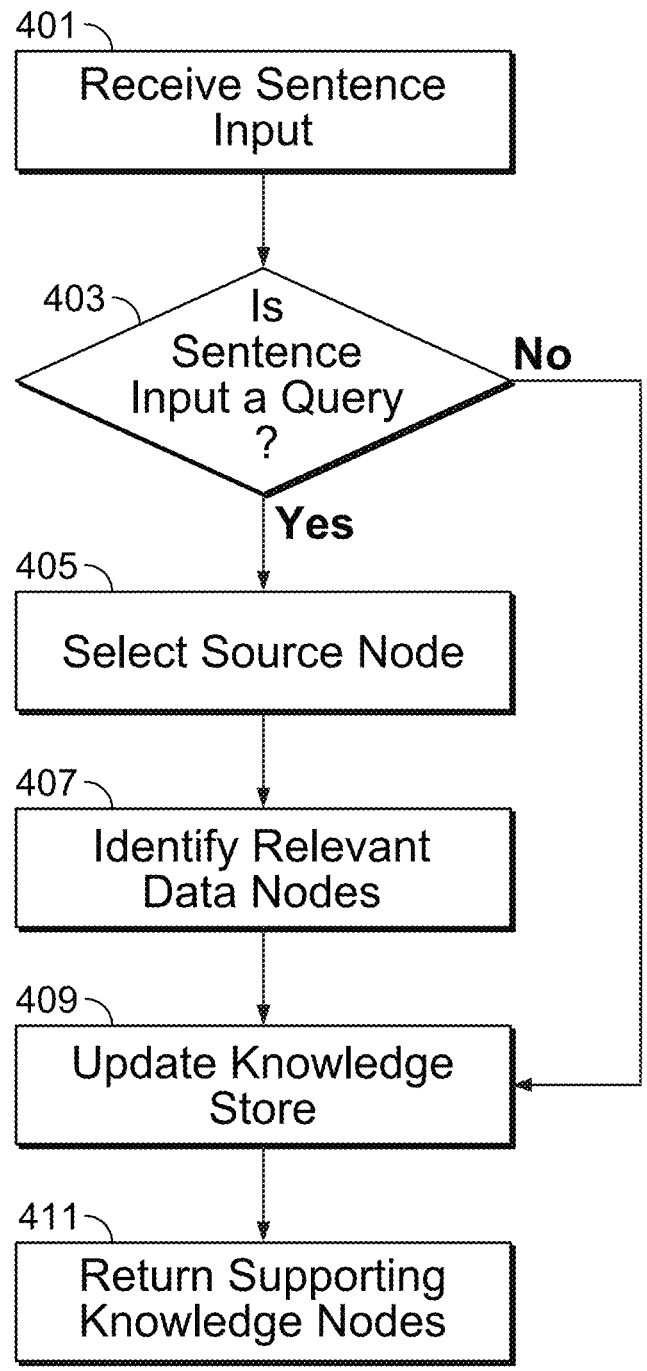
FIG. 4 is a flow diagram illustrating an embodiment of a process for identifying supporting knowledge.

FIG. 4 is a flow diagram illustrating an embodiment of a process for identifying supporting knowledge. In various embodiments, the process of FIG. 4 is performed by an adaptive, interactive, and cognitive reasoner to identify supporting knowledge from a memory graph data structure. For example, an adaptive, interactive, and cognitive reasoner performs the process of FIG. 4 using a knowledge store to help generate a voice response to a voice input event. In some embodiments, the process of FIG. 4 is performed at 305 of FIG. 3.

At 401, a sentence input is received. In some embodiments, the sentence input is a sentenced processed using a natural language understanding module. In various embodiments, the received sentence input includes component information such as identified parts of speech, lemmas (e.g., subject, predicate, and/or object lemma), coreference relationships, and performative classification, among others.

At 403, a determination is made whether the sentence input is a query. For example, the input sentence received at 401 is evaluated to determine whether the input is a query such as a question to the autonomous robotic system. In some embodiments, the determination utilizes the performative classification of the input sentence. For example, a sentence input includes a performative classification that identifies the sentence as a type of query performative (e.g., query-if, query-ref, etc.) or as an inform performative. In some embodiments, the performative classification utilizes the Foundation for Intelligent Physical Agents-Agent Communication Language (FIPA-ACL) for performative classification. In response to a sentence input that is a query, processing continues to 405. In response to a sentence that is not a query, such as an informative sentence, processing continues to 409.

At 405, a source node is selected from a knowledge store. In various embodiments, a source node is selected from a knowledge store such as a memory graph data structure based on the identified speaker. For example, a speaker related to the sentence input is identified and the source node corresponding to the speaker is selected. In various embodiments, a knowledge store is partitioned by speakers such that knowledge data can be accessed by speaker identity. For example, for an autonomous robotic system that has interacted with two different users, Alice and Bob, at 405, the source node for Alice is selected in response to a query initiated by Alice and the source node for Bob is selected in response to a query initiated by Bob. In various embodiments, a source node is selected since an autonomous robotic system partitions stored knowledge data by user and/or agent. For example, the knowledge data associated with each user includes user information related to that user's conversation history with the autonomous robotic system. In some embodiments, agents include the autonomous robotic system itself and may include other robotic agents acting autonomously.

In various embodiments, the knowledge store stores a history of conversations that the system has engaged in. In some embodiments, the knowledge store includes information captured by sensors such as location, time, weather, etc. In some embodiments, a declarative memory holds the system's knowledge about the world and itself. In various embodiments, the knowledge store is implemented using a memory graph data structure.

At 407, relevant data nodes are identified. For example, data nodes of a knowledge store, such as a memory graph data structure, are identified and made candidates for retrieval. In various embodiments, the nodes are either (1) filtered and removed because they are not relevant or (2) selected as relevant to the sentence input. In some embodiments, the selected data nodes are ranked to determine a priority.

In some embodiments, the identification of the data nodes includes several filtering and data retention steps. In some embodiments, the nodes of a memory graph data structure are traversed to identify relevant data nodes. Relevant nodes are retained and irrelevant nodes are filtered from consideration. In various embodiments, the identified nodes are collected and utilized as supporting knowledge.

In various embodiments, the knowledge store is implemented using a memory graph data structure. In some embodiments, each user's sentences are saved in the memory graph under a user identifier. In some embodiments, a root node exists for each user identifier. For example, Alice's sentences are saved under a node tree identified by Alice's user identifier and Bob's sentences are saved under a separate node tree identified by Bob's user identifier. In some embodiments, nodes corresponding to word components of sentences may reference one another. For example, two sentences containing the word "Charles" may reference the same word node. In various embodiments, sentences are saved using a triple format. For example, a triple format may identity a subject, object, and predicate.

In some embodiments, data stating negative facts are removed as candidates for supporting knowledge. For example, a recorded sentence "I am not Tom" is removed as a candidate and is not supporting knowledge. As another example, "He is not hungry" is removed as a candidate and is not supporting knowledge because it states a negative fact. In some embodiments, negatives are preserved for later use. For example, in some embodiments, the negative fact is converted into a positive fact. The positive fact is then utilized as a candidate for matching.

In some embodiments, certain special cases are identified and the associated knowledge node is retained as a candidate for supporting knowledge. In some embodiments, these nodes contain data that cannot be initially dismissed as not supporting knowledge and that is not an immediate match (e.g., a subject-verb-object and/or part of speech match). By preemptively retaining these nodes, their relationship to the sentence input can be determined after additional filtering is performed. For example, in some embodiments, informative statements and/or fact statements are preemptively retained.

In some embodiments, data that is negated by a negative fact is removed from consideration as relevant knowledge data. For example, a user makes the statement "My hobby is programming" followed by the statement "My hobby is not programming." The later negative fact statement negates the first statement and the first statement is removed. In various embodiments, in response to a more recent statement that negates an initial statement, the initial statement is removed as possible relevant knowledge.

In some embodiments, subject-verb-object (SVO) matching is performed to identify relevant supporting knowledge nodes. For example, subjects, verbs, and objects of sentences that match the sentence input are identified and retained as candidate supporting knowledge nodes. Conversely, subjects, verbs, and objects of sentences that do not match the sentence input are discarded from consideration as supporting knowledge nodes. For example, the input sentence "I like fruit" contains the SVO triple "I, like, fruit" and an exemplary sentence "I like skiing" stored in a node of an exemplary knowledge store contains the SVO triple "I, like, skiing." In the example, the subjects and verbs match since both use the subject "I" and the verb "like." However, the candidate node is discarded as supporting knowledge because the objects do not match (i.e., "fruit" and "skiing" are different objects). In various embodiments, Subject-predicate-object (SPO) matching is performed on the lemmas of the words. In some embodiments, parts of speech (POS) matching is utilized. For example, the same parts of speech are analyzed to determine whether a match exists.

In some embodiments, after two sentences are compared, for example, using subject-verb-object (SVO) matching, any non-matching pairs are analyzed for co-reference relationships. Co-reference analysis is performed on the non-matching pair(s) to determine whether they have a particular semantic relationship. For example, in the event that the subjects of two sentences do not initially match, the subject components are candidates for co-reference analysis. In various embodiments, a lexical database, including a remote database, is used to determine whether a co-reference relationship exists. For example, in some scenarios, a synonym relationship exists between two words. As another example, the sentence input word is a hypernym of a word referenced by a knowledge node. In some embodiments, the lexical database is WordNet.

In some embodiments, the sentence input is analyzed and matches are made using synonym relationships. For example, using a lexical database such as WordNet, words that are synonyms, such as "right" and "correct," are matched. As another example, the words "nice" and "good" are matched. By identifying synonyms, synonyms are matched using the techniques described herein such as subject-verb-object (SVO) and parts of speech (POS) matching to select candidate relevant knowledge nodes.

In various embodiments, the sentence input is analyzed and matches are made using a hypernym relation. For example, using a lexical database such as WordNet, a word with a broader meaning (e.g., fruit) is related to one or more words that are more specific (e.g., apples, oranges, and pineapples, etc.). In some embodiments, a hypernym is a word that is a generic term that is used to designate a whole class of specific instances. In various embodiments, hypernyms are identified based on a lexical database and used to identify relevant supporting knowledge nodes. For example, a node with the object "fruit" matches a stored knowledge node with the object "apples" (as long as the subject and verb parts also match) because the input sentence object "fruit" is a hypernym of "apples." As another example, the word "animal" is a hypernym of the word "mammal" and may be used to identify matches for a particular subject or object.

In some embodiments, hypernyms are utilized to derive hypernym relationships. In some embodiments, a derived hypernym relationship is identified by determining whether a word has the same or equivalent meaning of the hypernym of a word. For example, an analysis for a derived hypernym determines that the hypernym of the word "red" has the same meaning as the word "color." Nodes using the word "red" are candidates for matching "color." In an example scenario, a knowledge store includes a node corresponding to the sentence "My hair is red." The sentence input "What color is your hair?" returns supporting knowledge that the correct answer for the color is "red." The analysis for a derived hypernym determines that the hypernym of the word "red" has the same meaning as the word "color."

In some embodiments, the lexical database utilized is the WordNet or similar database. For example, synonyms relationships may be based on synset relationships defined using WordNet. In some embodiments, a synonym matches only if the synonym is within a configured synset range. Words outside the synset range are not considered matches. For example, a synonym relationship is determined in the event a word is within a configured synset range (e.g., a range of 5). Words outside the range are considered obscure forms and are not match material for determining supporting knowledge. In various embodiments, synonyms match only if the parts of speech match as well. In various embodiments, an additional check may be made to require that a fact adjective is derivationally contained in the query noun.

In various embodiments, relevant knowledge nodes can be constructed from information retrieved from a remote lexical database. For example, the answers to questions based on what, where, who, and is queries utilize information from a lexical database such as WordNet. In various embodiments, a query modifier (e.g., what, where, who, and is) is identified and a query structure is compared to determine the query type. For example, in some embodiments, a question initiated with a "What" query modifier is checked to determine that it is composed of "what," "is," and an object (e.g., "What is a lion?"). The definition from a lexical database is retrieved and used as supporting knowledge. In some embodiments, a question initiated with a "Where" query modifier is checked to determine that it is composed of "where," "is," and an object (e.g., "Where is Seoul?"). The part holonym (e.g., South Korea) of the object is determined from a lexical database and used as supporting knowledge. In some embodiments, a question initiated with a "Who" query modifier is checked to determine that it is composed of "who," "is," and an object (e.g., "Who is Obama?"). The definition of the object is determined from a lexical database and analyzed to determine if the definition is about a person. In the event the response is about a person, the definition is used as supporting knowledge. In some embodiments, a question initiated with an "Is" query modifier is checked to determine that it is composed of "is," a subject, and an object (e.g., "Is a lion an animal?"). A lexical database is used to determine whether the object is a hypernym of the subject and the result is used as supporting knowledge.

In some embodiments, the candidate relevant supporting knowledge nodes are prioritized based on a rank. For example, a first sentence contains the words "I like red" and a second sentence contains the words "I like blue." Both sentences are relevant to the query sentence "What is my favorite color?" and their respective knowledge nodes are relevant supporting knowledge. In various embodiments, the relevant nodes are ranked. In some embodiments, the nodes are ranked based on date. For example, in one configuration, earlier nodes are ranked lower than later nodes. In another configuration, earlier nodes are ranked higher than later nodes. As an example, by configuring later nodes to have higher priority, a response to the query sentence "What is my favorite color?" prioritizes the knowledge node with the color blue since that node has a higher priority due to its more recent date. In various embodiments, only the most recent data node (i.e. the most fresh) is retained as a candidate relevant knowledge. In various embodiments, the priority assigned to the nodes may be configurable and/or trained based on expected results.

In various embodiments, additional filtering and/or selecting technique may be implemented to improve the accuracy and/or performance of retrieving supporting knowledge nodes. In some embodiments, one or more of the above techniques may be implemented together in the sequence described or in another appropriate sequence.

At 409, the knowledge store is updated. In various embodiments, the knowledge store is updated based on the retrieved relevant data. For example, one or more additional nodes are added and/or linked based on the input sentence. In some embodiments, the input sentence is inserted into the knowledge store. For example, nodes corresponding to the input sentence are inserted into a memory graph. In various embodiments, related nodes are associated and/or shared. For example, a node corresponding to a person's name from an input sentence is linked to a node associated with a second sentence that utilizes a pronoun (e.g., "I") in place of the same person's name.

At 411, supporting knowledge nodes are returned as output. In various embodiments, the supporting knowledge nodes are references to nodes in a memory graph and include relevance ranking information. In some embodiments, a reference to the nodes of a memory graph is returned. For example, a reference to the data nodes corresponding to supporting knowledge are returned and no copies of the nodes are made. In some embodiments, the relevant knowledge nodes are selected by a unique identifier of the data node. In various embodiments, data nodes of a knowledge store, such as a memory graph, are accessible using the unique identifiers. For example, an artificial intelligence planner can access the relevant knowledge nodes using the set of unique identifiers for the relevant nodes. In some embodiments, a relevant sentence is identified using a node number of the node containing the relevant sentence.

Figure 5A:
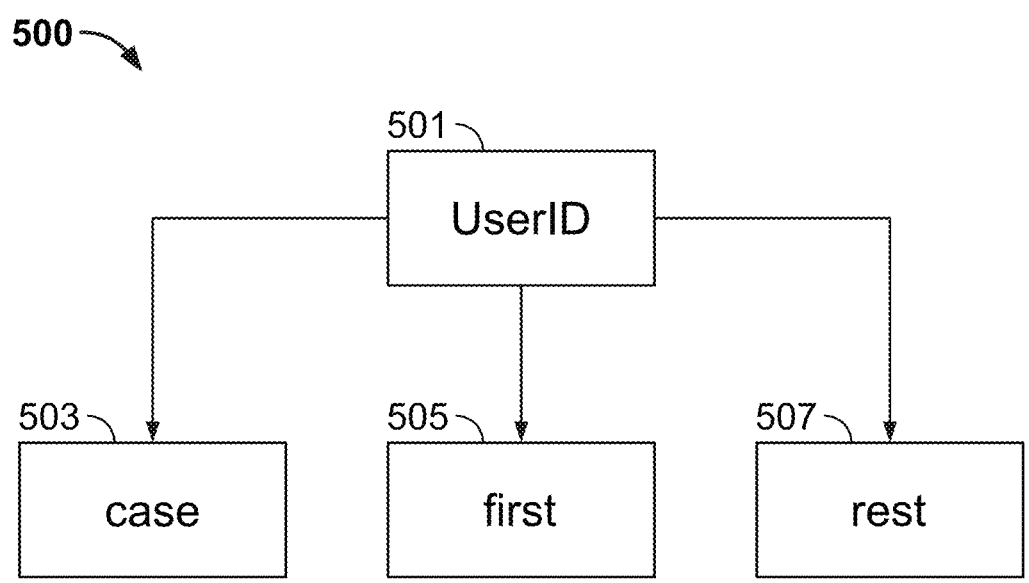
FIG. 5A is a diagram illustrating an example of a memory graph data structure.

FIG. 5A is a diagram illustrating an example of a memory graph data structure. In the example shown, memory graph data structure 500 is an empty memory graph. For example, memory graph data structure 500 represents an initialized memory graph of an autonomous robotic system. In some embodiments, a memory graph data structure includes UserID node 501, case node 503, first node 505, and rest node 507. In various embodiments, UserID node 501 is the root node for a particular user. In some embodiments, UserID node 501 includes a unique user identifier for the referenced user and supporting knowledge associated with the user is stored under UserID node 501. In the example shown, case node 503 is a node associated with cases for previously saved problems and their respective solutions along with additional context. In the example show, there are no solved cases saved in memory graph data structure 500. First node 505 and rest node 507 are nodes for storing new input sentences when they are received. In some embodiments, data associated with first node 505 corresponds to a single input sentence.

In some embodiments, a rest node such as rest node 507 is used to reference additional nodes. For example, a first sentence is recorded under a free first node such as first node 505 and subsequent sentences are recorded under its corresponding rest node such as rest node 507. In various embodiments when no free first node is available, a new sentence is inserted into a memory graph data structure by creating a new first node and a new rest node under an empty rest node. The new sentence is then inserted using the newly created first node. Subsequent new sentences utilize a similar process using the newly created rest node.

In some embodiments, a different root node for each user that interfaces with the autonomous robotic system exists in the memory graph structure. In some embodiments, the autonomous robotic system has its own root node for storing supporting knowledge including output responses by the system. In various embodiments, the root nodes are identified using a unique user identifier. In some embodiments, the sub-trees of each root node can share and/or reference the same nodes. For example, different sub-trees can reference the same supporting knowledge node.

Figure 5B:
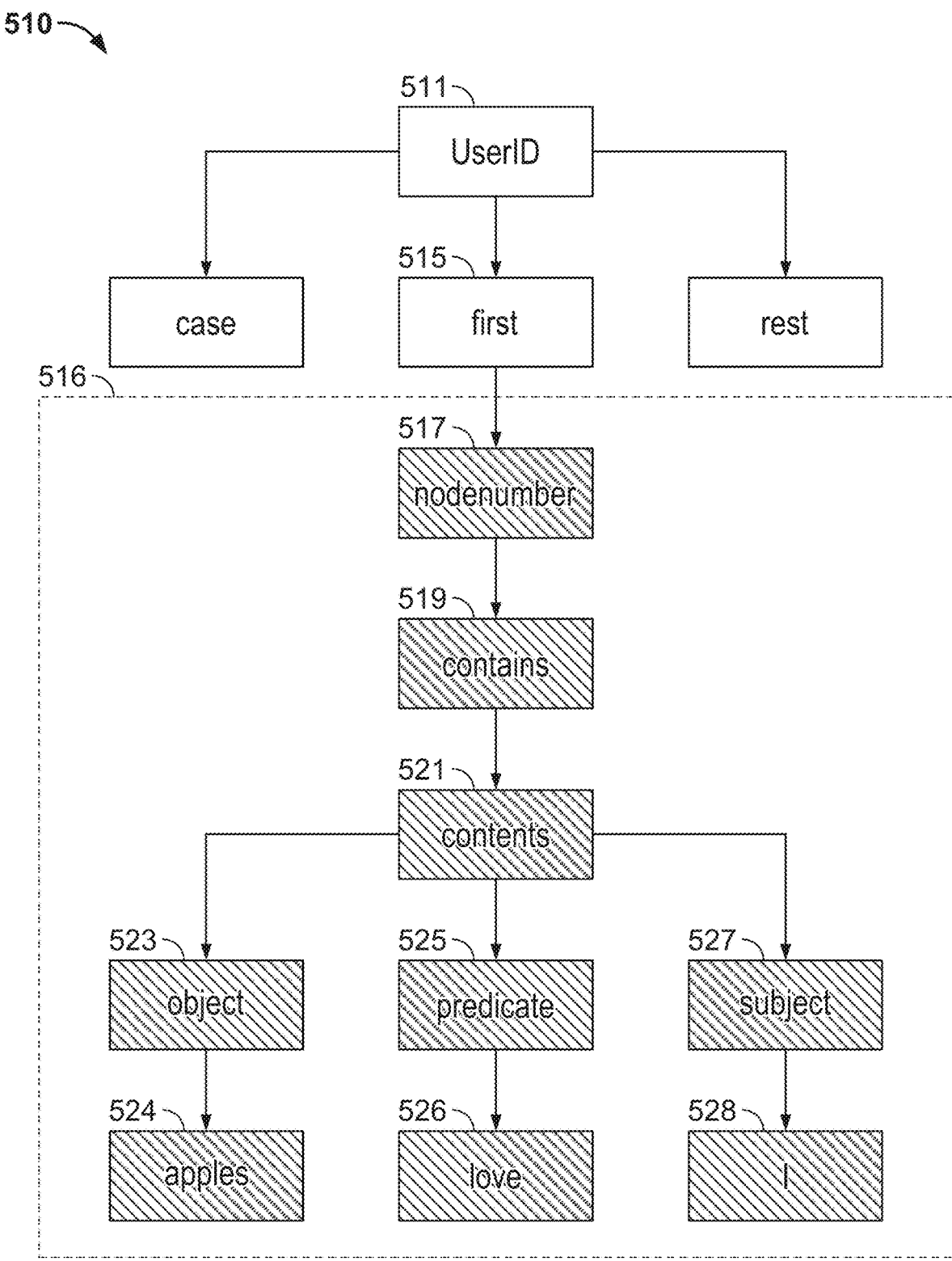
FIG. 5B is a diagram illustrating an example of a memory graph data structure.

FIG. 5B is a diagram illustrating an example of a memory graph data structure. In the example shown, memory graph data structure 510 is memory graph data structure 500 of FIG. 5A after the sentence "I love apples" is spoken by a user and processed by a reasoner. In the example, the input sentence is an informative sentence and not a query. Memory graph data structure 510 includes at least the nodes UserID node 511, first node 515, node-number node 517, contains node 519, contents nodes 521, object node 523, "apples" node 524, predicate node 525, "love" node 526, subject node 527, and "I" node 528. The sentence "I love apples" is converted to a triple using the processes described herein and represented by input sentence tree 516. Input sentence tree 516 includes the nodes shown within the dotted boundary lines. Input sentence tree 516 includes the nodes node-number node 517, contains node 519, contents nodes 521, object node 523, "apples" node 524, predicate node 525, "love" node 526, subject node 527, and "I" node 528. In some embodiments, UserID node 511 is UserID Node 501 of FIG. 5A.

In various embodiments, a new input sentence tree is inserted into a memory graph data structure at a first node. In the example shown, input sentence tree 516 is inserted into memory graph data structure 510 using first node 515. In various embodiments, a new sentence tree is inserted into a memory graph data structure at the first available first node. In some embodiments, a first node is nested under a rest node. In some embodiments, a first node is created under a free rest node.

In the example shown, node-number node 517 includes a node number that uniquely identifies the input sentence represented by input sentence tree 516. Contains node 519 is a container node that encapsulates the contents associated with input sentence tree 516. Contents node 521 is a contents nodes that may be used to reference the contents associated with the sentence. For example, a reference (such as a pointer) to contents node 521 may be used to retrieve the contents of the sentence. Under contents node 521, subject, object, and predicate nodes point to classified components of the input sentence. Contents node 521 references object node 523, predicate node 525, and subject node 527. Object node 523 references the object of the sentence, the word "apples," by referencing "apples" node 524. Predicate node 525 references the predicate of the sentence, the word "love," by referencing "love" node 526. Subject node 527 references the subject of the sentence, the word "I," by referencing "I" node 528. In various embodiments, each sentence tree inserted into a memory graph data structure utilize a structure similar to the one described above with respect to input sentence tree 516.

Figure 5C:
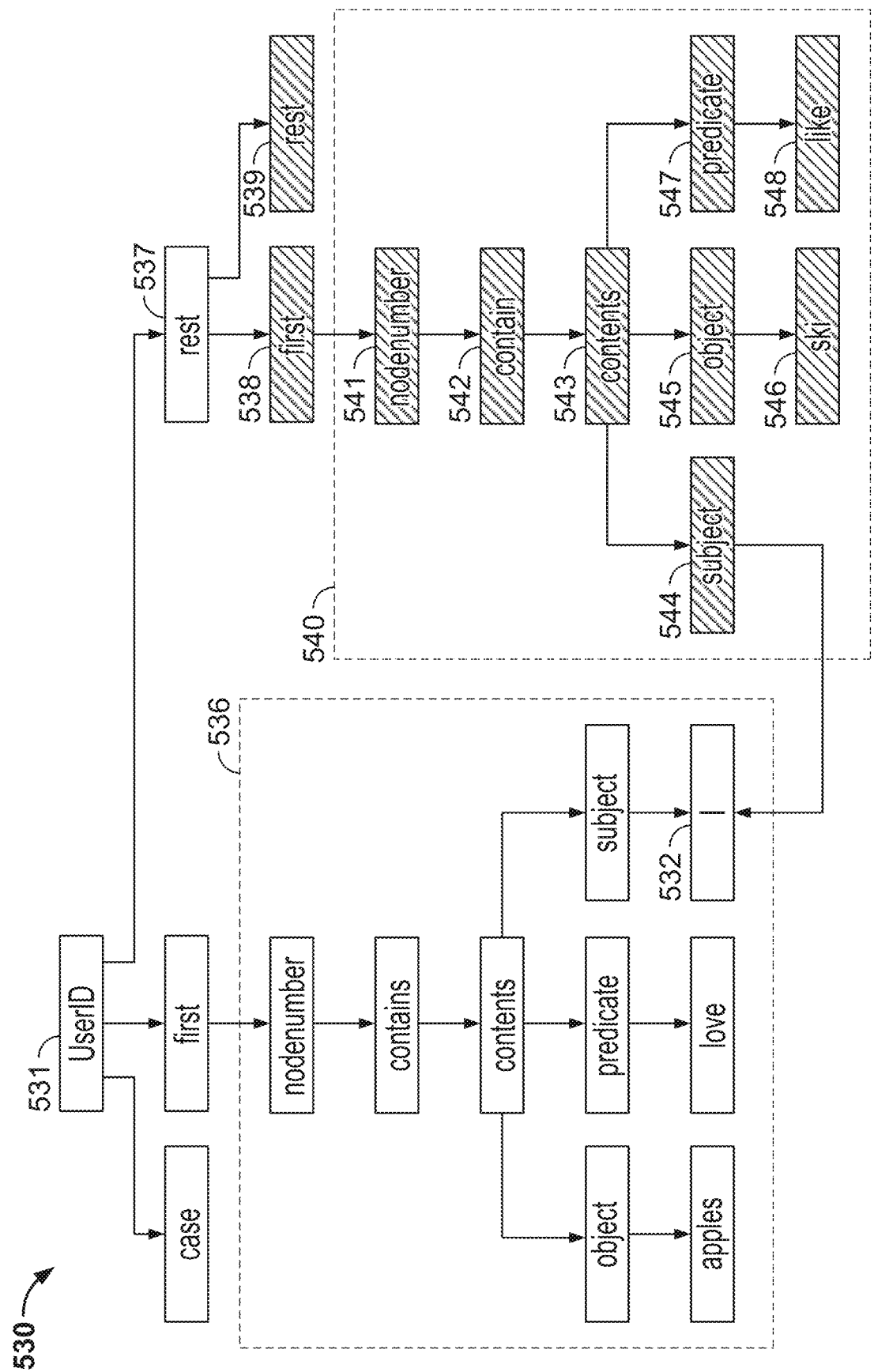
FIG. 5C is a diagram illustrating an example of a memory graph data structure.

FIG. 5C is a diagram illustrating an example of a memory graph data structure. In the example shown, memory graph data structure 530 is memory graph data structure 510 of FIG. 5B after the sentence "I like skiing" is spoken by the user and processed by a reasoner. In the example, the input sentence is an informative sentence and not a query. Memory graph data structure 530 includes previously inserted input sentence tree 536 corresponding to the sentence "I love apples" and newly inserted input sentence tree 540 corresponding to the sentence "I like skiing." Input sentence tree 540 is identified by a unique node number that is associated with node-number node 541. First node 538 and rest node 539 are new nodes appended to rest node 537 as a location for inserting additional sentences. Input sentence tree 540 is inserted at first node 538 and a future input sentence can be inserted at rest node 539. In various embodiments, at each rest node a new first node and rest node are added for saving new input sentences.

In the example shown, inserted sentence tree 540 includes node-number node 541, contains node 542, contents nodes 543, subject node 544, "I" node 532, object node 545, "ski" node 546, predicate node 547, and "like" node 548. The sentence "I like skiing" is converted to a triple using the processes described herein and represented by input sentence tree 540. Subject node 544 references the subject of the sentence, the word "I," by referencing "I" node 532. Object node 545 references the object of the sentence, the word "skiing," by referencing "ski" node 546. In various embodiments, the lemma of a word is used. For example, "ski" node 546 contains the lemma of the word "skiing." Predicate node 547 references the predicate of the sentence, the word "like," by referencing "like" node 548.

In the example shown, input sentence trees 536 and 540 both contain a reference to "I" node 532. Input sentence tree 536 includes the nodes shown within its dotted boundary lines. Input sentence tree 540 includes the nodes shown within its dotted boundary lines and in addition includes "I" node 532. In some embodiments, the "I" from input sentence tree 536 (for the sentence "I love apples") and the "I" from input sentence tree 540 (for the sentence "I like skiing") are matches and a reference to the same node is used instead of duplicating nodes. In some embodiments, this matching is performed by a reasoning module.

In some embodiments, UserID node 531 is 501 of FIG. 5A and 511 of FIG. 5B. In some embodiments, first input sentence tree 536 is input sentence tree 516 of FIG. 5B. In some embodiments, "I" node 532 is "I" node 528 of FIG. 5B.

Figure 5D:
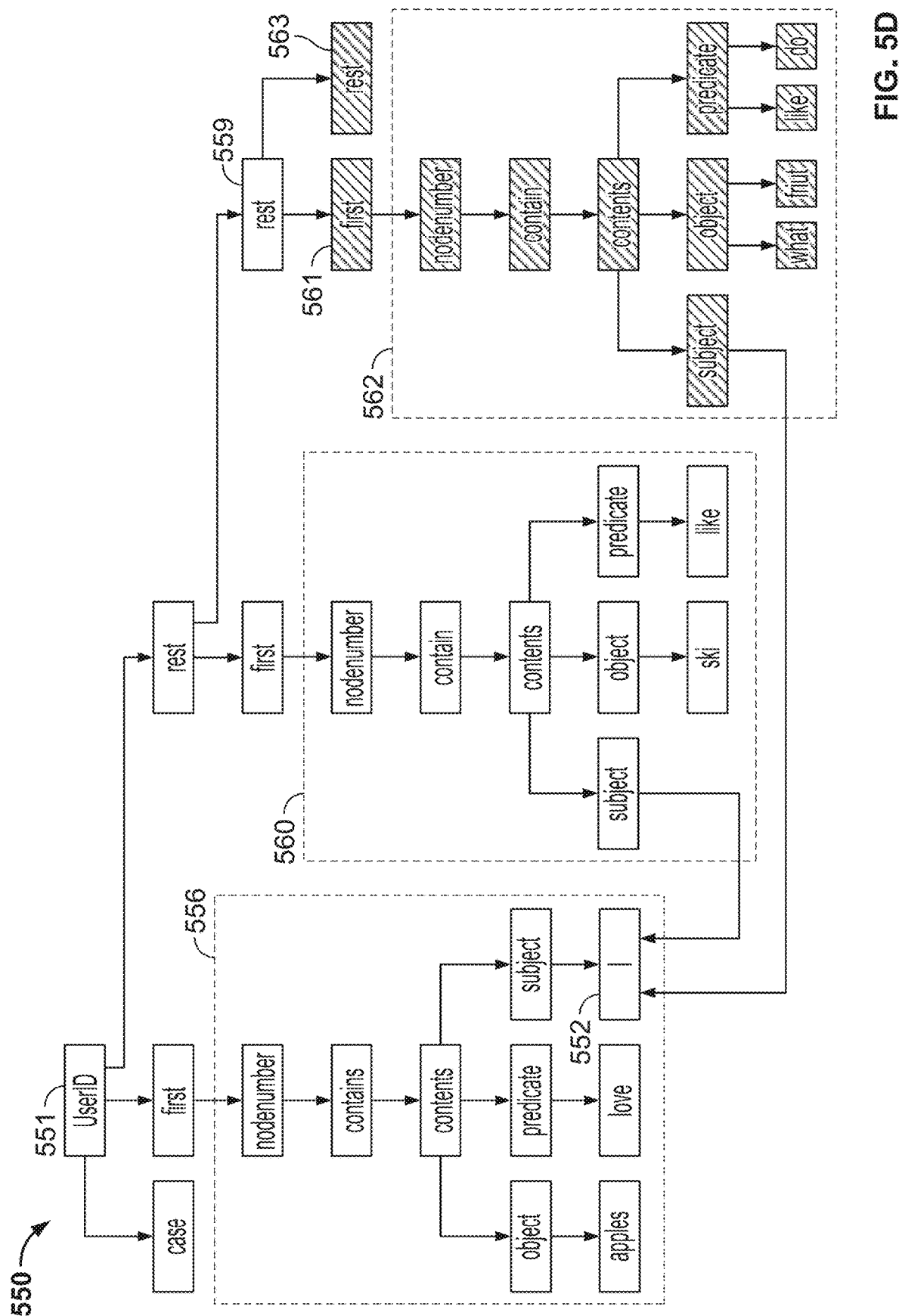
FIG. 5D is a diagram illustrating an example of a memory graph data structure.

FIG. 5D is a diagram illustrating an example of a memory graph data structure. In the example shown, memory graph data structure 550 is memory graph data structure 530 of FIG. 5C after the sentence "What fruit do I like?" is asked as a query by the user and processed by a reasoner. In some embodiments, the input sentence is associated with a query-ref performative. Memory graph data structure 550 includes previously inserted input sentence tree 556 corresponding to the sentence "I love apples," previously inserted input sentence tree 560 corresponding to the sentence "I like skiing," and newly inserted input sentence tree 562 corresponding to the query sentence "What fruit do I like?." First node 561 and rest node 563 are new nodes added to rest node 559 as a location for saving additional sentences. Input sentence tree 562 is inserted at first node 561 and a future input sentence can be inserted under newly created rest node 563. In various embodiments, at each rest node a new first node and rest node are added for saving new input sentences.

Using the processes described herein, the query sentence "What fruit do I like?" is converted to a triple and represented by the input sentence tree 562. Input sentence trees 556, 560, and 562 each include the nodes shown within their respective dotted boundary lines and in addition each includes "I" node 552. In some embodiments, UserID node 551 is 501 of FIG. 5A, 511 of FIG. 5B, and 531 of FIG. 5C. In some embodiments, input sentence tree 556 is input sentence tree 516 of FIG. 5B and 536 of FIG. 5C. In some embodiments, input sentence tree 560 is input sentence tree 540 of FIG. 5C. In some embodiments, "I" node 552 is "I" node 528 of FIG. 5B and 532 of FIG. 5C.

Figure 5E:
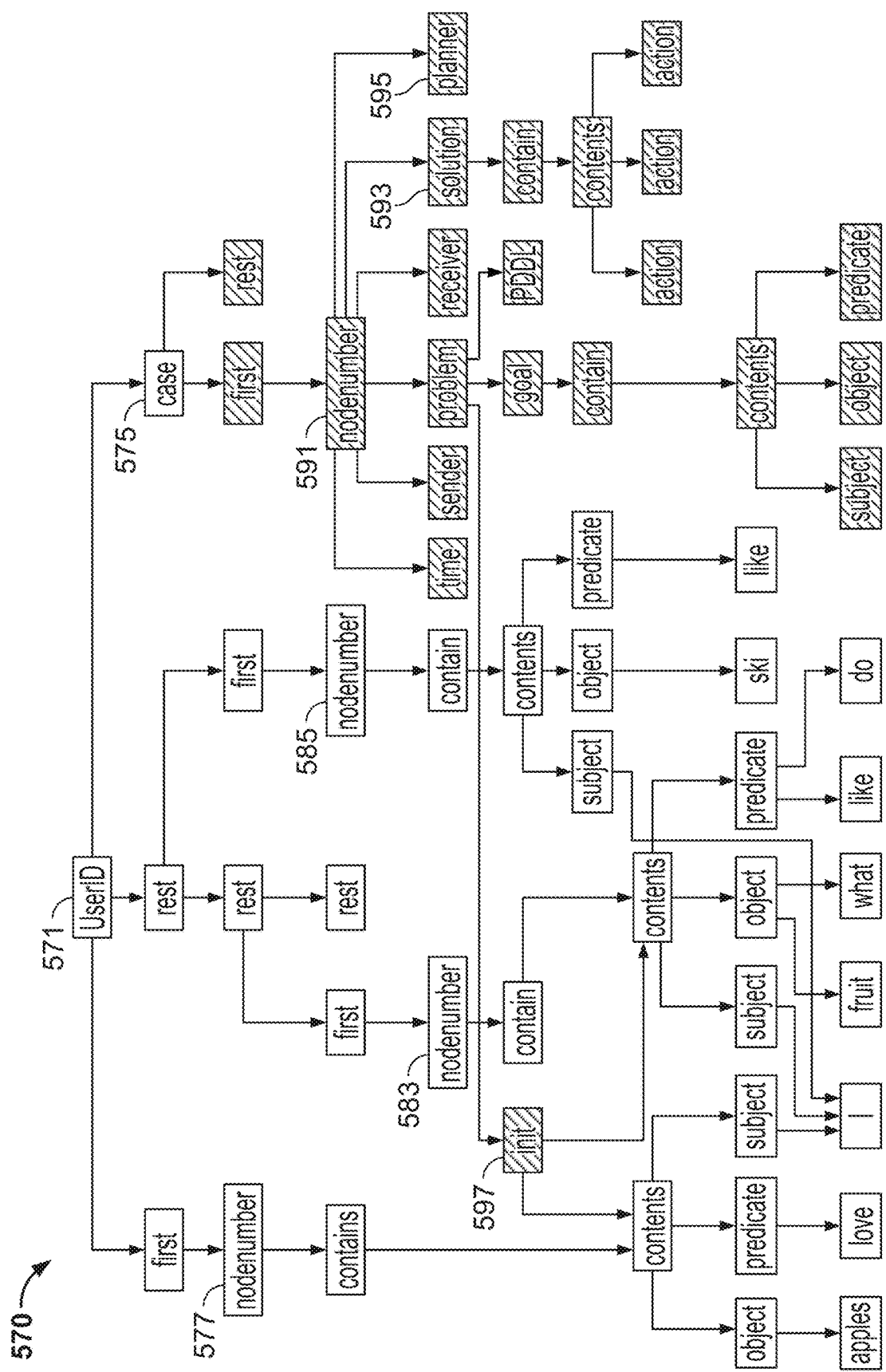
FIG. 5E is a diagram illustrating an example of a memory graph data structure.

FIG. 5E is a diagram illustrating an example of a memory graph data structure. In the example shown, memory graph data structure 570 is memory graph data structure 550 of FIG. 5D after the solution to the query sentence "What fruit do I like?" is solved and stored as a case in memory graph data structure 570. Memory graph data structure 570 includes a previously inserted input sentence tree corresponding to the sentence "I love apples" with root node-number node 577, a previously inserted input sentence tree corresponding to the sentence "I like skiing" with root node-number node 583, a previously inserted query input sentence tree corresponding to the query sentence "What fruit do I like?" with root node-number node 585, and case node 591 that corresponds to the solution of the query input sentence.

In various embodiments, user problems that are solved are saved in a memory graph data structure as cases. In various embodiments, the cases are reused when similar and/or identical problems are encountered. In the example, node-number node 591 is inserted into memory graph data structure 570 at case node 575. Node-number node 591 references a particular case that corresponds to a problem, solution, and context. In various embodiments, cases are inserted using a node-number node under the case node of the relevant user. Node-number node 591 includes multiple nodes. The nodes include at least solution node 593, planner node 595, and init node 597, among others. In some embodiments, solution node 593 is a solution sub-tree that includes a sequence of actions for solving the artificial intelligence (AI) planning problem associated with the case. In some embodiments, planner node 595 is associated with the planner used to solve the AI planning problem. In the example shown, init node 597 is linked to a parent node (not numbered) labeled as "problem" that represents the AI planning problem. Init node 597 contains links to supporting knowledge nodes that include the contents corresponding to the sentences "I love apples" and "What fruit do I like?" Init node 597 does not contain a link to the sentence "I like skiing" because it is not relevant to the problem. The lemma object "ski" and "fruit" do not match and are not determined to be related.

In some embodiments, a case includes at least the problem and the sequence of actions that was used to solve the problem. In some embodiments, the case includes time, sender, problem, receiver, solution, and planner information. In some embodiments, the problem includes a goal expressed using a subject, object, and predicate. In some embodiments, the problem includes supporting knowledge nodes. In some embodiments, the problem is described using an artificial intelligence (AI) planning language. In some embodiments, the solution includes a sequence of actions to solve the AI planning problem. In some embodiments, a case based reasoning (CBR) module is utilized to identify the appropriate case saved in memory graph data structure 570. In some embodiments, the identification of the case is performed at 107 of FIG. 1.

In various embodiments, more or fewer nodes may be used to represent the described data structures of FIGS. 5A-E. For example, in some embodiments (not shown), a contents node may contain a field that stores an object reference that points to a node that stores the object instead of using an intermediary object node.

FIG. 6 is a functional block diagram illustrating an embodiment of an autonomous robotic system for responding to voice input using an adaptive, interactive, and cognitive reasoner. In the example shown, autonomous robotic system 600 includes speech recognition (SR) module 601, natural language understanding (NLG) module 603, reasoner module 605, memory graph 607, problem generator 609, artificial intelligence (AI) planner 611, case based reasoning (CBR) module 613, executor module 615, and natural language generator (NLG) module 617. In various embodiments, the functional components shown may be used to implement the processes of FIGS. 1-4. Additional functionality, such as connectivity between functional components is not shown. In some embodiments, the functional components may be implemented using one or more programmed computer systems. For example, the processes of FIGS. 1-4 may be performed using one or more computer processors of one or more programming computer systems. In some embodiments, various modules and/or subsystems may be implemented on different programming computer systems. For example, modules and/or subsystems associated with reasoning module 605 and memory graph 607 may be implemented on a server and/or using a server-side implementation and speech recognition module 601 may be implemented on the local autonomous robotic system using a client-side implementation. In some embodiments, one or more subsystems and/or modules may exist on both the client and server side implementations.

In some embodiments, speech recognition (SR) module 601 is used at 101 and/or 103 of FIG. 1 and/or 201 of FIG. 2. In some embodiments, natural language understanding (NLU) module 603 is used at 103 of FIG. 1 and/or 203 of FIG. 2. In some embodiments, reasoner module 605 is used at 105 of FIG. 1 and/or 205 of FIG. 2. In some embodiments, reasoner module 605 is used to perform the processes of FIGS. 3 and 4. In some embodiments, memory graph 607 is utilized by the processes of FIGS. 1-4 including at 105 of FIG. 1; 205 of FIG. 2; 305 and/or 307 of FIG. 3; and/or 405, 407, 409 and/or 411 of FIG. 4. In some embodiments, FIGS. 5A-E are examples illustrating the contents of different states of memory graph 607. In some embodiments, problem generator 609 is used at 107 of FIG. 1 and/or 207 of FIG. 2. In some embodiments, artificial intelligence (AI) planner 611 and/or case based reasoning (CBR) module 613 are used at 107 of FIG. 1 and/or 209 of FIG. 2. In some embodiments, executor module 615 is used at 109 of FIG. 1 and/or 211 of FIG. 2. In some embodiments, natural language generator (NLG) module 617 is used at 109 of FIG. 1 and/or 213 of FIG. 2.

The functional block diagram of an autonomous robotic system shown in FIG. 6 is but an example of a system suitable for use with the various embodiments disclosed herein. Other autonomous robotic systems suitable for such use can include additional or fewer subsystems. For example, motion detection, vision input processing modules, inter-agent communication modules, etc. are not displayed in FIG. 6 but may be included in the disclosed autonomous robotic systems. As another example, motor control subsystems are not shown in FIG. 6 but may be utilized by the disclosed invention. Other systems having different functional configurations of subsystems can also be utilized.

Figure 7:
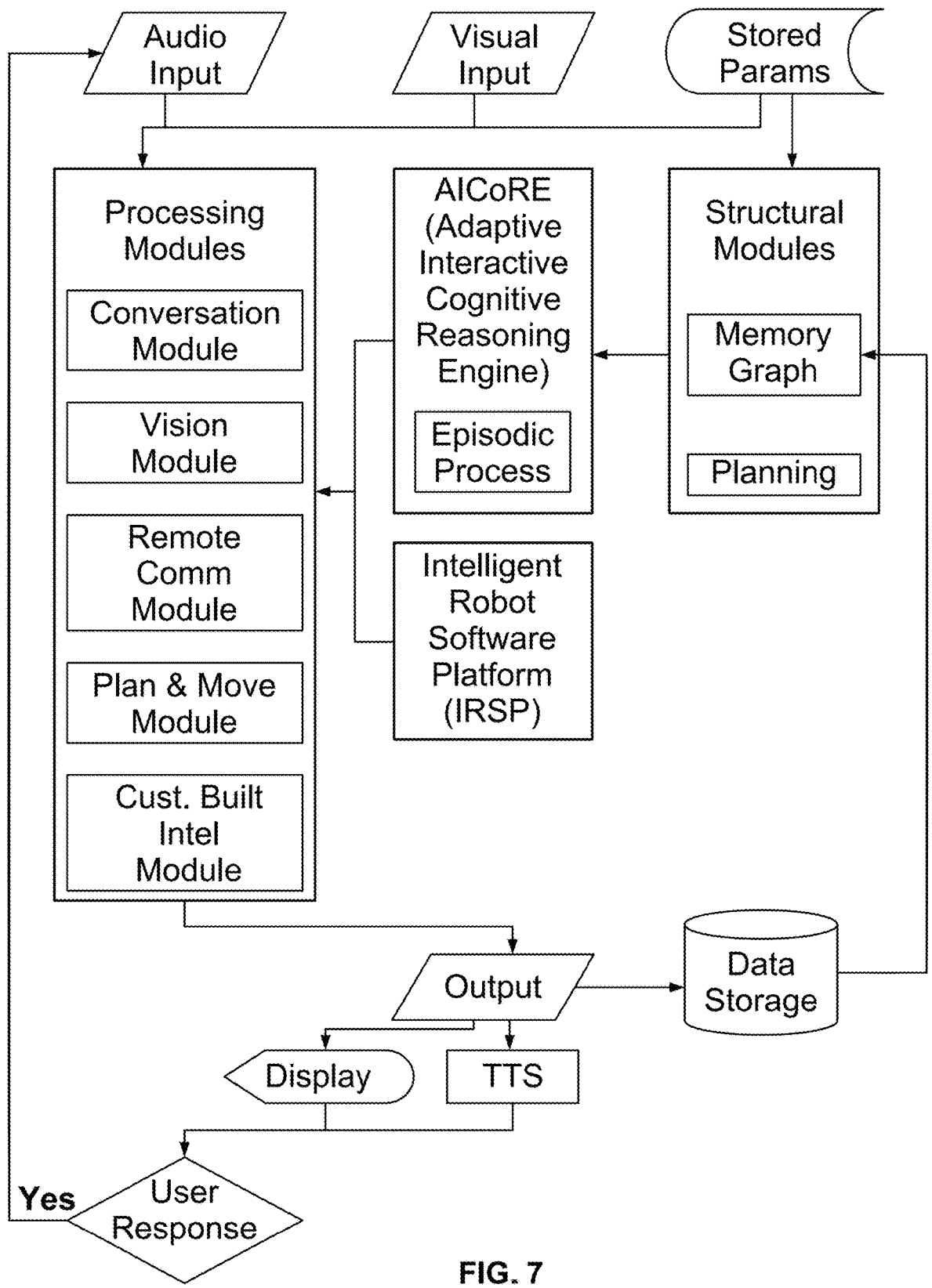
FIG. 7 is a block diagram of an embodiment of an artificial intelligence (AI) robotic system.

FIG. 7 is a block diagram of an embodiment of an artificial intelligence (AI) robotic system. FIG. 7 shows an embodiment of processing modules and components included in an artificial intelligence (AI) robotic system. In some embodiments, the AI robotic system of FIG. 7 performs the processes of FIGS. 1-4. In some embodiments, the components of FIG. 7, in particular the conversation module, the Adaptive Interactive Cognitive Reasoning Engine (AICoRE), and structural modules (memory graph and planning) correspond to functional components of FIG. 6.

Building and operating an context based interactive robot based on domain-independent reactive planning with deep convolutional neural networks is disclosed. The artificial intelligence (AI) robot that talks, listens, thinks and reasons to plan and solve tasks. The system brings educational and entertaining experience to the users by creating an atmosphere that promotes learning, socializing, and playing to enhance imagination and creativity of users. In an embodiment, a plurality of Android applications are executed.

In some embodiments, the system allows users to innovate and add capabilities via custom built intelligence.

Modules of the system may include but are not limited to:
Conversation Module
Vision Module
Remote Communication Module
Plan & Move Module
Custom Built Intelligence Module
The benefits include:
Human-like intelligence (vision and conversation):
  sees (processes visual data using computer vision technologies)
  listens (processes audio data using speech recognition technology for human voice recognition and natural language understanding)
  thinks (analyzes the given data in data structures based on artificial intelligence technologies)
  responds (visualizes graphical objects on a mobile phone based on computer graphics, generates speech segments, and mechanically operates the artificially-manufactured physical arms and electric motors)
  remembers (stores the relevant episodic data in a database) physical objects and user interactions, while imitating the sensory and cognitive processes of human beings.
  provides an intelligent social companionship to the users through these artificially designed sensory and cognitive processes
Educational: Through visual and verbal programming, users can build new skills. Intelligent Robot Software Platform (hereinafter iRSP) allows users to be engaged in an advanced level of programming
Fun: identify and follow certain physical objects like ball, and markers. The system can move around predefined paths using plan and move algorithms.
Remote communication: communicate with other mobile device such as a mobile phone, and the mobile device can be utilized to remotely control the system.
Additional benefits include:
Interaction steps with the users, in which the users can be helped to enhance their cognitive skills based on repetitive verbal training.
Follow ball, read marker capabilities
Customizable avatar
Conversational AI
Cognitive Vision
BLE
Collision avoidance system
Computer vision In some embodiments, an artificial intelligence (AI) robot is designed to provide intelligent way of enhancing IQ, an intelligent way of learning English, and a guide to easy robot programming. An exemplary embodiment may include a robot body in a form of a car and a mobile phone as the brain/engine that drives the robot. The communication between the robot body and the AI applications can be performed via a Bluetooth communication. AI Applications are available for Android and iOS systems, developed from highly sophisticated artificial intelligence techniques including natural language processing, machine learning, and computer vision.

AI Applications

The following exemplary artificial intelligence (AI) applications may be utilized to provide additional functionality.

Conversation module: This is an exemplary application that enables the user to communicate with the system in a natural way using the natural human language. This app uses a core technology, called the adaptive interactive cognitive reasoner (AICoRE). This core engine runs on the cloud and the client side of it connects through an API. In various embodiments, this module uses a speech recognition module that allows the user to communicate with the system in natural language.

Memory graph (MG): In some embodiments, a memory graph module is an additional technique to the AICoRE that enables a user to mark and retrieve past events and conversations. For example, conversations in English can be carried out with an intelligent companion using a MG module trained using the beginner level of the Cambridge English Text Book.

Vision apps module: This exemplary app uses a phone camera and processor to implement a number of vision tasks including face detection, face recognition, face tracking, marker/ball detection, and tracking. The view of a face, ball, or marker, while the system is processing functions in one of these vision modes, may be used to trigger an action or movement of the robotic body.

Custom built intelligence module: This exemplary module is also known as a build your own intelligence (BYOI) app. This exemplary app enables users to customize and control robotic actions in an easy way. Visual and verbal programming is also possible through BYOI app. In some embodiments, the BYOI uses an intelligent robot software platform (iRSP). The iRSP can be used to expand the components and functionality of the system.

Plan & Move module: This exemplary module enables the system to navigate a path that is sketched by the user that avoids collisions and obstacles. In some embodiments, this module includes a second mode of Go & Back that can move the robotic system to a destination and back to the origin with a snap taken at the destination.

Remote communication module: This exemplary a module can be used to control the robot body to navigate around.

Hardware and Firmware

In some embodiments, the system includes firmware. Future upgrades may come as updates whenever such are available. Both hardware and firmware are utilized in data communication between the robot body and the smart phone device. Notable components include one or more motors RPM/PWM, accessories (LED and ultrasonic sensor), and general mechanical parts assembly. The included motors allow movements for left, right, backward, and forward direction (e.g., precise movement performed by detecting the encoder data). The motors should operate with minimum noise.

Testing Operation Using Android App

In some embodiments, an app such as an Android app, can be used to independently test the operations of the system. The test is performed over various functions of components including an ultrasonic sensor, encoder board, motor, and LED. The exemplary testing steps for the app can be designed as follows:
1. Install the BluetoothTest apk file on the smart phone
2. Turn on the system
3. Execute "BluetoothTest" app on the smart phone
4. Follow the rest of the steps instructed in the app
5. If the connection is successful, a textview can be indicated as "Connected".
6. The last step is to control the system by touching the buttons to move and switch on/off the LED.
7. The status of the system can be seen on the top-right marked in red showing
   a. H: Headlight (LED) status whether it is ON or OFF
   b. B: Battery charge status in percentage
   c. D: Ultrasonic Sensor distance to the detected obstacle in cm.

AI Application Test Apps

In some embodiments, the system differentiates, recognizes, and remembers humans. The system processes a user's interaction in order to respond to the human's conversational dialog. One major goal of parents is to help children develop their intellectual capabilities whether they are at home or not. In some embodiments, the system may be utilized as an artificial intelligence companion for children to aid them in spending their time is the most fun and yet productive manner with respect to social and psychological aspects. An AI robot exhibits human-like cognitive intelligence such as understanding and reasoning, planning and problem solving, learning and remembering, and has the ability to take simple actions.

AI apps may be available from a publicly shared software repository, such as Google Play and Apple Store. In some embodiments, the system supports Android OS and iOS. In some embodiments, a Wi-Fi connection is necessary to perform some of its functions. In some embodiments, the system may communicate with the smart device via Bluetooth. Examples of AI apps may include:
   AI 1. Dialog system—Talk to the system. It will understand and respond to you.
   AI 2. Video analytics—Visually recognizes, differentiates, and remembers different people.
   AI 3. Plan and move module—Navigate along the drafted path.
   AI 4. Remote access module—Communicate with the system remotely
   AI 5. Build your own intelligence module—Personalize and customize the system Remote Communication Application In some embodiments, the system is able to connect to a mobile device via a communication service such as the Bluetooth service. In some embodiments, the system can also connect to two mobile devices: one as a controller and the other can be docked on the robot body. The movements of the system can be tested after the connection. For example, the system can move forward, backward, right, and left. The speed can be adjusted by using the buttons on the controls.

Adaptive Interactive Cognitive Reasoning Engine (AICoRE)

In various embodiments, one source of the power of our practical AI agent comes from two central components: a reasoning engine called the AICoRE and a human-like memory called the memory graph (MG). In some embodiments, the adaptive interactive cognitive reasoner (AICoRE) is a cognitive reasoning engine that unifies problem solving and learning. In various embodiments, AICoRe fully automates the reasoning process from end to end. In some embodiments, the AICoRE is incremental holistic human-like reasoner, covering the full spectrum of reasoning from sensing, reasoning, discovering, planning, learning, remembering until responding and performing.

In some embodiments, a central part of the problem solving mechanism is the planner. In various embodiments, the planner is an advanced multi-agent cognitive planner capable of addressing real-world problems among multiple agents.

Unlike most classical planners, which deal with physical actions only, the disclosed cognitive multi-agent planner (CMAP) is capable of dealing with both physical and cognitive (speech) actions. In various embodiments, it may be implemented in a major planning languages called planning domain definition language (PDDL).

In some embodiments, the CMAP is highly practical dealing with real world problems while interacting with multiple agents and humans. In addition, various embodiments also integrate with an incremental case-based reasoner over time. The AICoRE receives and provides data using natural language format with user but changes data structure (triple or PDDL) when processing the data.

Figure 8:
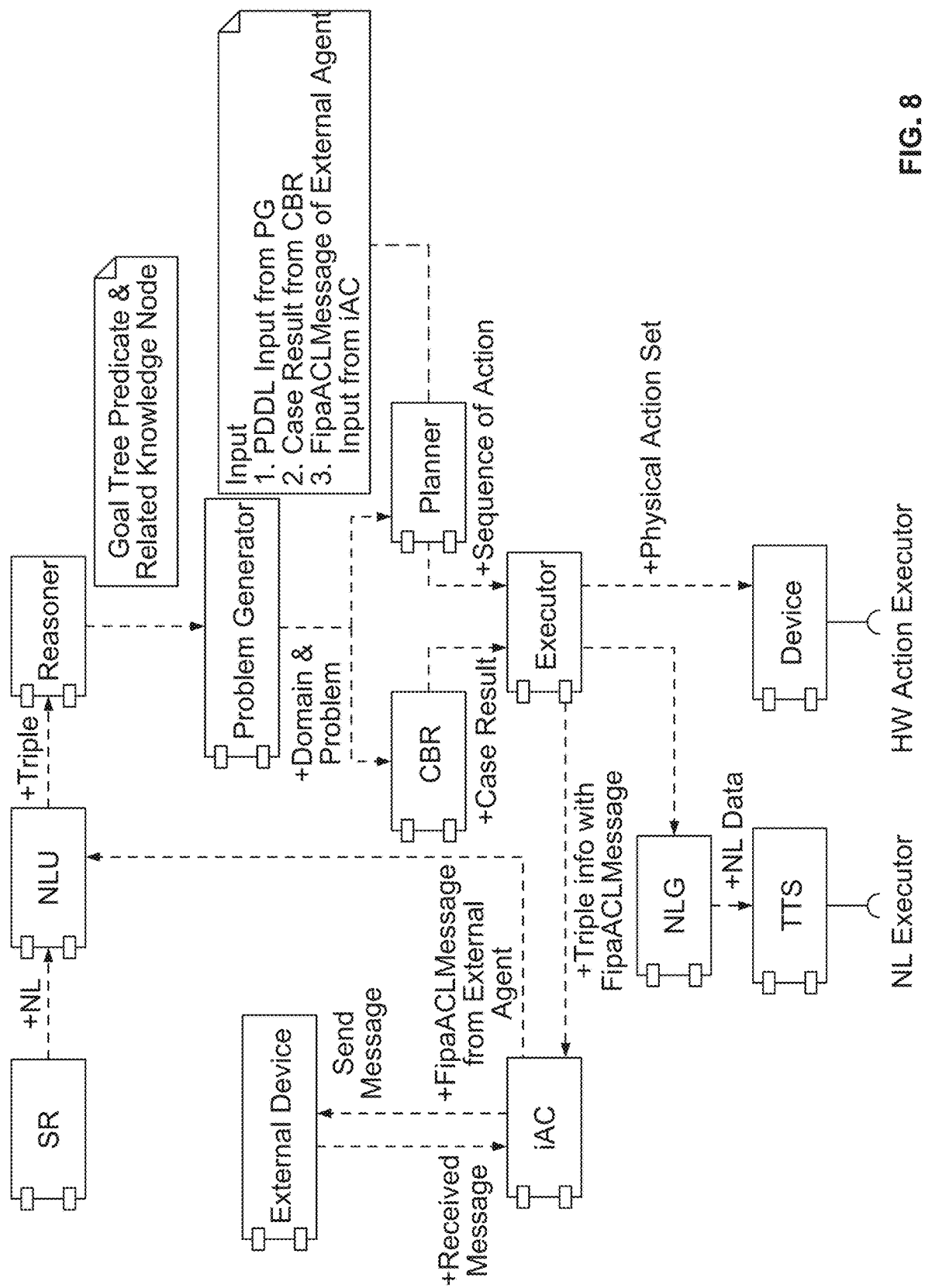
FIG. 8 is a block diagram illustrating an adaptive, interactive, and cognitive reasoner.

FIG. 8 is a block diagram illustrating an adaptive, interactive, and cognitive reasoner. FIG. 8 shows an example of the whole architecture of the AICoRE that includes speech recognition (SR) module or devices. In the example shown in FIG. 8, many modules constitute the AICoRE and are closely related on each other. In various embodiments, the modules and/or devices of FIG. 8 perform the processes of FIGS. 1-4. In some embodiments, one or more modules of FIG. 8 are functional components of FIG. 6.

(1) Natural Language Understating (NLU)

Natural language understating (NLU) is about language processing by computers, and is related to the field of human-computer interaction. NLU enables computers to derive meaning from human or natural language input.

In some embodiments, our natural language understanding module attempts to find triples from a sentence. First, the system uses a natural language processing tool to parse a sentence. Using a parsed sentence, the module extracts triples. The system uses labeled-link, so that it is easier to find an appropriate modifier from an element. The system also uses reification to further annotate about the sentence.

Figure 9:
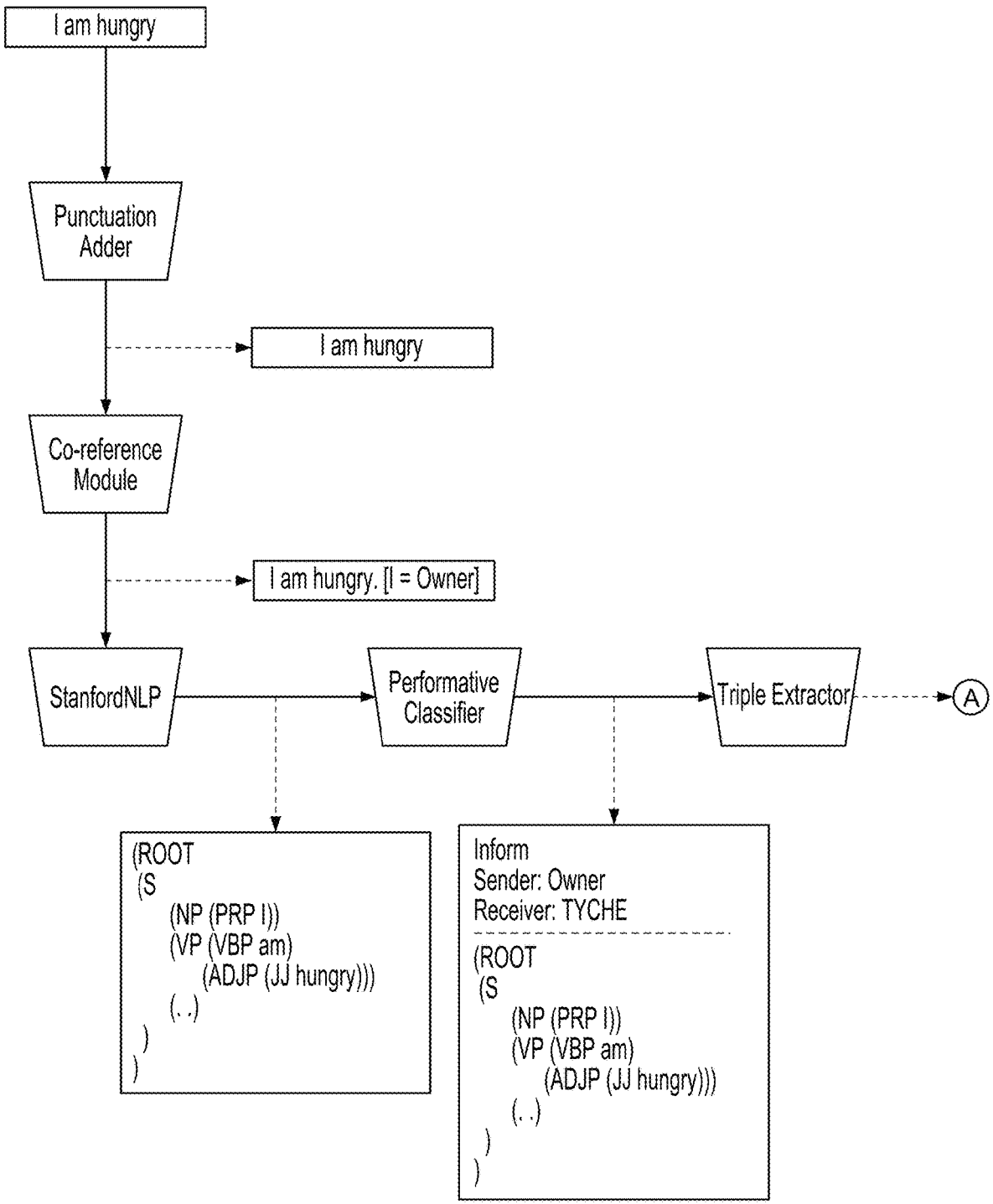
FIG. 9 is a diagram illustrating an embodiment of a process for natural language understanding (NLU).
Figure 9:
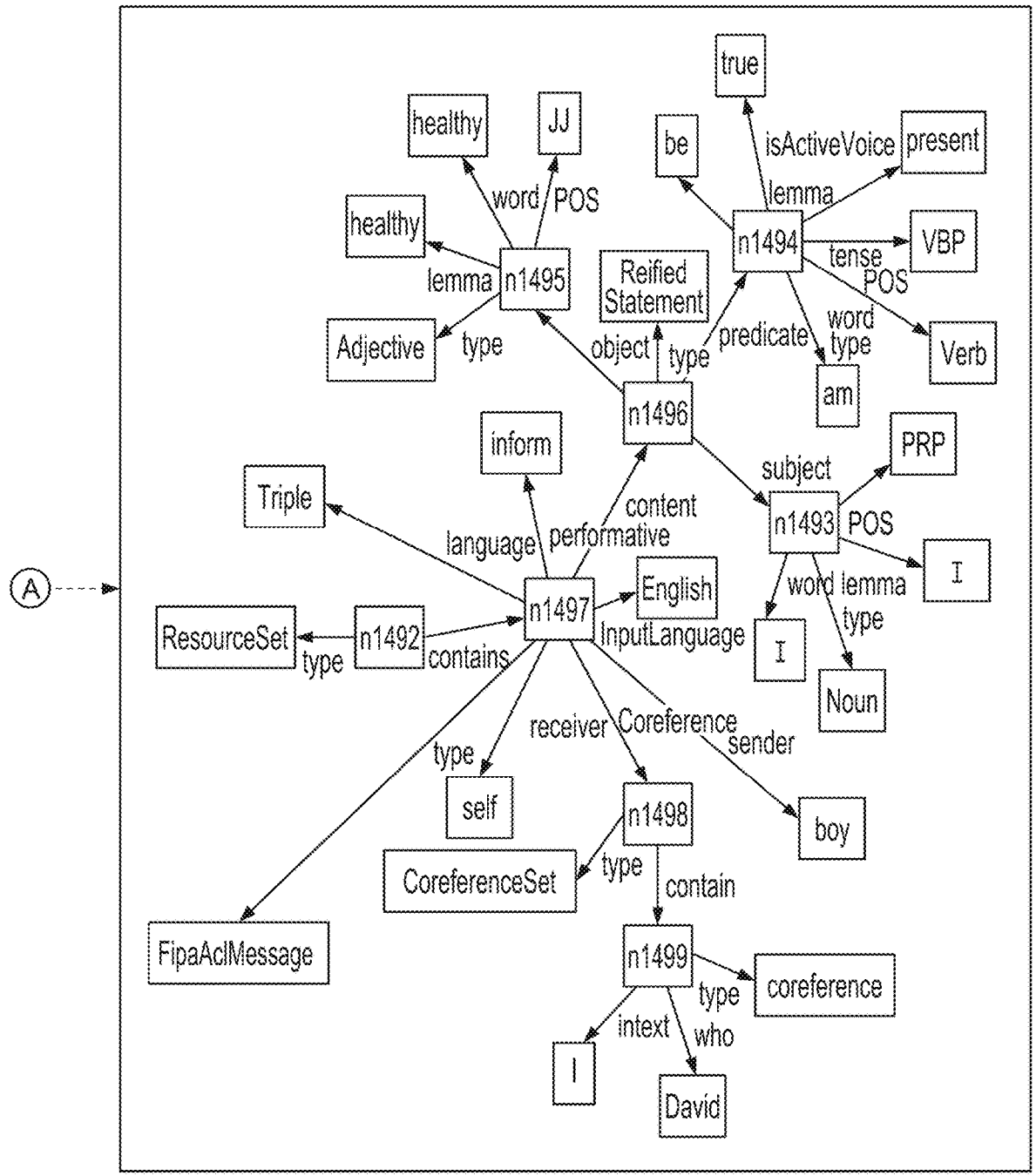

FIG. 9 is a diagram illustrating an embodiment of a process for natural language understanding (NLU). FIG. 9 shows exemplary architecture and processes of natural language understanding (NLU) including input and output of each part. In some embodiments, the process of FIG. 9 is performed at 103 of FIG. 1 and/or 203 of FIG. 2. In some embodiments, natural language understanding module 603 of FIG. 6 performs the process of FIG. 9.

In some embodiment, the first step of the NLU process is to add a missing punctuation. This may be done by analyzing the first few words of the sentence and their POS tags. This first step can improve the result of the syntactic parser. The second step is co-referencing. Co-referencing finds referents of certain words. The next step is to make a parse tree using a natural language processing tool. If there is a wrong parse tree made by the natural language processing tool, the NLU corrects it with a set of pre-defined rules. The next step is to classify the performative of the sentence. The NLU represents the sentence with additional information in a format that is similar to a FIPA ACL message, that is a language for agent communications, and the performative defines a type of the sentence, and it is used to determine what action to take by the planner. The last step is to extract triples using the parse tree. The parse tree itself is consisted of triples, but the triple extractor extracts one reified triple from a sentence and adds more triples to it including the parse tree itself.

The NLU module is different from other parsers, because it adds more information than any other parsers do. Usually parsers are divided into two categories: one is dependency-based parser and the other is constituency-based parser. The NLU module parses based on constituency first, and then adds more information like what is a subject, verb, and object, which is similar to a dependency parser. The NLU module not only finds grammatical structure of the sentence, but also analyzes which performative and language the sentence is. Performative denotes the type of the communicative act, and the system uses performatives defined in FIPA-ACL.

In various embodiments, the coreference module in NLU can handle conversational data that is a list of speakers and sentences. All sentences in conversation can have different speakers and receivers. Thus, the coreference module checks not only objects in sentences, but also relationships between the speakers and the objects. The coreference module can extract direct co-reference information by using its database.

(2) Reasoner

Figure 10:
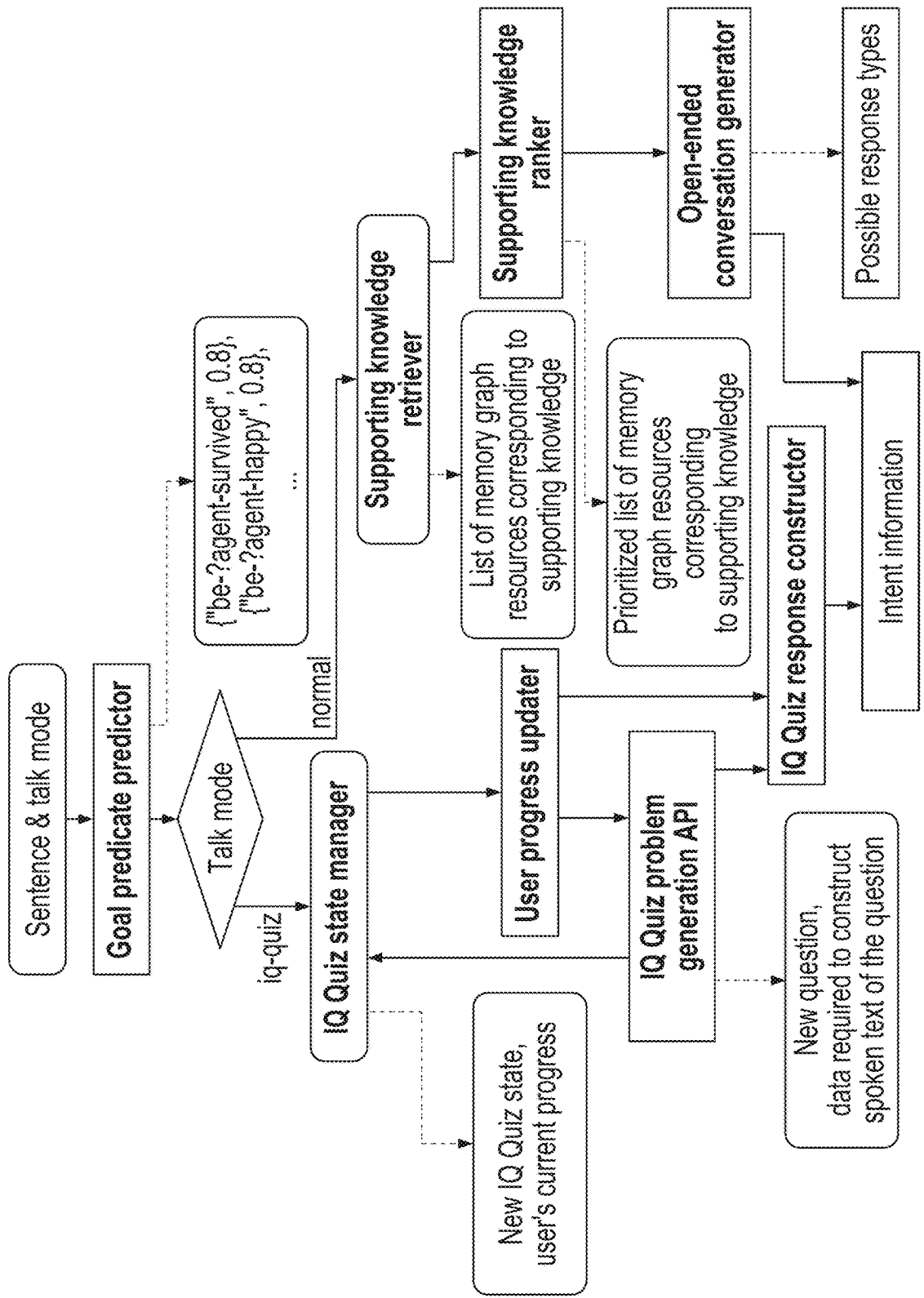
FIG. 10 is a flow diagram illustrating an embodiment of a process for performing reasoning.

FIG. 10 is a flow diagram illustrating an embodiment of a process for performing reasoning. FIG. 10 shows the overall exemplary processes of the reasoner module. Given an input sentence and talk mode, the reasoner module invokes several sub-functions in order to append various information to an 'IntentInformation' class object as its output. In some embodiments, the process of FIG. 10 is performed at 105 of FIG. 1 and/or 205 of FIG. 2. In some embodiments, the process of FIG. 10 describes in further detail the processes of FIGS. 3 and 4. In some embodiments, component of FIG. 6, including reasoner module 605 and memory graph 607, are used to perform the process of FIG. 10.

The first information the reasoner module outputs is goal predicate information, representing which 'goals' of the speaker the module will aim to satisfy. With the basic goal of 'making the speaker happy', the module predicts the needs of the speaker based on the input sentence and outputs a sub-tree of the goal hierarchy that corresponds to the needs. Each goal within the sub-tree is also assigned a score based on how urgent the goal needs to be satisfied.

From here, the reasoner module operates differently depending on the given talk mode, [normal] and [iq-quiz]. The [normal] and [iq-quiz] are predefined in AICoRE as static variable. The talk mode [normal] corresponds to general conversation, while [iq-quiz] stands for the speaker having an IQ quiz session.

If the given talk mode is [normal], the reasoner module will retrieve information that will help the next module (the planner) generate a response fit for general conversation. First, it calls the supporting knowledge retriever sub-function in order to gather a list of memory graph resources corresponding to knowledge (previously uttered speech) that are related to the given input. The reasoner module then ranks these resources in order of importance. Finally, the module calls the open-ended conversation generator sub-module in order to get possible response types (greetings, ask-where, etc.) that will serve as templates for generating more natural responses.

If the given talk mode is [iq-quiz], the reasoner module will retrieve information fit for administering an IQ quiz session. First, the IQ quiz state manager sub-function determines what the speaker's input means depending on the current IQ quiz state. Depending on the output state, the reasoner module can also update the current speaker's IQ quiz progress and generate a new problem for the speaker.

Figure 11:
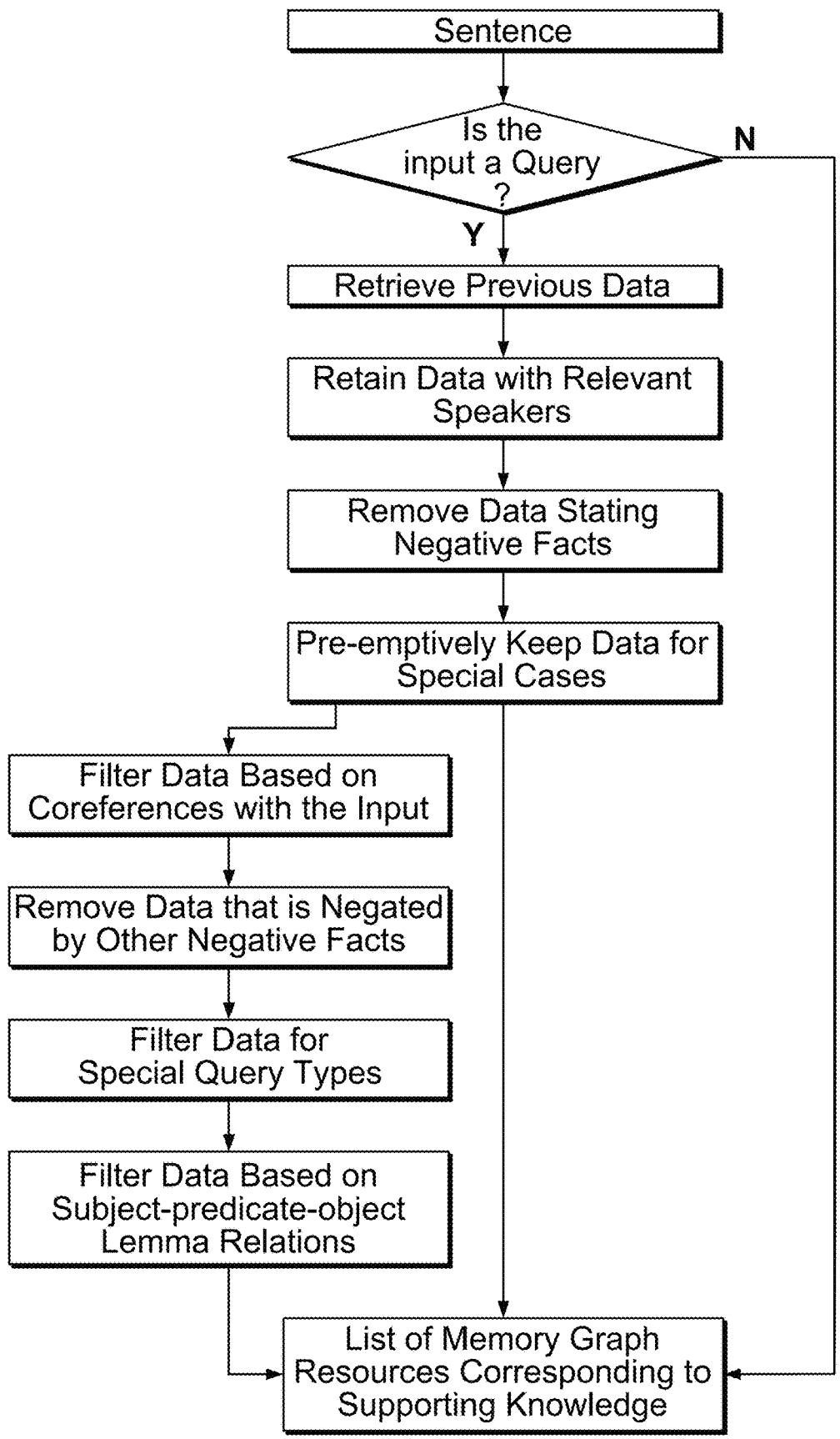
FIG. 11 is a flow diagram illustrating an embodiment of a process for identifying supporting knowledge.

FIG. 11 is a flow diagram illustrating an embodiment of a process for identifying supporting knowledge. FIG. 11 shows the process of the supporting knowledge retriever sub-function of the reasoner module. The sub-function first checks the input's performative in order to determine whether it is a query. If the input is a query, the sub-function determines which previous data (previously spoken data sentences) are related to the given input. This is accomplished via a series of filters that filter the whole set of previous data based on various criteria. In some embodiments, the process of FIG. 11 is performed at 105 of FIG. 1, 205 of FIG. 2, 305 of FIG. 3, and FIG. 4. In some embodiments, components of FIG. 6, including reasoner module 605 and memory graph 607, implement the process of FIG. 11.

(3) Problem Generator and Planner

Planning is a key ability for intelligent systems, increasing their autonomy and flexibility through the construction of sequences of actions to achieve their goals. Planning technique has been applied in a variety of tasks including robotics, process planning, web-based information gathering, autonomous agents and spacecraft mission control.

In various embodiments, the planner of the AICoRE support functions of an artificial intelligence planning language such as Planning Domain Definition Language (PDDL) specification 3.1 and multi-agent PDDL. The 'PDDL domain and problem' are necessary to solve the 'problem'. The AICoRE uses predefined 'PDDL domain', and there are many actions in the 'PDDL domain'. Each action is defined based on FIPA-ACL performative such as inform, query-ref, query-if, and request. In various embodiments, the performative denotes the type of the communicative act. The planner also decides a sequence of actions through comparing communicative act with performative, structure, meaning and intent of recent sentence or data.

In FIG. 8, the problem generator receives data from reasoner, changes the data from triple to PDDL, and generates 'PDDL problem in PDDL format so that the planner solves the problem. Originally, the problem has to include current status and a goal, so that there are user's recent sentence and data related on recent one in 'init' part of 'PDDL problem' to represent the current state.

The AICoRE has the 'GoalTree' that also predefines human's goals from upper step to lower in derived actions of domain to generate goal part in problem. Problem generator can select a goal for the solution in 'GoalTree' and uses the goal when it generates 'PDDL problem.' In addition, the 'PDDL domain and problem' are used by the Case Based Reasoning (CBR) to find same solution.

(4) Case Based Reasoning (CBR)

The CBR is the process of solving new problems based on the solutions of similar past problems. It is not only a powerful method for computer reasoning, but also models a behavior in human problem solving. Much of reasoning is based on past cases personally experienced. In some embodiments, the CBR module checks every conversation and saves all reasoning and action information.

In some embodiments, when a user generates a previously unknown conversation, the CBR module makes a case using a 'PDDL problem' generated by a reasoner and an action plan created by a planner. If the user generates a conversation that is similar to a previous conversation, the CBR module searches for this conversation in the case database. If the CBR module finds a similar case, then the CBR module makes an output by action plan of case. The AICoRE can reduce the response time and processing time by using this CBR module. When the CBR module gets a new problem, the CBR module checks the reasoning information with the new problem compared to saved cases. If there is a matching case, then the CBR module uses its action plans. By reusing solved cases, the CBR module reduces AICoRE's duplication of existing plans.

Figure 12:
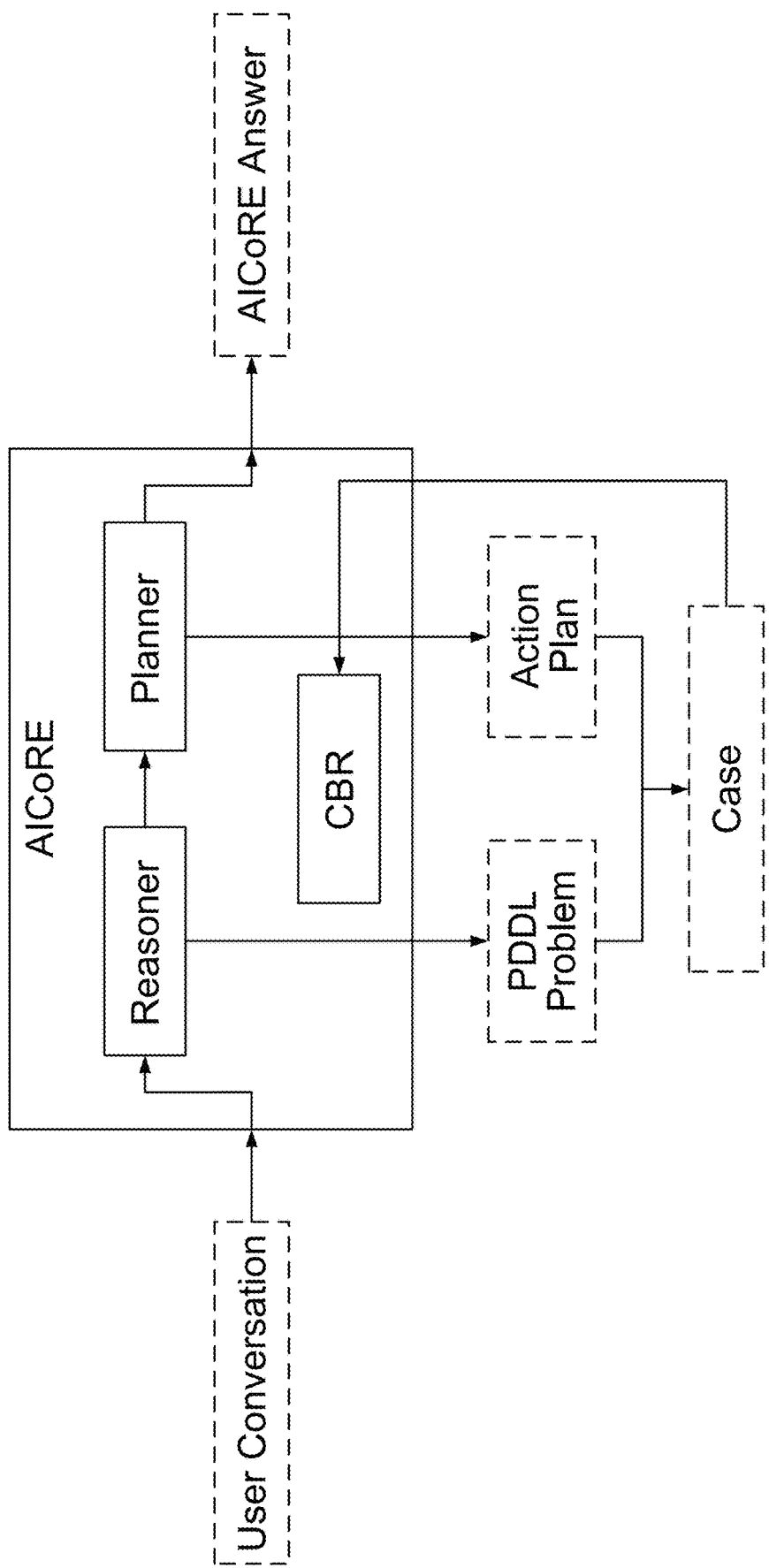
FIG. 12 is a functional block diagram illustrating an embodiment of a retrieve process for processing a case for a new artificial intelligence problem.

FIG. 12 is a functional block diagram illustrating an embodiment of a retrieve process for processing a case for a new artificial intelligence problem. FIG. 12 shows the process of retrieving case. In some embodiments, the process of FIG. 12 is performed at 107 and/or 109 of FIG. 1 as well as 209 and/or 211 of FIG. 2. In some embodiments, the process of FIG. 12 is performed using case based reasoning module 613 of FIG. 6. When a user talks with the AICoRE and user's conversation is translated to previously unknown 'PDDL problem' in Reasoner, and then the AICoRE runs retrieve process. First, the AICoRE makes a CBR case and puts this problem in a case. After the AICoRE makes action plan and executes this plan, CBR modules save this plan to the CBR case. The AICoRE saves this created CBR case as triple set in a triplestore.

Figure 13:
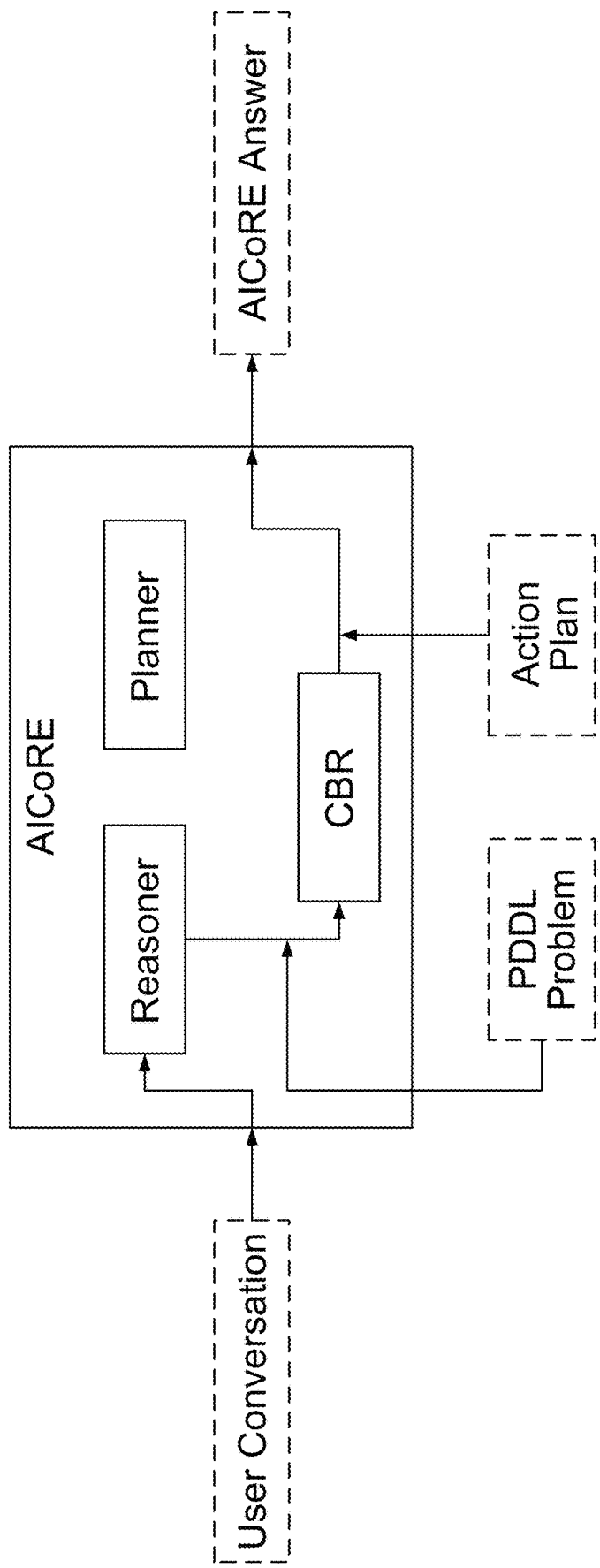
FIG. 13 is a functional block diagram illustrating an embodiment of a process for identifying and reusing a saved case.

FIG. 13 is a functional block diagram illustrating an embodiment of a process for identifying and reusing a saved case. FIG. 13 shows the process of reusing case. In some embodiments, the process of FIG. 13 is performed at 107 and/or 109 of FIG. 1 as well as 209 and/or 211 of FIG. 2. In some embodiments, the process of FIG. 13 is performed using case based reasoning module 613 of FIG. 6. After the AICoRE generates a 'PDDL problem' from conversation, the CBR module finds similar cases with the input case. The CBR module gets all cases in database and checks whether its problem situation is same with input case. In this step, the CBR module gets the case's 'PDDL problem' and checks information of 'PDDL problem'. If the CBR module finds similarity between the input problem and a saved case, then the CBR module will pick the saved case and use its action plan without using the planner module.

(5) Natural Language Generation (NLG)

Natural language generation (NLG) is the task of generating natural language from a machine representation system such as a knowledge base or a logical form. The NLG task may be viewed as the opposite of natural language understanding. In the AICoRE, the planner and reasoner determine what to say, what to change, and so on, so that the NLG does reconstructing, grammar fixing, and person correction.

Figure 14:
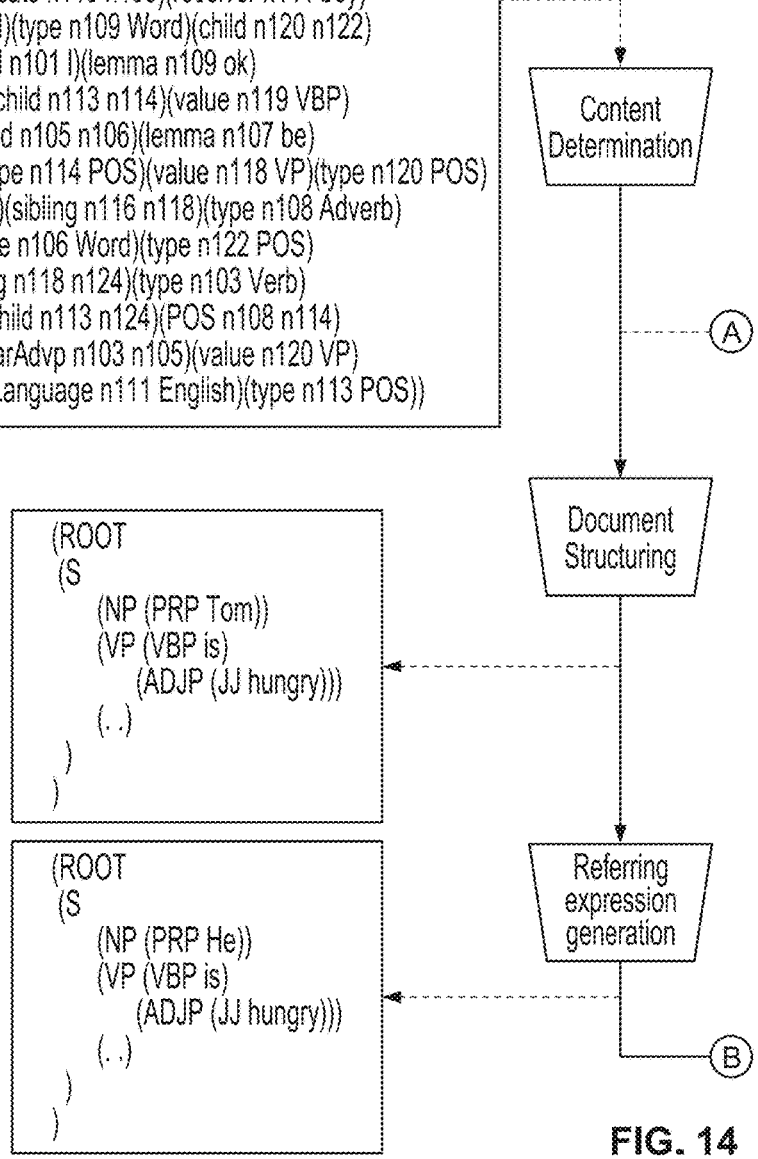
FIG. 14 is a diagram illustrating an embodiment of a process for natural language generation (NLG).

FIG. 14 is a diagram illustrating an embodiment of a process for natural language generation (NLG). FIG. 14 shows an exemplary natural language generation (NLG) architecture including input and output of each part. The first step of the NLG module is parsing strings of triples and making simple graphs for depth first search (DFS) using the result of a planner. Because the result from a planner is in PDDL format, the NLG module converts the format to a graph. Then, it makes a parsed tree by using a DFS search with the stored NLG triple and visited log at document structuring part. Through this process, it can determine the ordering and SPO structure of a sentence. Next, the referring expression generation part replaces names with personal pronouns using coreference data of the triple. Lastly, a realization module performs a process of realizing a sentence by an element of a parse tree or sentence, and NLG uses a natural language generation tool to realize it. In some embodiments, the process of FIG. 14 is performed at 109 of FIG. 1 and 213 of FIG. 2. In some embodiments, the process of FIG. 14 is performed using natural language generator module 617 of FIG. 6.

In some embodiments, the NLG module does not use concise data but instead uses a whole sentence without any omission of words or changes in grammar structure to generate natural language. Thus, there is no information loss in AICoRE.

(6) Memory

In some embodiments, the 'memory' module stores a history of conversations that the agents were engaged in, plus any other information captured by its sensors about the environment such as location, time, weather, etc. The declarative memory holds the agent's knowledge about the world and itself. The knowledge available to the agent in the declarative memory can be in at least two forms: 1) given to the agent in the form of an ontology (e.g., WordNet) or factual knowledge; or 2) inferred by the agent based on the content of its episodic memory.

Figure 15:
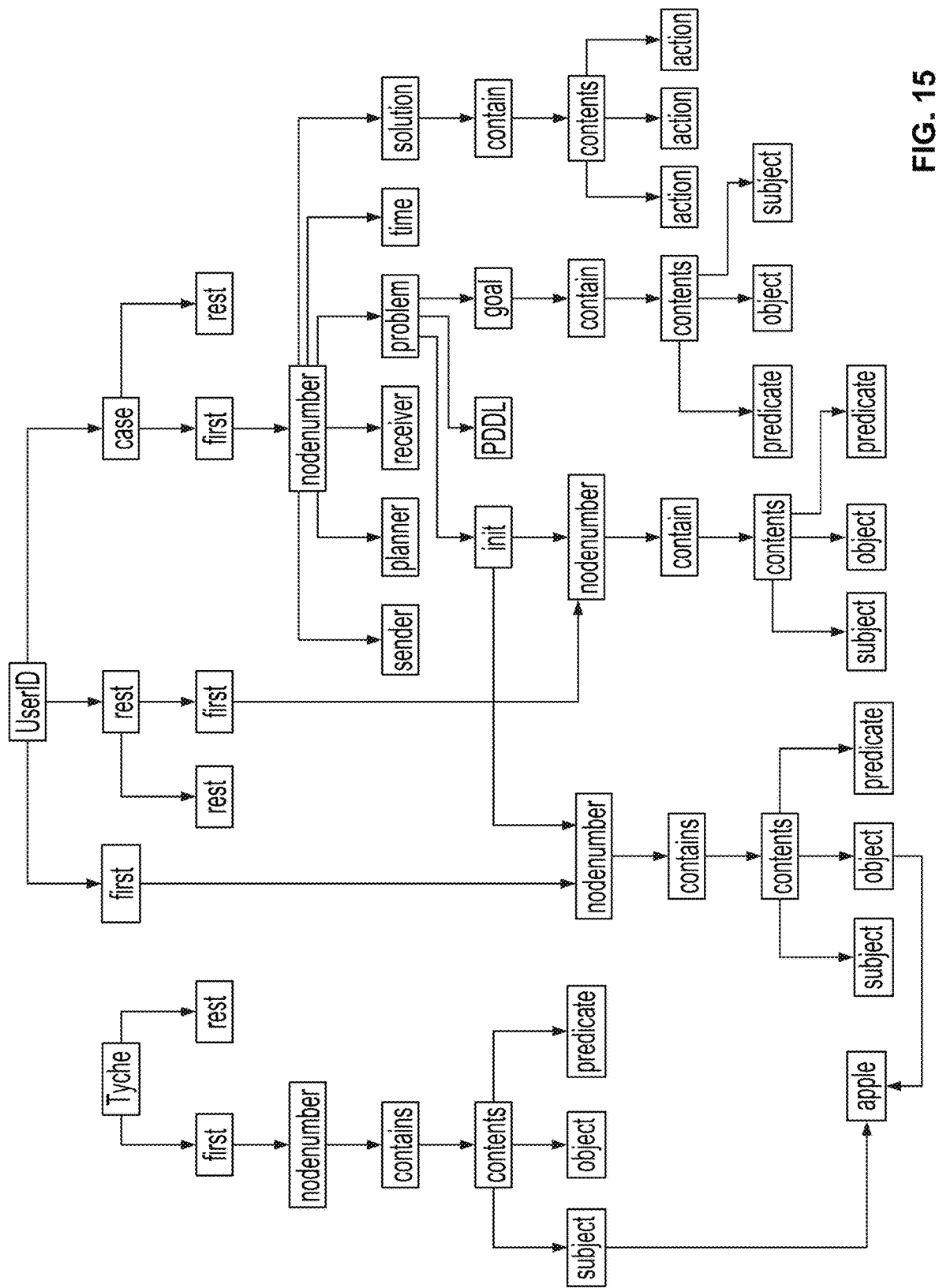
FIG. 15 is a diagram illustrating an example of a memory graph data structure.

FIG. 15 is a diagram illustrating an example of a memory graph data structure. FIG. 15 shows an exemplary memory graph in the AICoRE system. In FIG. 15, the 'memory module' consists of two parts, a user part and a robotic system part. The 'memory module' saves user's information of conversation history in the user part and data of robotic system in the robotic system part. In some embodiments, the memory graph of FIG. 15 is memory graph 607 of FIG. 6. In some embodiments, the memory graph of FIG. 15 is used at 105, 107, and 109 of FIGS. 1; 205, 207, 209, and 211 of FIGS. 2; 305 and 307 of FIG. 3; and FIG. 4.

(1) In some embodiments, the user part is classified into two sections. One section has data about the user that is generated from the user's conversation. The AICoRE saves the data under UserID sequentially. For example, the AICoRE generates a new resource that includes NLU output when a user says something about oneself and the resource connects it to the UserID using the 'first' relation.

Then, if the user says again, the AICoRE also generates a new relation 'rest' relation and connects the new node resource again. In addition, the node that is connected to the 'rest' has another 'first' and 'rest' relations. The AICoRE repeats this whenever the user says something.

(2) In some embodiments, the robotic system part uses the same architecture as that of the user part. However, under a robotic systemID, the system only saves a robotic system's data even if the user says the data and no one but the owner can change the robotic system's data.

Figure 16:
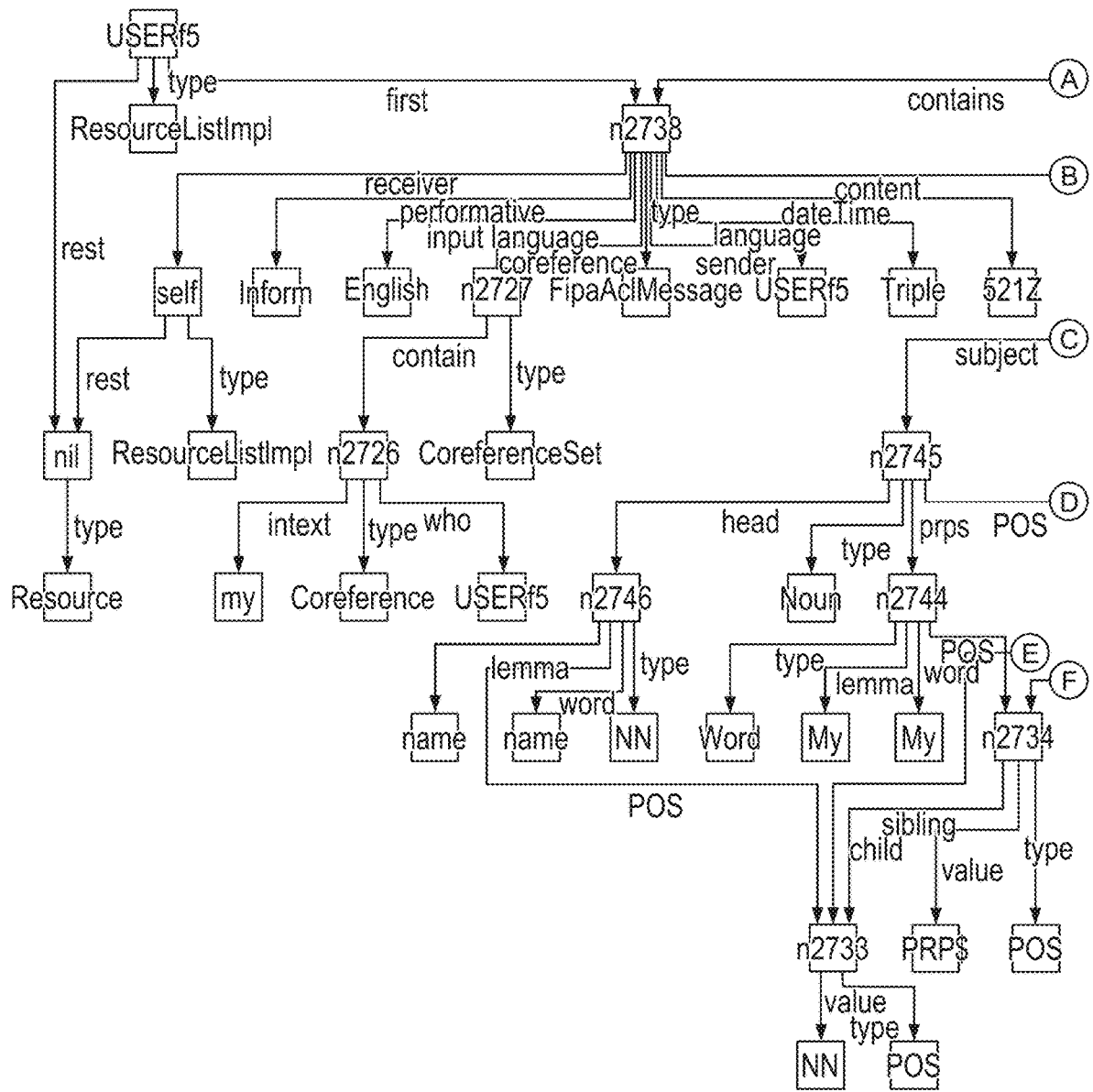
FIG. 16 is a diagram illustrating an example of a memory graph data structure.
Figure 16:
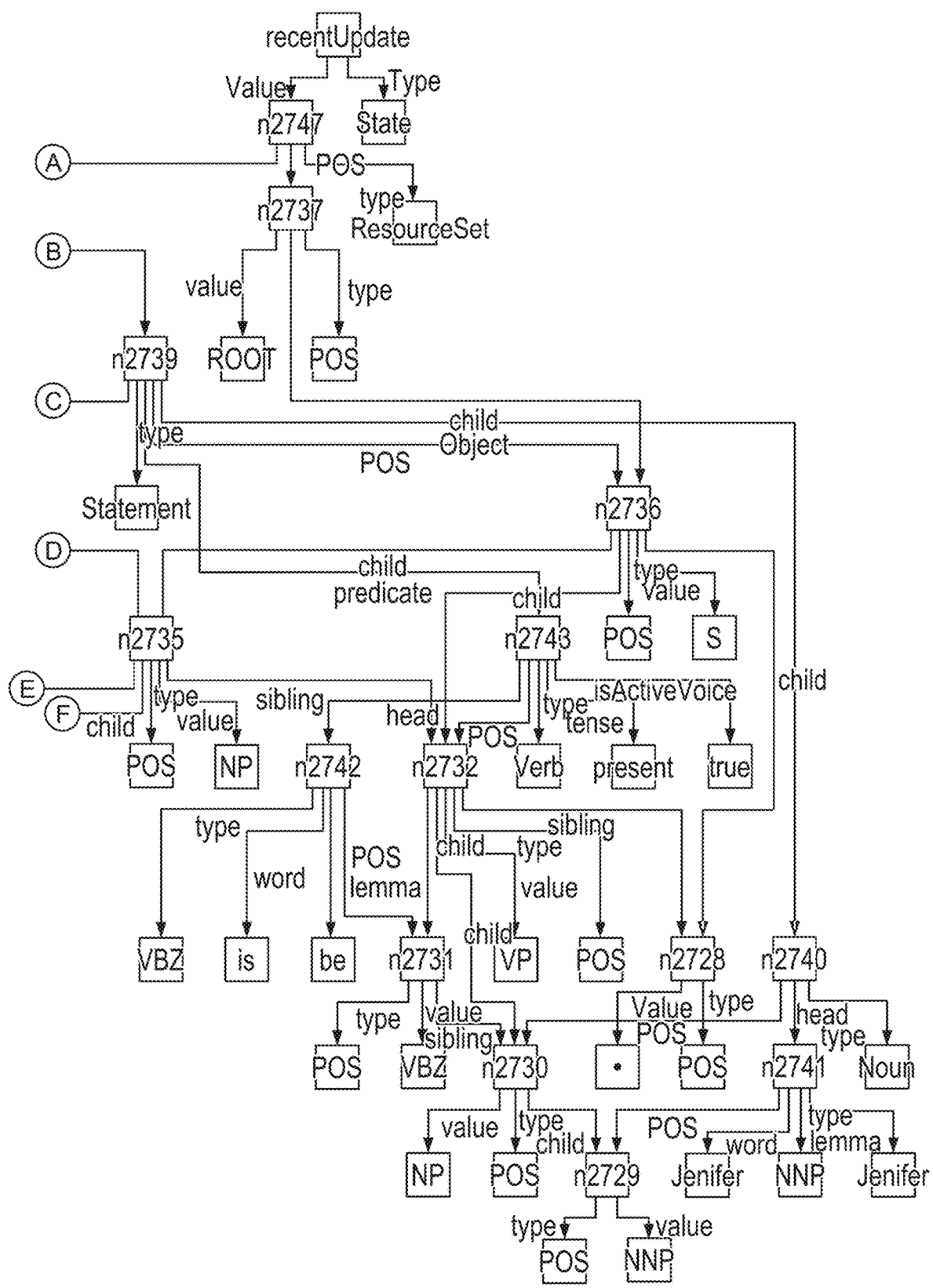

FIG. 16 is a diagram illustrating an example of a memory graph data structure. FIG. 16 shows an exemplary sentence in the memory graph. It is just one sentence processed in the user memory. The data includes many relations and nodes that are the result from NLU. The top level node of the sentence has a lot of information about the sentence, such as language, date, and time, and there is a sentence element under 'content' relation. In some embodiments, the memory graph of FIG. 16 is memory graph 607 of FIG. 6. In some embodiments, the memory graph of FIG. 16 is used at 105, 107, and 109 of FIGS. 1; 205, 207, 209, and 211 of FIGS. 2; 305 and 307 of FIG. 3; and FIG. 4.

In addition, in some embodiments, the CBR module makes the CBR case and saves it under a case node in the 'memory module'. A CBR case is made with sender, receiver, time, 'PDDL problem' and solution information. The sender and receiver information represent who or what the speaker is and the listener of the conversation that is generating a 'PDDL problem'. The time information records the date of conversation. The planner represents what kind of planner the AICoRE uses to solve this conversation problem. The 'problem' is constructed using a 'PDDL problem' and the goaltree's goal. The solution is an action plan of the selected planner. The AICoRE database saves the CBR case under a user node and makes the CBR case list. When the AICoRE makes a new CBR case, the AICoRE database adds this CBR case to the last of the CBR case list. When the CBR module wants to find a similar case, the CBR searches in the CBR's case list. In various embodiments, every user memory structure has its own CBR case list in a database. Thus, the CBR module can reduce the time to search for a similar case in a list.

(7) Inter-Agent Communication (iAC)

The iAC stands for inter-agent communication. It is a communication module for agents that uses, in some embodiments, the JADE and FIPA-ACL message structure. The iAC is may be composed of two projects: iACManager and iACServer.

In some embodiments, the iACManager is a client side management module of iAC. In some embodiments, the iACManager generates ACLMessages that is based on the FIPA-ACL structure and sends messages via the JADE Platform. In some embodiments, the iACServer runs a JADE Platform so that clients can send and receive ACLMessages. It manages whether messages should be sent by checking whether a receiver exists.

Figure 17:
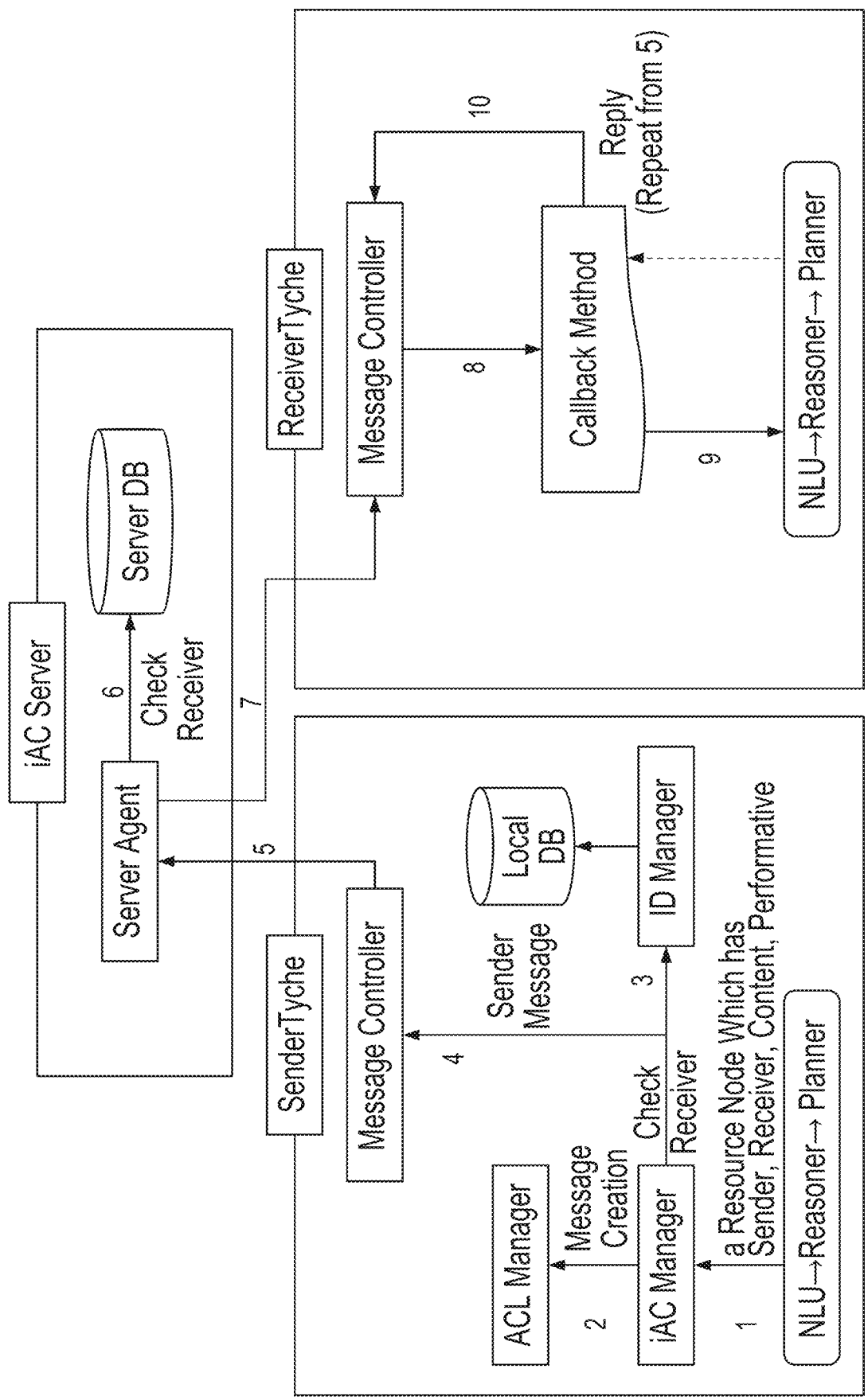
FIG. 17 is a functional block diagram illustrating an embodiment of a process for inter-agent communication.

FIG. 17 is a functional block diagram illustrating an embodiment of a process for inter-agent communication. FIG. 17 shows exemplary processes of the iAC module. In some embodiments, the planner or dialogue manager determines a sender, receiver, content, and performative of a message. The iAC manager receives this message and generates an ACL message using an ACL Manager. When the ACL Manager makes an ACL message, the receiver information is changed into an internal ID using an ID Manager. The ACL message is passed to message controller, and it sends the message to an iAC Server. The server agent in the iAC Server receives the message and checks whether the receiver exists. If the receiver exists, then it sends the message to the receiver module of a robotic system. The planner and dialogue manager can register callback methods to the message controller. The message controller uses the callback methods when it receives messages.

In some embodiments, there are two possible types of ACL messages that can be processed. One is a request. When an iAC manager receives a request, it passes it to a NLU, so that the NLU can start to process the message through the AICoRE. For the other type of the message, the iAC manager outputs the message to the target user.

Communication between agents allows the agents to share information and to command each other. For example, a user can ask an agent about someone's hobby. If there is no information about it, the agent may ask someone else's agent and provide the answer to the user. In various embodiments, personal information can be protected and an agent can decide whether it sends requested information or not to an asking agent.

The iAC module can be used in many ways. For example, agents can share the owner's schedule to come up with a meeting time. The iAC module can also be used to share the price of the used goods of the owner and to suggest fine goods to the user.

In some embodiments, the process of FIG. 17 is performed in part at 101 and/or 109 of FIG. 1 to receive and send inter-agent communication. In some embodiments, the process of FIG. 17 is performed at 105 and/or 107 of FIG. 1 to retrieve supporting knowledge and/or to identify and/or solve an artificial intelligence problem.

The AICoRE Processes

FIG. 18 is a pseudo-code description illustrating an embodiment of a process for solving an artificial intelligence problem using adaptive, interactive, and cognitive reasoning. An example of a process and execution of the system are shown in FIG. 18, i.e. an exemplary pseudo code of the AICoRE process. FIG. 18 shows the BDI aspect by retrieving the beliefs from the agent's personal memory, executing the plan from reasoning out, and finally arriving at the set goals. In FIG. 18, the execution architecture is represented in five sequences: initialization, getting new events, setting new plans, executing plans, and processing the rest of the job. The executing sequence, depicted in FIG. 18, resembles an embodiment of an architecture of a BDI agent. In some embodiments, the pseudo-code description of FIG. 18 describes the processes of FIGS. 1 and 2. In some embodiments, the system described by the functional block diagram of FIG. 6 performs the process described in FIG. 18.

In some embodiments, a BDI agent stands for an agent based on the three main concepts: Belief, Desire and Intention. The Belief is the knowledge of what the agent has, including environmental information and data from other agents that is saved in an agent's belief-base. The Desire is what the agent wants to accomplish. The desire that the agent wants to accomplish may also be called the goal of the agent. Specifically, an agent executes and determines an active goal that is more profitable for the current input data or changes. The Intention represents the methods to achieve the goal. The intention may also be called the plan of the agent. The plan is composed of actions that perform a single job. Additionally, the inducer of the processes of an agent is called an event.

When an event occurs to a BDI agent, a belief is updated in the belief-base, and the BDI agent interoperates the belief with goals and plans to invoke them. When the available goal and plans are activated within the BDI agent, the reasoner within the BDI agent executes the proper actions to accomplish this goal, and the result is executed within the BDI agent in the form of actions. This sequence of actions updates the belief-base of the BDI agent. If there are no more goals to be accomplished for the belief, the BDI agent finishes the job.

This process may be used by some embodiments of an AICoRE. After an AICoRE is initialized, an AICoRE receives new external events in the form of triples as input. These events are triggered whenever a user says a verbal utterance. Normally an AICoRE may process these events sequentially using a time-priority queue storing verbal utterances. However, if a high-priority event such as fire emergencies happens, then the event's priority within the queue of an AICoRE is changed to accommodate the high-priority event.

A brief example of a process of the AICoRE is as follows: The chosen event, represented in natural language format, gets transferred into the natural language understanding module of the AICoRE, and it gets appended with various optional parameters from the option-generator from the event queue of the AICoRE. Next, the planner module of the AICoRE uses a set of internal rules to set the most proper goal and plan to get the best solution for the given event. This phase is analogous with the 'update-intention' process of a BDI agent. However, in the AICoRE, there are not only rules of the planner module, but also rules from other modules within the system, so an iterative sequence may be used within the main repeat sequence in order to account for all the various rules. Examples of rules not from the planner module include rules from the reasoner module that are used to map data to the event, based on various characteristics of the event. Whenever a plan is set for executing a solution for a given event, the AICoRE executes the plan with the executor module. Finally, using the steps generated by the execution of the plan, the AICoRE can generate responses in the form of natural language that satisfies the actions required to accomplish the goal set by the inputted event.

Figure 19:
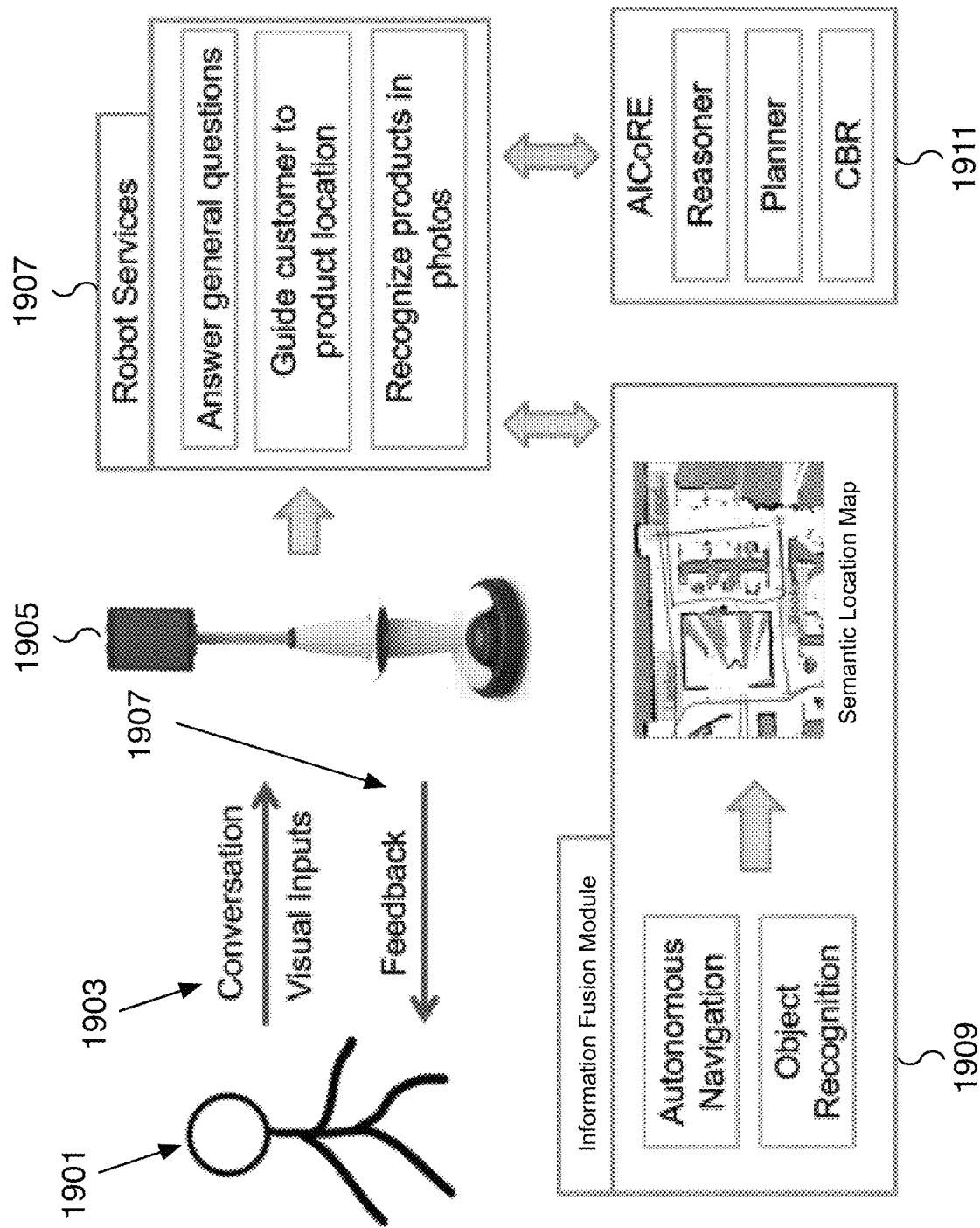
FIG. 19 is a diagram illustrating an embodiment of a context aware interactive robot system.

FIG. 19 is a diagram illustrating an embodiment of a context aware interactive robot system. A context aware interactive robot of the disclosed system provides a multitude of context aware services including services for human customers in a retail environment. The services include the ability to answer general questions such as questions related to product information, weather information, business hours, etc. The context aware interactive robot can guide a customer to product locations, recognize products from photos including photos taken by the robot using a robot camera, and scan products in a retail environment. The ability to scan products includes the ability to scan products on retail shelves. The scanned products are identified and information related to the products, such as inventory counts and storage locations, are stored for later retrieval and use. The context aware interactive robot provides a conversation functionality between the robot and users (or other robots). For example, the robot can converse with a user related to products such as the best product for a customer's problem, the location of a product, the difference between products, etc. In some embodiments, the context aware interactive robot understands its surroundings, such as the environment the robot is currently located in. For example, the robot can determine its location or the location of its surroundings; extract environmental information from its surroundings such as obstacles, customers, and navigable paths; and generate a map of its surroundings. In various embodiments, the generated map is a semantic location map. In some embodiments, the robot provides can autonomously navigate in a retail environment. For example, using the generated map of its surroundings, a robot can autonomously navigate from one location in a retail environment to another location. As another example, a robot can autonomously navigate through a retail environment making the robot and its services available for any customers it encounters.

In the example shown, robot user 1901 is a human in a retail environment. For example, robot user 1901 may be a customer visiting a retail environment or retail staff working at the retail environment. Input 1903 from robot user 1901 is captured by context aware interactive robot 1905. In some embodiments, input 1903 is visual input captured by robot 1905 using camera sensors. In some embodiments, input 1903 is voice input, such as speech, captured by robot 1905. As shown in FIG. 19, input 1903 is conversational or visual input although other forms of input are possible as well, such as touch, smell, network communication, etc. Based on input 1903, robot 1905 provides feedback 1907 to robot user 1901. Robot 1905 provides a variety of services 1907 that include, but are not limited to, answering general questions, guiding a customer to a product location, and recognizing products in photos. Products may be recognized in photos captured by robot 1905 or in photos or images presented to robot 1905, for example, by robot user 1901 or downloaded via a network connection.

In some embodiments, robot 1905 utilizes information fusion module 1909 to at least partially provide a portion of the offered services. In various embodiments, information fusion module 1909 is implemented by robot 1905 and/or by remote services accessible by robot 1905. Information fusion module 1909 includes functionality for autonomous navigation and object recognition. Information fusion module 1909 can generate a 2D map using an autonomous navigation sub-module and recognized object information from an object recognition sub-module to generate a semantic location map. The semantic location map can be used by robot 1905 to locate object locations in a retail environment.

In some embodiments, robot 1905 is connected via a network connection (not shown) to Adaptive Interactive Cognitive Reasoning Engine (AICoRE) server 1911. AICoRE server 1911 provides artificial intelligence (AI) functionality including reasoner, planner, and case based reasoning (CBR) functionality. In various embodiments, AICoRE functionality is described above with respect to FIGS. 1-18.

Figure 20:
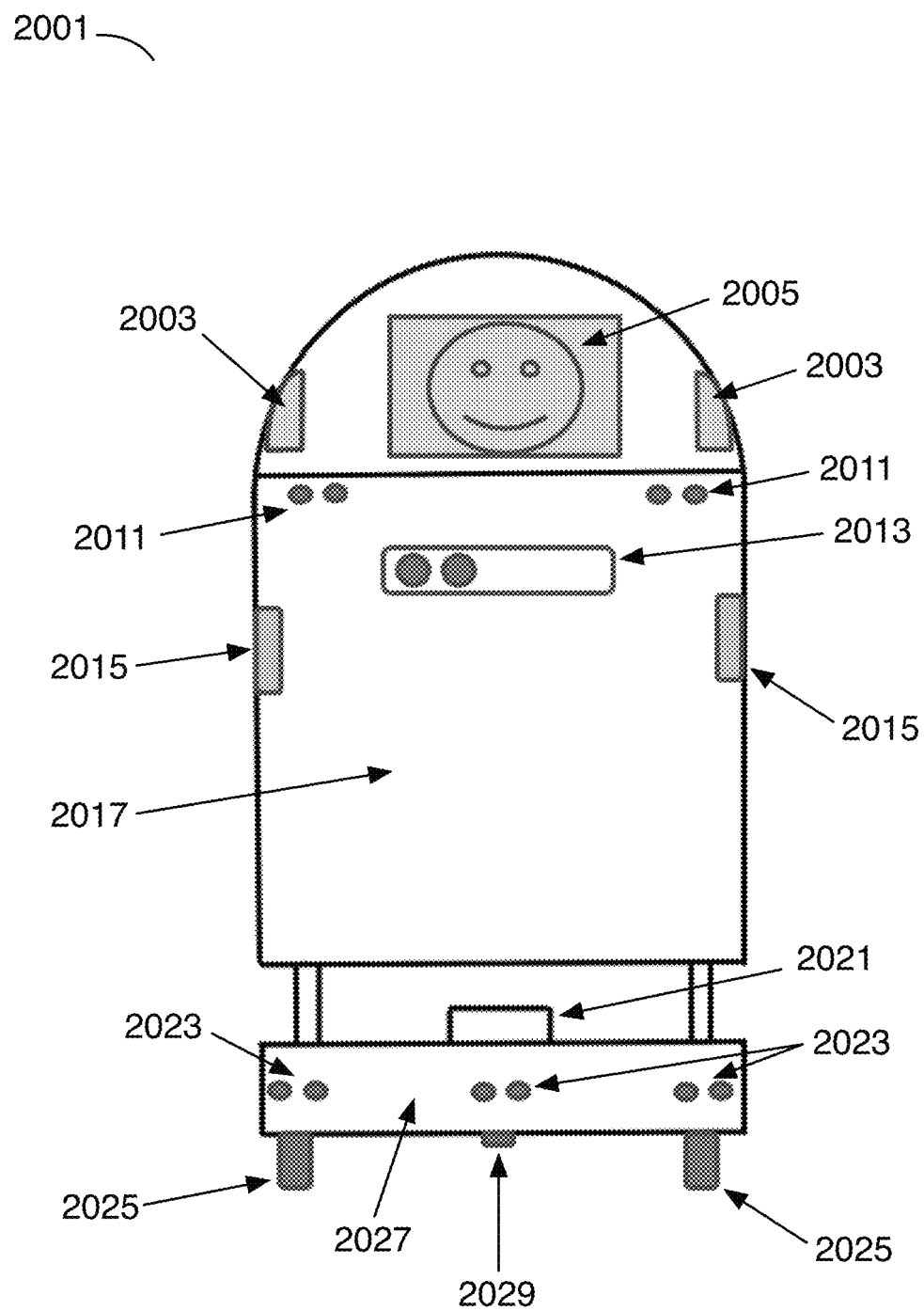
FIG. 20 is a diagram illustrating the hardware design of an embodiment of a context aware interactive robot.

FIG. 20 is a diagram illustrating the hardware design of an embodiment of a context aware interactive robot. In some embodiments, context aware interactive robot 2001 is context aware interactive robot 1905 of FIG. 19. In various embodiments, robot 2001 performs one or more of the functions including: a speech recognition function to recognize speech (e.g., a robot user's speech), a speaking function to interact with a robot user, a display function to interact with a robot user, a visual recognition function (e.g., to recognize objects in images captured by cameras equipped on the robot body), a motion function (e.g., to move forwards, move backwards, turn left, turn right, stop, etc.), an object distance measurement function to measure the distance between the robot body and objects in relation to the robot (e.g., an obstacle in front of the robot), a cliff detection function to detect whether the robot might fall from a cliff, an autonomous navigation function (e.g., to avoid obstacles or human beings), and/or a simultaneous localization and mapping (SLAM) function to generate 2D/3D maps of a retail environment where the robot is located. In various embodiments, robot 2001 includes a network interface (not shown), such as a WiFi and/or cellular network interface, for communicating with network devices such as a remote server. For example, using a network interface, robot 2001 can communicate with a remote reasoning engine.

In various embodiments, a context aware interactive robot such as robot 2001 includes one or more of the hardware components as shown in FIG. 20. Robot 2001 includes speakers 2003, display 2005, microphones 2011, RGB-D camera 2013, cameras 2015, robot body with computational unit 2017, lidar sensor 2021, distance measurement sensors 2023, wheels 2025, motion/propulsion component 2027, and cliff sensor 2029. In some embodiments, robot 2001 includes additional hardware components not shown, such as additional sensors and additional motorized components.

In some embodiments, speakers 2003 may include at least two speakers used by robot 2001 to speak to robot users. Speakers may output the result of natural language generation (NLG). In some embodiments, display 2005 is a touch screen. Display 2005 may be used to display information to a robot user and/or interact with a robot user. For example, a robot user can input information via touch gestures or select from different user interface components displayed on display 2005. In some embodiments, microphones 2011 include at least two microphones to capture the voice input of a robot user. In some embodiments, RGB-D camera 2013 is used to capture images and to detect obstacles or humans. For example, RGB-D camera 2013 captures an RGB image and a corresponding depth image of the robot's surrounding environment. In some embodiments, cameras 2015 are high-resolution cameras, each with a wide field of view. Cameras 2015 may be used for capturing images of shelves to the left and right side of robot 2001 while robot 2001 is moving in a retail environment. Robot body with computational unit 2017 is the body component of robot 2001 that contains a computational unit for helping perform at least some of the provided services. The computational unit may include a processor for performing the techniques described herein. In some embodiments, lidar sensor 2021 is at least a 2D or 3D lidar that may be used to scan the surrounding environment of robot 2001. Lidar sensor 2021 can be used to generate a high quality 2D (or 3D) map of a retail environment. In some embodiments, distance measurement sensors 2023 are used for obstacle detection and for measuring the distance between the body of robot 2001 and detected obstacles. In some embodiments, wheels 2025 are used to provide motion and movement for robot 2001. Alternative modes of motion/propulsion may be used. In various embodiments, wheels 2025 are connected to motion/propulsion component 2027 which provides the motion/propulsion needed to move robot 2001. In some embodiments, cliff sensor 2029 is used to detect a cliff near robot 2001. Cliff sensor 2029 is used to prevent robot 2001 from navigating over a cliff.

Figure 21:
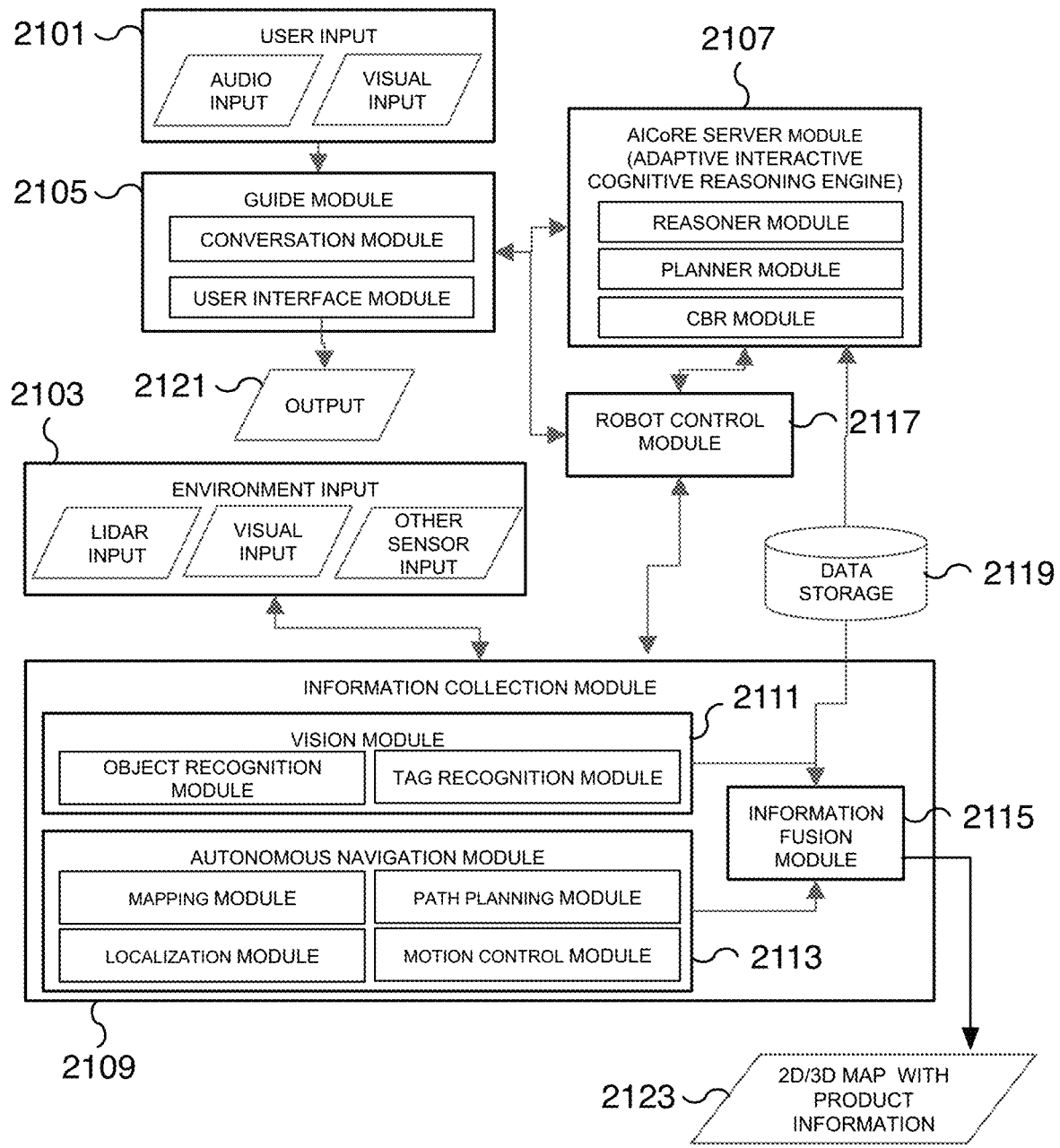
FIG. 21 is a block diagram illustrating the components of a software framework of an embodiment of a context aware interactive robot.

FIG. 21 is a block diagram illustrating the components of a software framework of an embodiment of a context aware interactive robot. In the example shown, the components include user input 2101, environment input 2103, guide module 2105, AICoRE server module 2107, information collection module 2109, robot control module 2117, data storage 2119, robot system output 2121, and 2D/3D map with product information 2123. In some embodiments, information collection module 2109 is information collection module 1909 of FIG. 19 and AICoRE server module 2107 is AICoRE server 1911 of FIG. 19.

In some embodiments, user input 2101 is provided to a context aware interactive robot, such as context aware interactive robot 2001 of FIG. 20. User input 2101 may include audio input and visual input. Audio input includes a robot user's speech, which can be recognized by the robot with the support of speech recognition functionality. Visual input includes a product photo that a robot user shows to the robot, images of the robot user's face, images of the environment of the robot, etc.

In some embodiments, guide module 2105 includes two sub-modules: a conversation module and a user interface module. A conversation sub-module of guide module 2105 can recognize a robot user's speech and sends the recognized speech results to AICoRE server module 2107 for further analysis. Guide module 2105 receives the analysis results from AICoRE server module 2107 and converts the result into sentences. A user interface sub-module of guide module 2105 is used to interact with a user. The sub-module is used to display information on a screen equipped on the robot, such as displaying a product photo to a robot user. The sub-module can also play speech generated by the conversation sub-module to a robot user using speakers equipped on the robot. In various embodiments, the output generated by guide module and its sub-modules is robot system output 2121.

In some embodiments, environment input 2103 is the input from the environment of the robot system. Environment input 2103 includes lidar input, visual input, and other sensor input. For example, lidar input includes scan information from a lidar sensor, visual input includes images captured from robot cameras, and other sensor may include other information captured from other sensors that may be equipped on the robot, as appropriate.

In some embodiments, information collection module 2109 includes of three sub-modules: vision module 2111, autonomous navigation module 2113, and information fusion module 2115. Vision module 2111 is used to extract environment information captured from sensors such as cameras. It is able to perform: object recognition and tag recognition, among other functions. While the robot is moving in a retail environment, vision module 2111 is used to recognize tags and products from the images captured by the robot's cameras. In some embodiments, the tag and object information is stored in layers. A layer is a two-dimensional grid where each grid contains a set of information. The grid size depends on how detailed the spatial area needs to be described. The set of information in each grid can be a set of numerical values that represent information such as a label, index, category, type, etc.

Autonomous navigation module 2113 is used to generate a 2D/3D map for a retail environment, to avoid obstacles, to perform path planning, and to perform other similar tasks. Autonomous navigation module 2113 can generated a 2D/3D map of the environment surrounding the robot. The map may then be used for path planning. An operator can describe the area on the 2D/3D map with a place layer. In various embodiments, a place layer contains place labels, place accessibility information, unique place indices, etc.

Information fusion module 2115 receives inputs from vision module 2111 and autonomous navigation module 2113 and outputs 2D/3D map with product information 2123. In some embodiments, information fusion module 2115 receives recognized product information and tag information from vision module 2111 and a 2D/3D map generated by autonomous navigation module 2113. Information fusion module 2115 fuses the received information together and provides a semantic location map, which not only contains a 2D/3D map (including spatial information) but also product information such as product price, product type, and product locations. The high-level spatial information of the generated semantic location map can be used by AICoRE server module 2107 to analyze and provide a natural and comfortable shopping experience to customers and to also improve the working experience for the staff. The generated semantic location map is stored in data storage 2119. In various embodiments, the generated semantic location maps is 2D/3D map with product information 2123.

In some embodiments, an AICoRE server module 2107 includes a human-like agent reasoner that functions much like the human mind in a robot, with the ability to perceive, reason, remember, and respond. AICoRE server module 2107 can receive a recognized user's speech and perform further analysis. It can read data from data storage 2119 to retrieve information from a semantic location map, such as product related information. AICoRE server module 2107 can perform further analysis based on the information it receives, and provide an analysis result to the robot. The robot can follow the instructions from AICoRE server module 2107 to perform a suitable responsive action in various different scenarios. In various embodiments, AICoRE server module 2107 is described in further detail above with respect to FIGS. 1-18.

In some embodiments, robot control module 2117 interfaces between guide module 2105, information collection module 2109, and AICoRE server module 2107. Robot control module 2117 may be used to control the robot using the various outputs of guide module 2105, information collection module 2109, and AICoRE server module 2107.

In some embodiments, AICoRE server module 2107 utilizes learning, problem solving, and automated reasoning to interact with robot users. The robot, using AICoRE server module 2107, can communicate with a robot user through speech and can perceive and respond with visual information. In some embodiments, AICoRE server module 2107 is a general conversation agent that utilizes visual information. AICoRE server module 2107 can be further enhanced, as appropriate, with custom built intelligence. In some embodiments, AICoRE server module 2107 is described further with respect to FIG. 7. As shown in FIG. 7, AICoRE server module 2107 includes, but is not limited to, a conversation module, a vision module, a remote communication module, a plan and move module, and a custom-built intelligence module.

The different modules of AICoRE server module 2107 can interface with and may be related to one another. For example, in some embodiments, AICoRE server module 2107 can include a natural language understanding (NLU) module, a reasoning module, a problem generator and planner module, a natural language generation (NLG) module, and a memory module. In some embodiments, a NLU module includes a natural language processing tool to parse a sentence based on constituency and then subject, verb, and object of a sentence. It also identifies the relationship between the speaker and the object. In some embodiments, a reasoning module uses the output of the NLU module to gather information that is necessary for a planning module. In some embodiments, the reasoning module retrieves corresponding knowledge related to the output of the NLU module from a memory graph. The reasoning module can also rank the knowledge based on importance. In some embodiments, a planning module generates a 'PDDL domain/problem' from the output of the reasoning module. The planner module then solves the PDDL domain/problem' by setting internal rules that would generate the most proper goal and plan. The planning module outputs the action plan as the solution. In some embodiments, the NLG module formats the solution from a machine-based representation to natural language. In some embodiments, a NLG module is used to generate responses for general conversation. In various embodiments, a memory module stores history of conversations that agents were engaged in and any other information captured by sensors. For example, information of recognized objects from the images captured by cameras of the robot may be stored in a memory module. AICoRE server module 2107 can learn from information stored and improve its abilities such as reasoning and planning.

Figure 22:
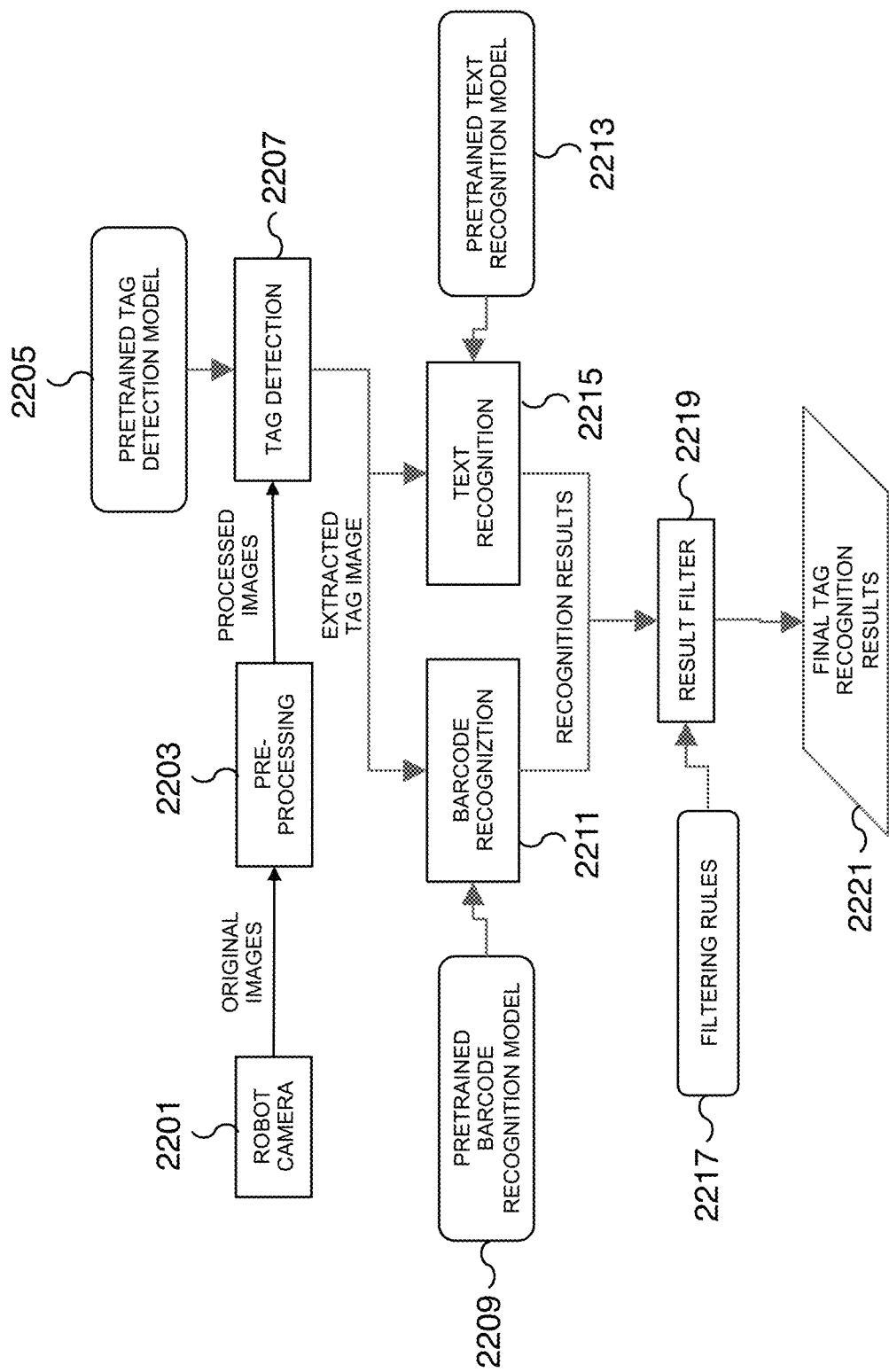
FIG. 22 is a flow diagram illustrating an embodiment of a process for performing tag recognition by a context aware interactive robot.

FIG. 22 is a flow diagram illustrating an embodiment of a process for performing tag recognition by a context aware interactive robot. In some embodiments, the process is used by context aware interactive robot 2001 of FIG. 20. In some embodiments, the process is performed by an information collection module such as information collection module 2109 of FIG. 21. In some embodiments, the process is performed by a tag recognition sub-module of a vision module, such as vision module 2111 of FIG. 21. In various embodiments, the tag recognition functionality is designed to recognize barcodes and text of tags from images of a retail environment where a context aware interactive robot is located. In various embodiments, the extracted information can be provided to an information fusion module such as information fusion module 2115 of FIG. 21 for use in generating a semantic location map or to an AICoRE server such as AICoRE server module 2107 of FIG. 21 for further analysis.

In some embodiments, as a context aware interactive robot moves around an indoor environment, it will detect multiple instances of the same product tag. Product tags contain unique information, so the robot can discard repeated detection of the same tag. A product tag includes brand information as well as object information. Character parsing may be used to place the tag into an object category. In various embodiments, a tag layer contains brand information and the object category.

At 2201, a robot camera is used to capture an image. For example, a robot camera, such as cameras 2015 of FIG. 20, captures images of the environment of the robot. In various embodiments, the camera of 2201 is the camera of a context aware interactive robot. The robot camera at 2201 captures original images of the environment that are used as input to a tag recognition module, such as a tag recognition sub-module of vision module 2111 of FIG. 21.

At 2203, the images captured by the robot camera at 2201 are pre-processed. In various embodiments, one or more pre-processing steps may be performed to enhance and/or prepare the image for tag recognition. For example, warping may be removed, noise may be removed, the image may be converted to a different format, and/or the captured image may be resized, among other appropriate techniques. The results of pre-processing at 2203 are processed images.

At 2205, a pretrained tag detection model is used as an input to tag detection at 2207. In some embodiments, the pretrained tag detection model is trained in advance on a variety of tags. In some embodiments, the tag detection model is trained using a machine learning model. In various embodiments, the tag detection model is used to recognize and identify tags on products likely to be found in a retail environment.

At 2207, a tag detection module receives processed images and applies a pretrained tag detection model. In various embodiments, the tag detection functionality is applied to a processed image using the pretrained tag detection model to identify and extract tag images. The result of the tag detection functionality is an extracted tag image.

At 2209, a pretrained barcode recognition model is used as an input to barcode recognition at 2211. In some embodiments, the pretrained barcode recognition model is trained in advance on a variety of barcodes. In some embodiments, the barcode recognition model is trained using a machine learning model. In various embodiments, the pretrained barcode recognition model is used to recognize and identify different barcodes on products likely to be found in a retail environment.

At 2211, a barcode recognition module receives an extracted tag image and applies a pretrained barcode recognition model. In various embodiments, the barcode recognition functionality is applied to an extracted tag image using the pretrained barcode recognition model to identify and extract barcodes. The result of the barcode recognition functionality is an extracted barcode.

At 2213, a pretrained text recognition model is used as an input to text recognition at 2215. In some embodiments, the pretrained text recognition model is trained in advance on a variety of text found on tags of products. In some embodiments, the text recognition model is trained using a machine learning model. In various embodiments, the pretrained text recognition model is used to recognize and identify different text on tags on products likely to be found in a retail environment.

At 2215, a text recognition module receives an extracted tag image and applies a pretrained text recognition model. In various embodiments, the text recognition functionality is applied to an extracted tag image using the pretrained text recognition model to identify and extract text of tags. The result of the text recognition functionality is extracted text from a tag.

At 2217, filtering rules are configured. In some embodiments, the rules are created ahead of time and may be updated dynamically. In various embodiments, the filtering rules are used to filter the results of tag recognition. Examples of filtering rules include the rules based on the size of the recognized tags, confidence coefficients, the number of tags to recognize, a priority rating for recognizing tags, etc. In some embodiments, a filtering rule may require that the confidence a tag is correctly recognized must exceed a particular threshold in order to determine that the recognition result is a final recognition result. Using filtering rules, tags recognized with lower probabilities are filtered out and not detected. In some embodiments, the filtering rules are based on the context of the performed tag recognition.

At 2219, the filtering rules configured at 2217 and the tag recognition results determined at 2211 and 2215 are used to determine final tag recognition results. For example, the filtering rules configured at 2217 are used to filter recognition results determined at 2211 and 2215. In various embodiments, two types of final tag recognition results are possible: (1) no tag is detected and (2) a tag is recognized. In some embodiments, the recognized tag is a tag within a certain proximity to the robot. In various embodiments, tags that are not detected may be due to low confidence coefficients, tags that are too far away or too small, tags that are difficult to identify, and/or tags that do not match any known pretrained tag detection model, among other reasons.

At 2221, the final tag recognition results are outputted. In various embodiments, the tag recognition process performed by a tag recognition module is continually executed. In some embodiments, the final tag recognition results may be sent to an AICoRE server for further analysis. In various embodiments, the tag recognition process may be performed online by a cloud server. In various embodiments, the final tag recognition results may include information on the tags recognized such as a product description, inventory count, product pricing, return policy, or directions for using the product, etc. associated with a product having the recognized barcode and/or text. The extracted information may be used in part to generate a semantic location map.

Figure 23:
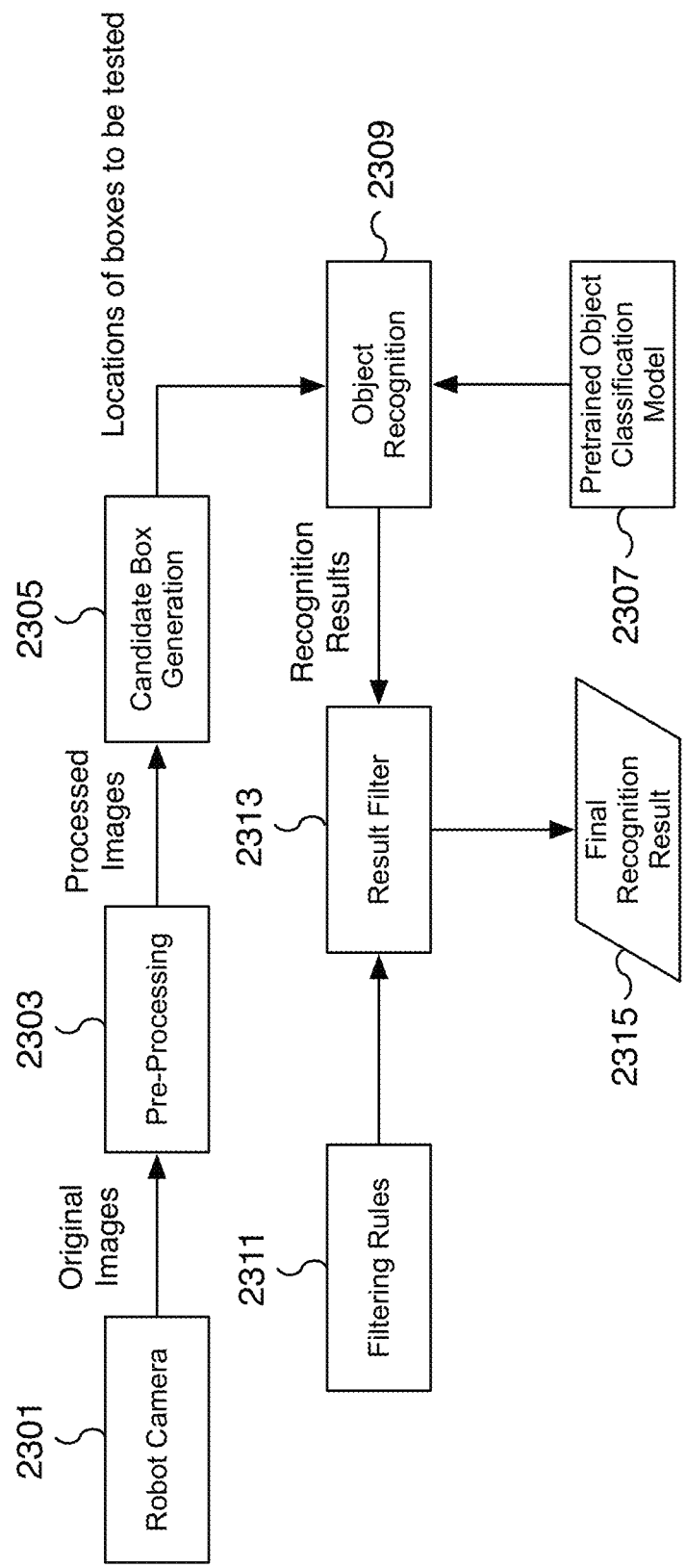
FIG. 23 is a flow diagram illustrating an embodiment of a process for performing object recognition by a context aware interactive robot.

FIG. 23 is a flow diagram illustrating an embodiment of a process for performing object recognition by a context aware interactive robot. In some embodiments, the process is used by context aware interactive robot 2001 of FIG. 20. In some embodiments, the process is performed by an information collection module such as information collection module 2109 of FIG. 21. In some embodiments, the process is performed by an object recognition sub-module of a vision module, such as vision module 2111 of FIG. 21. In various embodiments, the object recognition functionality is designed to recognize general objects from a retail environment where a context aware interactive robot is located, such as products on shelves. For example, an image is captured by a robot camera is processed for object recognition. The object recognition returns either (1) no object(s) (e.g., products) were detected or (2) information on the objects (e.g., products) recognized.

In some embodiments, as a context aware interactive robot moves around an indoor environment, it will detect multiple instances of the same object. Object detection and recognition has difficulty distinguishing similar objects from one another since the objects detected are not visually unique. The robot assigns a position to the detected object and checks if the object layer contains an object at that position. If an object exists at that position in the object layer, the detected object has already been detected previously and does not have to be added to the object layer. An object that exists in the object layer but cannot be detected is removed from the object layer. The object layer spatially segments the map based on the object category. In various embodiments, the extracted information can be provided to an information fusion module such as information fusion module 2115 of FIG. 21 to generate a semantic location map or to an AICoRE server such as AICoRE server module 2107 of FIG. 21 for further analysis.

At 2301, a robot camera captures an image. For example, a robot camera, such as cameras 2015 of FIG. 20, captures images of the environment of the robot. In various embodiments, the camera at 2301 is the camera of a context aware interactive robot. The robot camera at 2301 captures original images of the environment that are used as input to an object recognition module, such as an object recognition sub-module of vision module 2111 of FIG. 21.

At 2303, the images captured by the robot camera at 2301 are pre-processed. In various embodiments, one or more pre-processing steps may be performed to enhance and/or prepare the image for object recognition. For example, warping may be removed, noise may be removed, the image may be converted to a different format, and/or the captured image may be resized, among other appropriate techniques. The results of pre-processing at 2303 are processed images.

At 2305, box generation is performed to identify candidate objects. For example, a box generator is used on a processed image to generate candidate boundary boxes. In some embodiments, the candidate boundary boxes contain objects that have a high probability of being recognized. For example, using an image of a surrounding retail environment with products on retail shelves, one boundary box is generated for each product item. Each of the objects is likely to be identified using object recognition.

At 2307, a pretrained object classification model is used as an input to object recognition at 2309. In some embodiments, the pretrained object classification model is trained in advance on a variety objects and includes a model for each object that can be identified. In some embodiments, the object classification model is trained using a machine learning model. In various embodiments, the object classification model is used to recognize and identify of different objects such as products likely to be found in a retail environment.

At 2309, an object recognition module receives candidate boundary boxes and applies a pretrained object classification model to the objects at the location of the boundary boxes. In various embodiments, each candidate boundary box includes a location of the box relative to the processed image. The object recognition functionality is applied to each boundary box of the image using the pretrained object classification model to identify potential objects. The result of the object recognition functionality is the object recognition results.

At 2311, filtering rules are configured. In some embodiments, the rules are created ahead of time and may be updated dynamically. In various embodiments, the filtering rules are used to filter the results of object recognition. Examples of filtering rules include the rules based on the size of the recognized objects, confidence coefficients, the number of objects to recognize, a priority rating for recognizing objects, etc. In some embodiments, a filtering rule may require that the confidence an object is correctly recognized must exceed a particular threshold in order to determine that the recognition result is a final recognition result. Using filtering rules, objects recognized with lower probabilities are filtered out and not detected. In some embodiments, the filtering rules are based on the context of the performed object recognition.

At 2313, the filtering rules configured at 2311 and the object recognition results determined at 2309 are used to determine final recognition results. For example, the filtering rules configured at 2311 are used to filter recognition results determined at 2309. In various embodiments, two types of final recognition results are possible: (1) no object is detected and (2) an object is recognized. In some embodiments, the recognized object is an object within a certain proximity to the robot. In various embodiments, objects that are not detected may be due to low confidence coefficients, objects that are too far away or too small, objects that are difficult to identify, and/or objects that do not match any known pretrained object classification model, among other reasons.

At 2315, the final recognition results are outputted. In various embodiments, the object recognition process performed by an object recognition module is continually executed. In some embodiments, the final recognition results may be sent to an AICoRE server for further analysis. In various embodiments, the object recognition module may be performed online by a cloud server. In various embodiments, the final recognition results may include information on the objects recognized such as a product description, inventory count, product pricing, return policy, directions for using the product, etc. The extracted information may be used in part to generate a semantic location map.

In some embodiments, a place layer in combination with a tag layer and/or an object layer. A place layer allows an operator to directly describe an area of an indoor environment. Each grid of the place layer contains a set of information describing an area of an indoor environment. The operator can create a place layer for each robot by connecting to the robot with a tablet, computer, etc. The operator can select a group of grids to describe and the selected group is given a unique index. The selected group of grids can be given labels such as bathroom, stairs, food court, cashier, etc. The labels may be used to respond to user questions about locations. In various embodiments, an operator can describe the areas as accessible or not accessible to the robot. For example, an area not accessible to a robot can be assigned negative weight values in the costmap so that the robot does not traverse that location. The operator can also link the accessibility of areas with a label. For example, an operator can associate specific labels to denote that an area associated with the label is inaccessible to the robot.

Figure 24:
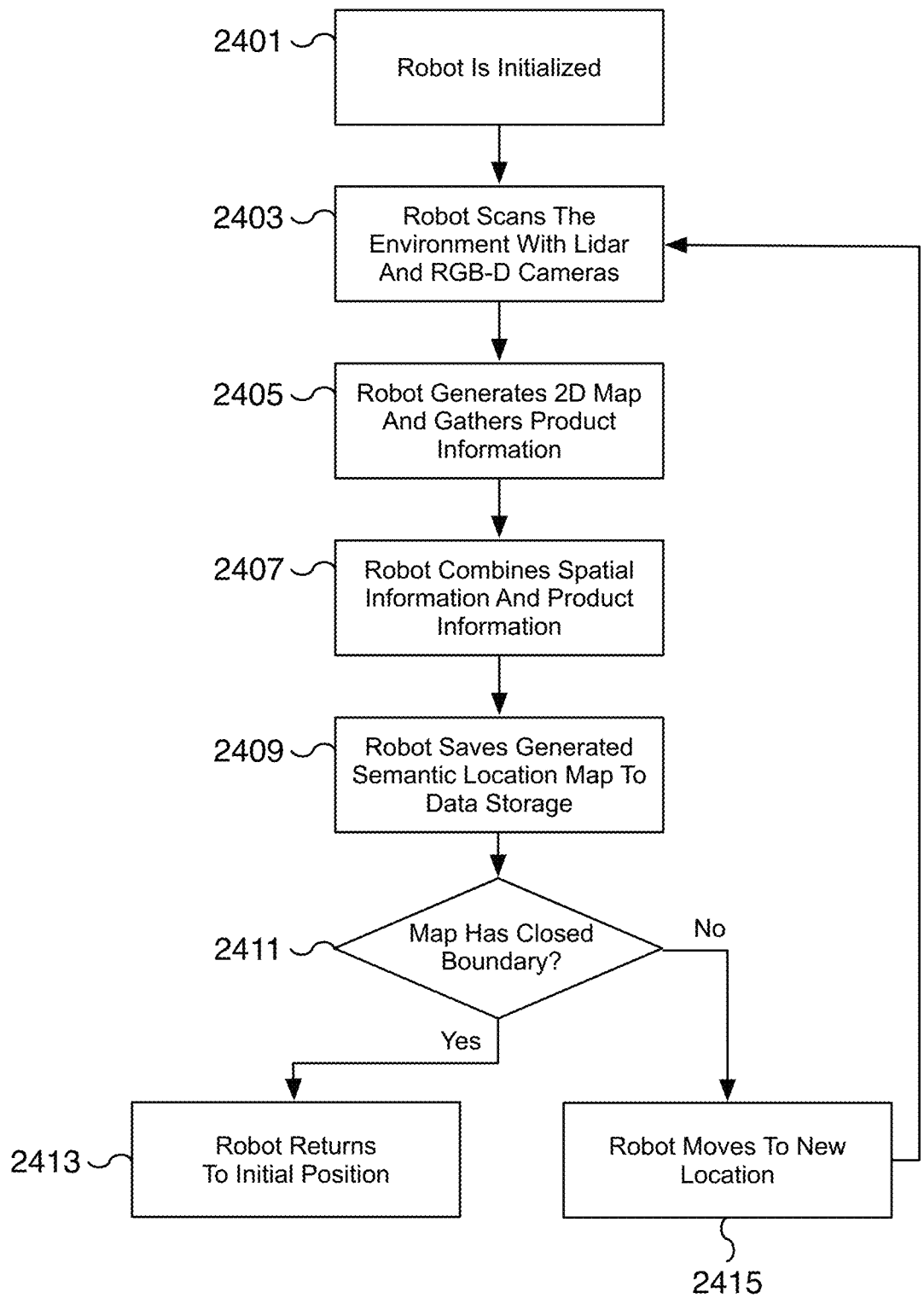
FIG. 24 is a flow diagram illustrating an embodiment of a process for generating a semantic location map.

FIG. 24 is a flow diagram illustrating an embodiment of a process for generating a semantic location map. In some embodiments, the process is used by a context aware interactive robot system such as the context aware interactive robot system of FIG. 19. A context aware interactive robot such as context aware interactive robot 2001 of FIG. 20 may implement portions of the process of FIG. 24. In some embodiments, the process is performed in part by an information fusion module such as information fusion module 2115 of FIG. 21 using the results of the processes of FIGS. 22 and 23. The process of FIG. 24 may be performed for a retail environment where a context aware interactive robot is located to generate a map that fuses product information of products available in the retail environment with spatial information of the retail environment.

At 2401, a context aware interactive robot is initialized. In various embodiments, the initialization includes generating an initial position. In some embodiments, the initialization includes initializing remote server functionality such as a module running on a remote or cloud server in addition to processing components embedded in the physical robot located in, for example, a retail environment.

At 2403, a context aware interactive robot scans the environment with lidar and RGB-D cameras. For example, 2D/3D Lidar and RGB-D cameras are used to capture the surrounding environment. Other appropriate sensors, including radar and ultrasonic sensors may be used as appropriate.

At 2405, a context aware interactive robot generates a 2D map and gathers product information. Based on the lidar scan results from 2403, including the lidar sensor results, a robot generates a spatial 2D/3D map. Based on the images captured by the robot cameras at 2403, a robot recognizes products and tags from the surrounding environment and retrieves associated product information of recognized products.

At 2407, a context aware interactive robot combines spatial information and product information. In some embodiments, using an information fusion module such as information fusion module 2115 of FIG. 21, a context aware interactive robot combines spatial information and product information together to generate a semantic location map.

At 2409, a context aware interactive robot saves the generated semantic location map to data storage. In some embodiments, the data storage is data storage 2119 of FIG. 21.

At 2411, a determination is made whether the 2D/3D map has a closed boundary. In the event the 2D/3D map has a closed boundary, processing continues to 2413. In the event the 2D/3D map does not have a closed boundary, processing continues to 2415.

At 2413, a context aware interactive robot will return to the initial position and stand by. In some embodiments, the robot will remain at the last scanned location. In some embodiments, the robot will move to a predetermined location such as the entrance of a retail location. In various embodiments, as part of the map generation process, the robot identifies areas for standing by such as entrances, meeting areas, focal areas, etc. and moves to one of the identified locations. In some embodiments, the standby location is based on the location of any other context aware interactive robots and/or retail staff in the environment.

At 2415, a context aware interactive robot moves to a new location. For example, the robot will move to the position where there is not a closed boundary. Processing loops back to 2403 where the robot will continue to scan the environment to complete the generation of a semantic location map.

Figure 25:
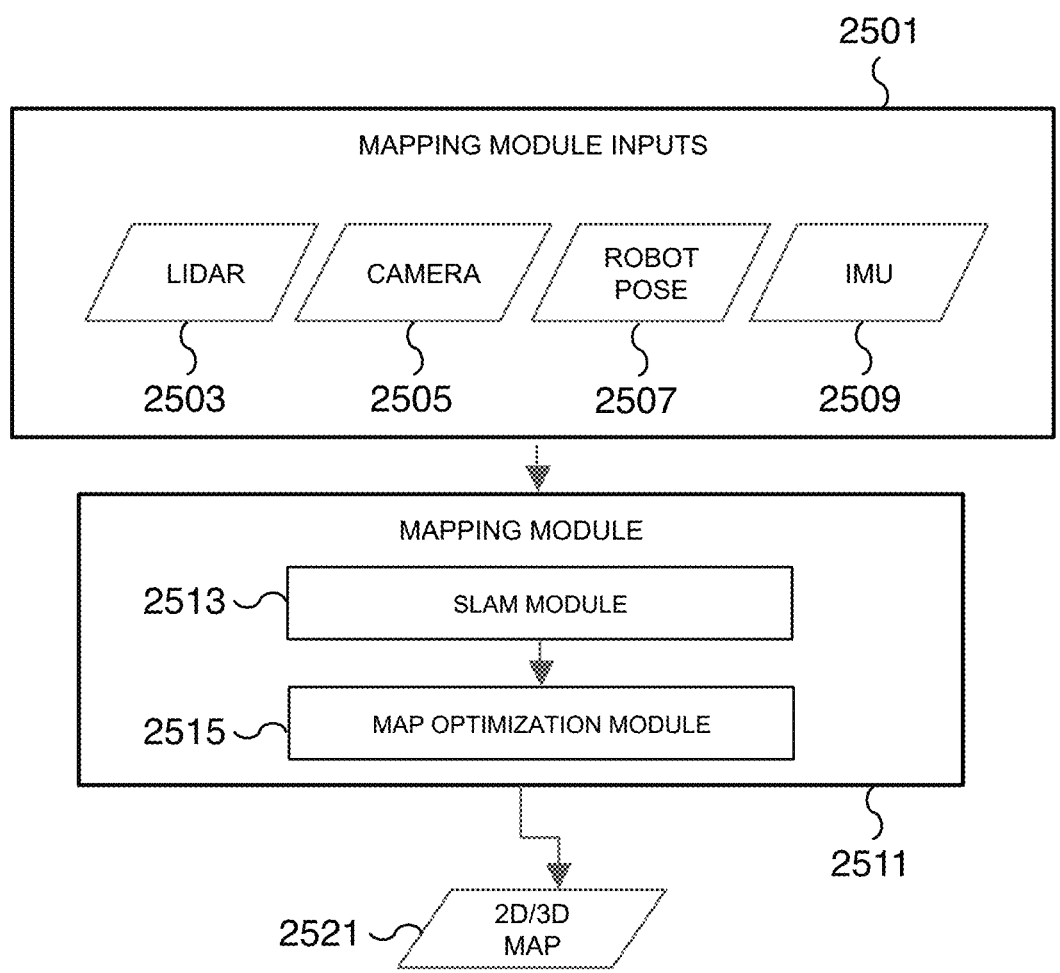
FIG. 25 is a block diagram illustrating an embodiment of a mapping module for a context aware interactive robot.

FIG. 25 is a block diagram illustrating an embodiment of a mapping module for a context aware interactive robot. In some embodiments, the mapping module of FIG. 25 is the mapping module of autonomous navigation module 2113 of FIG. 21. In the example shown, mapping module 2511 receives inputs from mapping module inputs 2501. Mapping module inputs 2501 include lidar input 2503, camera input 2505, robot pose input 2507, and inertia measurement unit (IMU) input 2509. Mapping module 2511 includes simultaneous localization and mapping (SLAM) module 2513 and map optimization module 2515. Mapping module 2511 outputs 2D/3D map 2521.

In some embodiments, mapping module 2511 receives one or more different inputs from mapping module inputs 2501. Lidar input 2503 and camera input 2505 may correspond to 2D/3D lidar laser scanner and RGB-D camera inputs, respectively. Robot pose input 2507 is the position and orientation of the context aware interactive robot. IMU input 2509 can be internal or external IMU measurements of the robot and can provide orientation information. In various embodiments, as a context aware interactive robot moves through the environment, such as an unknown environment, mapping module 2511 receives and collects input data from mapping module inputs 2501 to generate 2D/3D map 2521 of the robot's surroundings.

In some embodiments, SLAM module 2513 simultaneously estimates the location of the robot and maps the unknown environment. SLAM module 2513 outputs a 2D or 3D map of the environment that is used as an input to map optimization module 2515. In various embodiments, SLAM module 2513 outputs a map instantaneously and map optimization module 2515 improves the accuracy of the 2D/3D map by holistically processing the data. Map optimization module 2515 utilizes one or more methods to optimize the map of the environment created by SLAM module 2513. For example, using techniques such as noise removal and graph optimization, the output of map optimization module 2515 is a more accurate 2D or 3D map of robot's environment.

Figure 26:
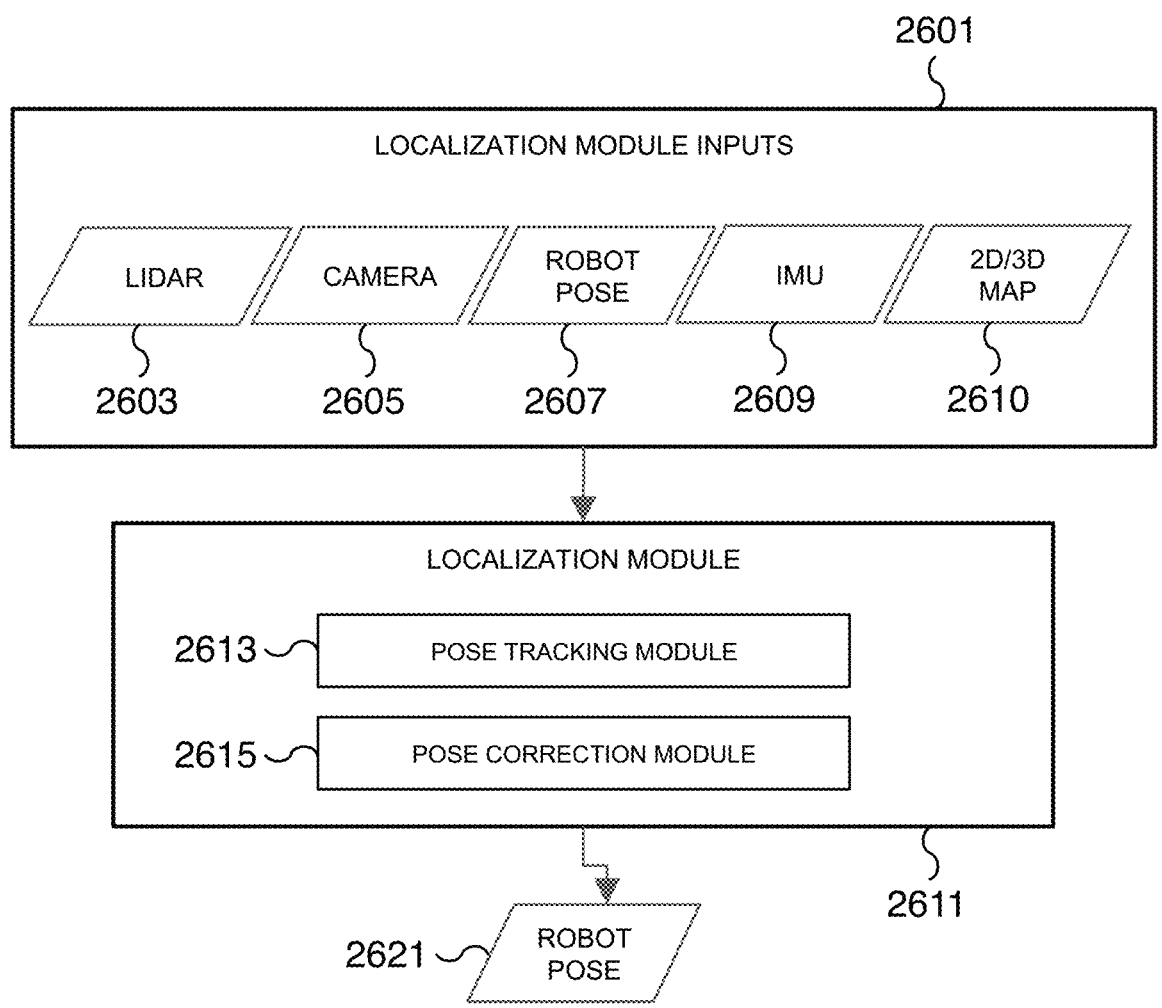
FIG. 26 is a block diagram illustrating an embodiment of a localization module for a context aware interactive robot.

FIG. 26 is a block diagram illustrating an embodiment of a localization module for a context aware interactive robot. In some embodiments, the localization module of FIG. 26 is the localization module of autonomous navigation module 2113 of FIG. 21. In the example shown, localization module 2611 receives inputs from localization module inputs 2601. Localization module inputs 2601 include lidar input 2603, camera input 2605, robot pose input 2607, inertia measurement unit (IMU) input 2609, and 2D/3D map input 2610. Localization module 2611 includes pose tracking module 2613 and pose correction module 2615. Localization module 2611 outputs robot pose 2621.

In some embodiments, localization module 2611 receives one or more different inputs from localization module inputs 2601. Lidar input 2603 and camera input 2605 may correspond to 2D/3D lidar laser scanner and RGB-D camera inputs, respectively. Robot pose input 2607 is the position and orientation of the context aware interactive robot. IMU input 2609 can be internal or external IMU measurements of the robot and can provide orientation information. In some embodiments, 2D/3D map input 2610 is a 2D/3D map of the robot's location. In some embodiments, localization module 2611 receives the same input as mapping module 2511 of FIG. 25 with the addition of 2D/3D map input 2610 that may be the output of a mapping module such as 2D/3D map 2521 of FIG. 25.

In various embodiments, as a context aware interactive robot moves through the environment, such as an unknown environment, localization module 2611 receives and collects input data from localization module inputs 2601 to determine the robot's location with respect to its surroundings and/or a 2D/3D map. In some embodiments, localization module 2611 utilizes localization module inputs 2601 to estimate a location of a robot within a map. Localization module 2611 compares the collected data with a 2D/3D map and estimates the current location of the robot.

In some embodiments, pose tracking module 2613 estimates a robot's location by calculating the robot movement between a current moment and a previous moment. Pose correction module 2615 compares the collected data of localization module inputs 2601 and the 2D/3D map of 2D/3D map input 2610 to reduce the accumulated errors in estimating the robot's location.

Figure 27:
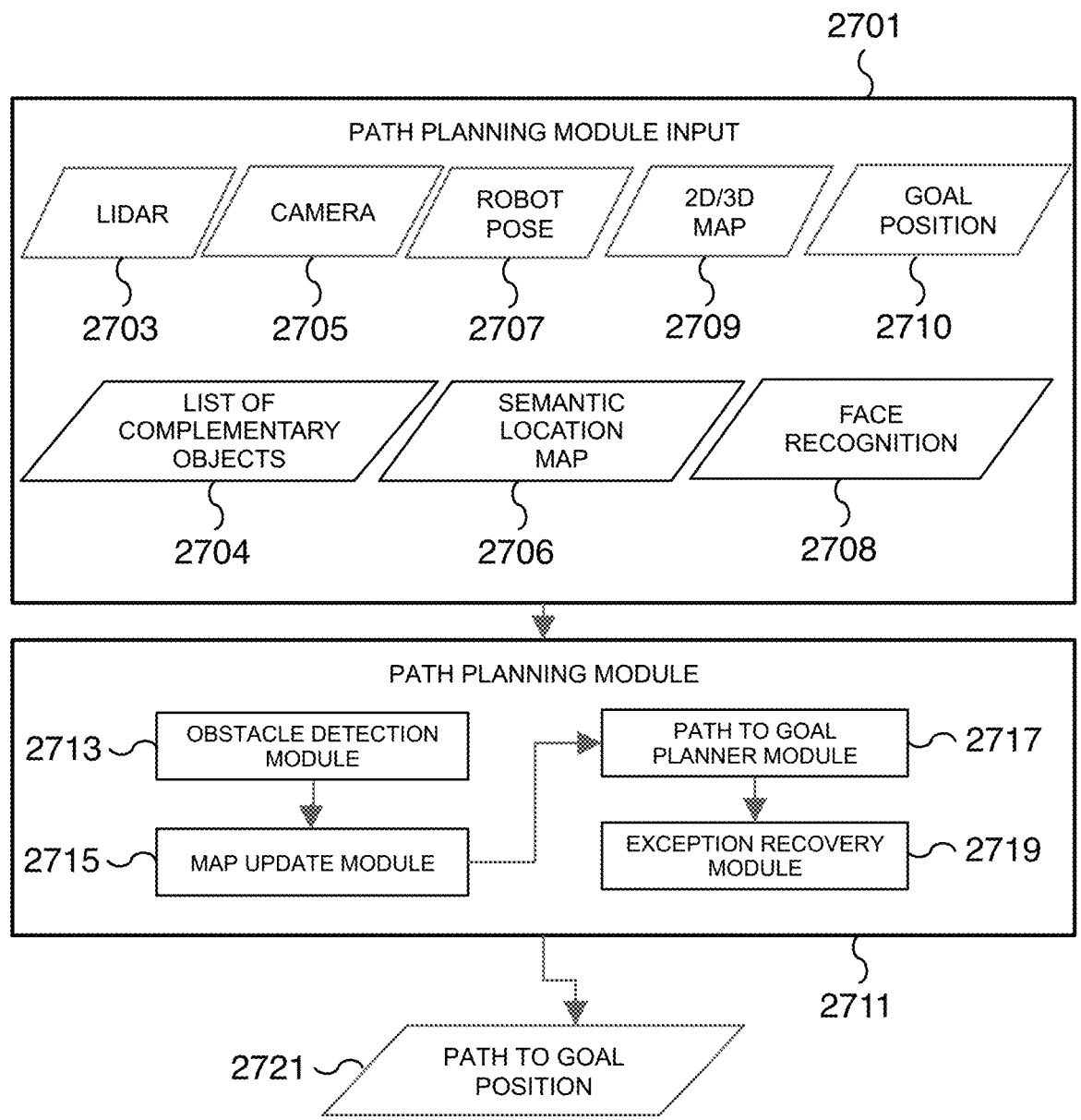
FIG. 27 is a block diagram illustrating an embodiment of a path planning module for a context aware interactive robot.

FIG. 27 is a block diagram illustrating an embodiment of a path planning module for a context aware interactive robot. In some embodiments, the path planning module of FIG. 27 is the path planning module of autonomous navigation module 2113 of FIG. 21. In the example shown, path planning module 2711 receives inputs from path planning module inputs 2701. Path planning module inputs 2701 include lidar input 2703, camera input 2705, robot pose input 2707, 2D/3D map input 2709, goal position input 2710, list of complementary objects input 2704, semantic location map input 2706, and face recognition input 2708. In some embodiments, path planning module inputs 2701 include additional inputs not shown. Path planning module 2711 includes obstacle detection module 2713, map update module 2715, path to goal planner module 2717, and exception recovery module 2719. Path planning module 2711 outputs path to goal position 2721.

In some embodiments, path planning module 2711 receives the same input as localization module 2611 of FIG. 26 with the addition of goal position input 2710, a robot location (not shown), face recognition input 2708, semantic location map input 2706, and list of complementary objects input 2704. In some embodiments, robot location (not shown) is the current location of a robot as estimated by a localization module such as localization module 2611 of FIG. 26. In some embodiments, goal position input 2710 is the destination of a robot, for example, a product location in a retail environment where a robot user plans to visit. In various embodiments, list of complementary objects input 2704 includes a list of objects and related information on the objects that are complementary to the product at the goal position. For example, complementary products may include products a customer is likely to want to purchase along with the desired product at the goal position. In some embodiments, the list of complementary objects input 2704 is predicted using AICoRE based on the previous buying history of the user or other users. In various embodiments, face recognition input 2708 includes face detection and recognition results. In some embodiments, semantic location map input 2706 is 2D/3D map with product information 2123 of FIG. 21 and is the output of an information fusion module, such as information fusion module 2115 of FIG. 21.

In some embodiments, path planning module 2711 generates the optimal route from the current robot position to the goal position. The output of path planning module 2711 is path to goal position 2721. In various embodiments, path to goal position 2721 is described as a set of points. Path planning module 2711 determines path to goal position 2721 using sub-modules: obstacle detection module 2713, map update module 2715, path to goal planner module 2717, and exception recovery module 2719. Obstacle detection module 2713 detects non-static objects that are not part of the environment. Non-static objects are present in the collected data but do not exist on the 2D/3D map. Map update module 2715 adds the detected non-static objects of obstacle detection module 2713 into the 2D/3D map. Map update module 2715 outputs a map with non-static objects. Path to goal planner module 2717 uses the map updated with non-static objects by map update module 2715 to find the optimal route from the current position of a robot to the goal position. Path to goal planner module 2717 outputs path to the goal position 2721. Exception recovery module 2719 is activated when a path to the goal position cannot be generated. Exception recovery module 2719 may repeat the process of generating the path to the goal position or execute a recovery action.

In some embodiments, the optimal route depends on the physical distance between the robot position, the goal position, and the history of the user's product consumption. The optimal route may be selected to allow the user to pass by other products that are related to (or complementary to) the product at the goal position. For example, a robot guiding the user to the soda section passes by the cup section because the user's previously history indicates the user buys cups when buying a bottle of soda. Path planner module 2711 accepts list of complementary objects input 2704 that includes objects related to the product at the goal position along with values that are commensurate to the relationship of each object with the product at the goal position. In some embodiments, AICoRE provides list of complementary objects input 2704. List of complementary objects input 2704 may be uniquely generated and customized for each individual user. In some embodiments, the user is identified by face recognition.

In various embodiments, path planner module 2711 uses a costmap. A costmap may include a two-dimensional map that represents a physical area divided into grids. Each value in the costmap representing an individual grid can contain a positive or negative weight value. Negative weight values are used to indicate walls, static objects, and obstacles, etc. that the robot has to go around. Positive weight values are given to grids associated with each of the objects in list of complementary objects input 2704 for objects related to the product at the goal position. For example, grids near (or adjacent) to grids containing complementary objects are assigned higher weight values as compared to grids not containing complementary objects. This allows path planner module 2711 to create a path that passes by a complementary object without colliding into the complementary object. The weight value given to a grid near a complementary object depends on the relationship between the complementary object and the product at the goal position. For example, the stronger the relationship the higher the assigned weight value. In some embodiments, a grid with an object (such as a complementary object) is assigned a negative weight value to avoid traversing into the object at the grid location. Path planner module 2711 attempts to create a path that traverses positive weight values on the costmap while avoiding negative weight values. Path planning module 2711 also sets the speed of the robot traversing an area using the semantic location information. For example, the robot slows down when traversing areas with objects that are fragile.

Figure 28:
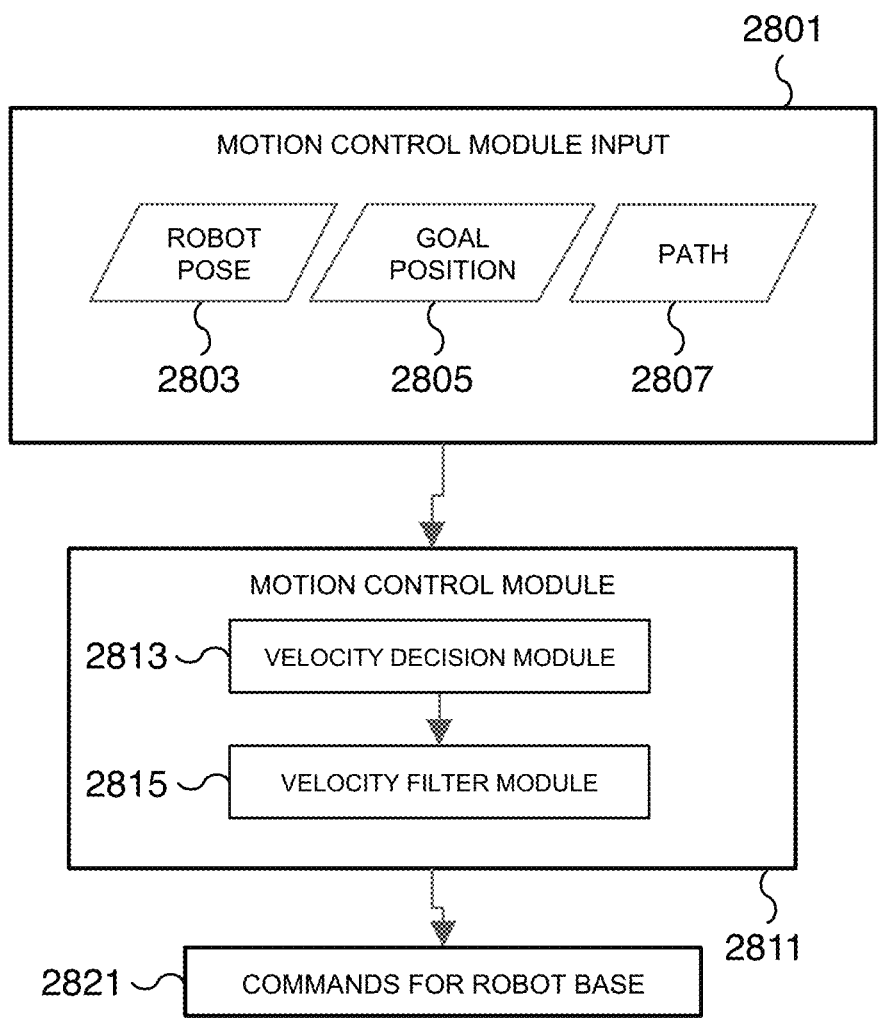
FIG. 28 is a block diagram illustrating an embodiment of a motion control module for a context aware interactive robot.

FIG. 28 is a block diagram illustrating an embodiment of a motion control module for a context aware interactive robot. In some embodiments, the motion control module of FIG. 28 is the motion control module of autonomous navigation module 2113 of FIG. 21. In the example shown, motion control module 2811 receives inputs from motion control module inputs 2801. Motion control module inputs 2801 include robot pose 2803, goal position 2805, and path 2807. In some embodiments, motion control module inputs 2801 include additional inputs not shown. In various embodiments, path 2807 is a path to goal position, such as path to goal position 2721 of FIG. 27, and is generated by a path planning module such as path planning module 2711 of FIG. 27. Motion control module 2811 includes velocity decision module 2813 and velocity filter module 2815. Motion control module 2811 outputs commands for robot base 2821. Commands for robot base 2821 may be used to control a context based interactive robot such as context based interactive robot 2001 of FIG. 20.

In some embodiments, motion control module 2811 determines the speed of the robot while it moves along the optimal path to the goal position. The output of motion control module 2811 is commands for robot base 2821 that includes a set of commands for the robot to control the direction and speed of robot movement. Motion control module 2811 utilizes two sub-modules: velocity decision module 2813 and velocity filter module 2815. Velocity decision module 2813 sets the velocity of the robot using the current robot location and path to goal. Velocity filter module 2815 smoothens the velocity established by velocity decision module 2815. In various embodiments, velocity filter module 2815 smoothens out the velocity of the robot so the movement of the robot seems more natural.

In various embodiments, using the techniques described herein, including the mapping module, localization module, path planning module, and motion control module of FIGS. 25-28, respectively, a context aware interactive robot is capable of providing a variety of interactive services based on the context of the robot user and/or robot. For example, with the support of the described modules, some of the services a context aware interactive robot system can provide include: engaging in a conversation with a customer, providing product information based on a customer's description, providing product information based on a photo that a customer shows the robot, and guiding the customer to a product location that the customer desires to visit.

Figure 29:
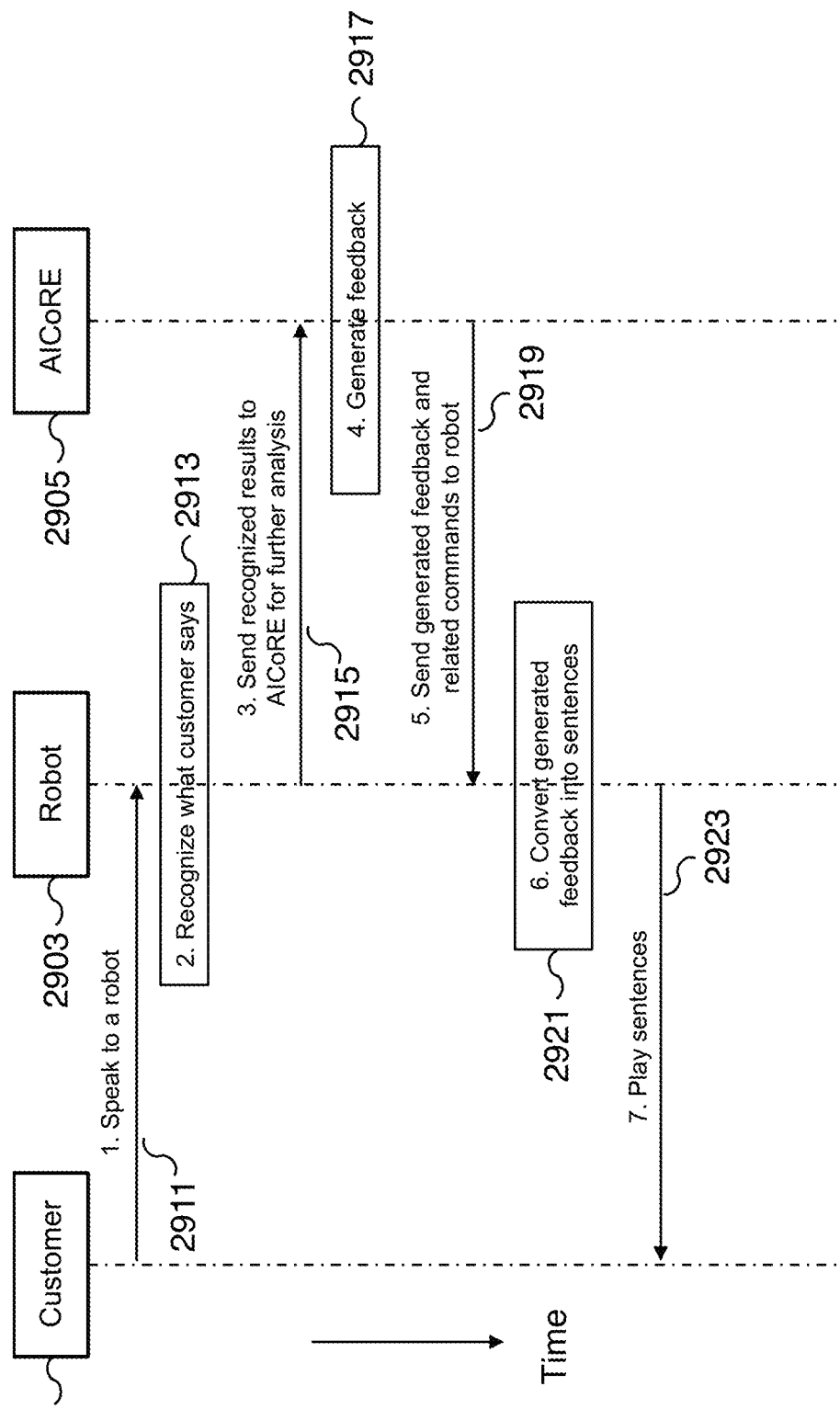
FIG. 29 is an interaction diagram illustrating an embodiment of a process for performing a conversation between a customer and a context aware interactive robot.

FIG. 29 is an interaction diagram illustrating an embodiment of a process for performing a conversation between a customer and a context aware interactive robot. In some embodiments, the process is performed by the context aware interactive robot system of FIG. 19. In some embodiments, the process of FIG. 29 uses context aware interactive robot 2001 of FIG. 20. In the example shown, the process describes the interactions between customer 2901, context aware interactive robot 2903, and AICoRE server 2905. In some embodiments, context aware interactive robot 2903 is context aware interactive robot 1905 of FIG. 19 and/or context aware interactive robot 2001 of FIG. 20. In some embodiments, AICoRE server 2905 is AICoRE server 1911 of FIG. 19 and corresponds to AICoRE server module 2107 of FIG. 21.

In the example shown, customer 2901 can speak to robot 2903 and ask a question. Robot 2903 then recognizes what customer 2901 says and sends the recognized speech to AICoRE server 2905. Using the received information, AICoRE server 2905 generates suitable feedback, such as an answer to customer's question, and sends the feedback to robot 2903. After receiving the feedback, robot 2903 converts the feedback into speech sentences and plays the speech sentences to customer 2901 using its speakers. Robot 2903 can also convert the feedback into images and show to customer 2901 the images on its screen.

At 2911, customer 2901 speaks to context aware interactive robot 2903.

At 2913, context aware interactive robot 2903 recognizes the speech of customer 2901. In some embodiments, the speech is recognized using natural language understanding.

At 2915, context aware interactive robot 2903 sends the recognized speech results to AICoRE server 2905 for further analysis.

At 2917, AICoRE server 2905 generates feedback. In various embodiments, the feedback is based on the recognized speech and context. In some embodiments, the feedback includes commands for the robot.

At 2919, AICoRE server 2905 sends the generated feedback and related commands to robot 2903.

At 2921, context aware interactive robot 2903 converts the generated feedback into sentences. For example, using natural language generation, context aware interactive robot 2903 converts sentences into natural language sentences for customer 2901.

At 2923, context aware interactive robot 2903 plays the sentences to customer 2901. In some embodiments, the sentences are played through speakers of context aware interactive robot 2903.

Figure 30:
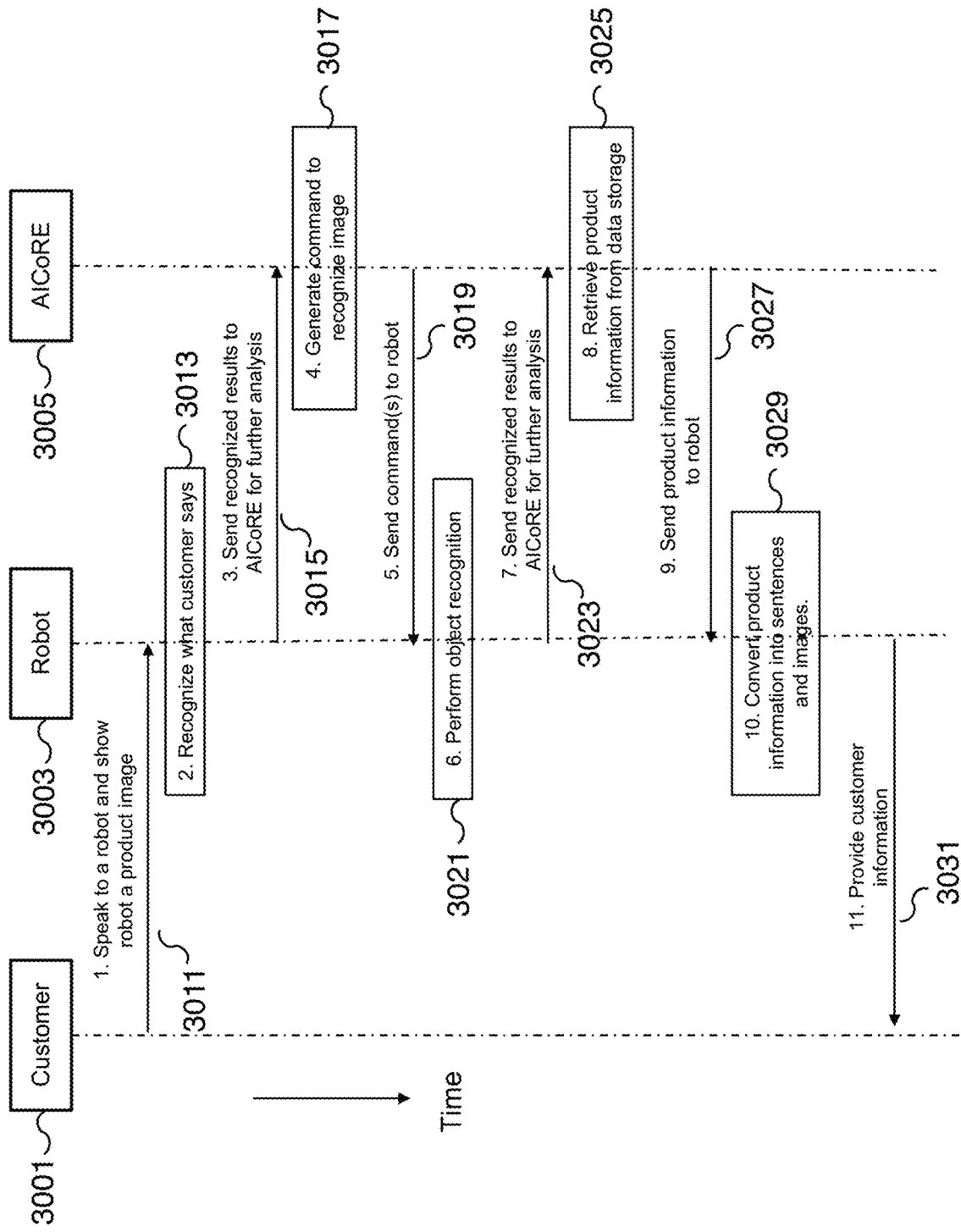
FIG. 30 is an interaction diagram illustrating an embodiment of a process for providing product information based on a photo provided by a customer to a context aware interactive robot.

FIG. 30 is an interaction diagram illustrating an embodiment of a process for providing product information based on a photo provided by a customer to a context aware interactive robot. In some embodiments, the process is performed by the context aware interactive robot system of FIG. 19. In some embodiments, the process of FIG. 30 uses context aware interactive robot 2001 of FIG. 20. In the example shown, the process describes the interactions between customer 3001, context aware interactive robot 3003, and AICoRE server 3005. In some embodiments, context aware interactive robot 3003 is context aware interactive robot 1905 of FIG. 19 and/or context aware interactive robot 2001 of FIG. 20. In some embodiments, AICoRE server 3005 is AICoRE server 1911 of FIG. 19 and corresponds to AICoRE server module 2107 of FIG. 21.

In the example shown, customer 3001 speaks to robot 3003 and shows robot 3003 an image of a desired item. The image may be a photo of a product that customer 3001 is looking to purchase. Robot 3003 recognizes what customer 3001 says and sends the recognized speech to AICoRE server 3005. Using the information received, AICoRE server 3005 will send a command to robot 3003 to recognize an image. Robot 3003 will use an object recognition module to perform object recognition on images shown to robot 3003 by customer 3001. The recognized product name or type is sent to AICoRE server 3005. AICoRE server 3005 retrieves related product information from data storage and sends the information to robot 3003. After receiving the related information, robot 3005 will show the information to customer 3001.

At 3011, customer 3001 speaks to context aware interactive robot 3003 and shows context aware interactive robot 3003 a product image.

At 3013, context aware interactive robot 3003 recognizes the speech of customer 3001. In some embodiments, the speech is recognized using natural language understanding.

At 3015, context aware interactive robot 3003 sends the recognized speech results to AICoRE server 3005 for further analysis.

At 3017, AICoRE server 3005 generates a command to recognize a presented product image. In various embodiments, the command is based on the recognized speech of customer 3001. For example, the speech of customer 3001 may request more information about a product from a photo.

At 3019, AICoRE server 3005 sends command(s) to context aware interactive robot 3003.

At 3021, context aware interactive robot 3003 performs object recognition. For example, context aware interactive robot 3003 performs object recognition on a photo that includes a product that customer 3001 is requesting additional information about. The results of object recognition may include a product type and/or product name of a product in a presented photo.

At 3023, context aware interactive robot 3003 sends recognized results to AICoRE server 3005 for further analysis.

At 3025, AICoRE server 3005 retrieves product information from data storage.

At 3027, AICoRE server 3005 sends the retrieved product information to context aware interactive robot 3003.

At 3029, context aware interactive robot 3003 converts the product information into sentences and/or images. For example, the product information is converted to natural language sentences and the images may be extracted for display.

At 3031, context aware interactive robot 3003 provides customer 3001 with product information. For example, context aware interactive robot 3003 presents the product pricing, product location, product directions, etc. to customer 3001. In some embodiments, the product information is presented on a display of robot 3003 and/or presented audibly using natural language generation via speakers of robot 3003.

Figure 31:
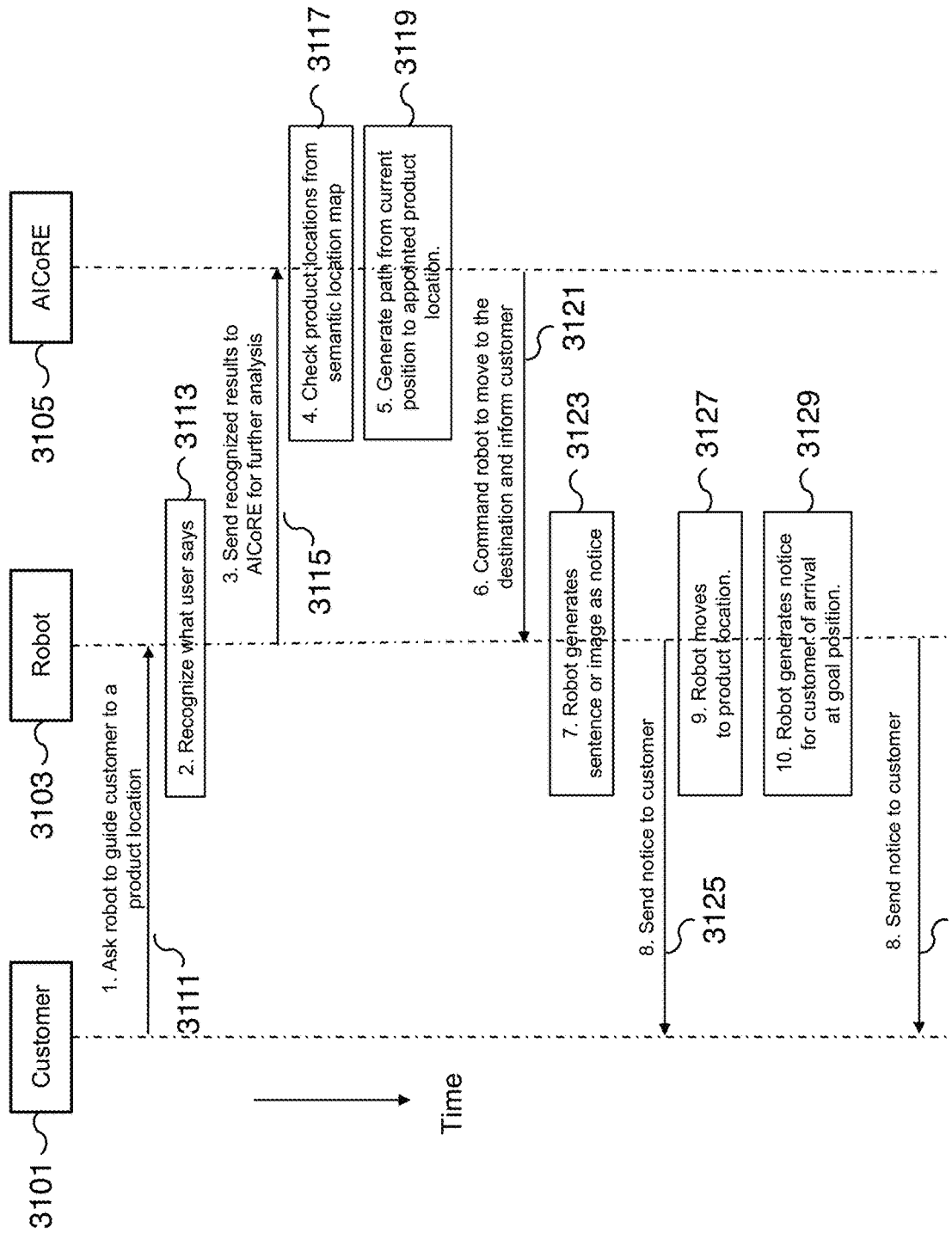
FIG. 31 is an interaction diagram illustrating an embodiment of a process for guiding a customer to the location of a desired product using a context aware interactive robot.

FIG. 31 is an interaction diagram illustrating an embodiment of a process for guiding a customer to the location of a desired product using a context aware interactive robot. In some embodiments, the process is performed by the context aware interactive robot system of FIG. 19. In some embodiments, the process of FIG. 31 uses context aware interactive robot 2001 of FIG. 20. In the example shown, the process describes the interactions between customer 3101, context aware interactive robot 3103, and AICoRE server 3105. In some embodiments, context aware interactive robot 3103 is context aware interactive robot 1905 of FIG. 19 and/or context aware interactive robot 2001 of FIG. 20. In some embodiments, AICoRE server 3105 is AICoRE server 1911 of FIG. 19 and corresponds to AICoRE server module 2107 of FIG. 21. In some embodiments, the process of FIG. 31 is performed to guide customer 3101 to a product after information about a desired product is provided to customer 3101 by robot 3103 as described with respect to FIG. 30.

In the example shown, customer 3101 asks robot 3103 to guide customer 3101 to a desired product's location, for example, after receiving information about a desired product as described with respect to FIG. 30. Robot 3103 recognizes the speech of customer 3101 and sends the recognized results to AICoRE server 3105. Based on the received product information, AICoRE server 3105 looks up the product's location(s) from a semantic location map. In some embodiments, the semantic location map is generated as described with respect to FIG. 24. AICoRE server 3105 generates a path from the current position of robot 3103 to the determined product position. AICoRE server 3105 sends commands and the generated path to robot 3103. Robot 3103 informs customer 3101 of its guidance then guides customer 3101 to the product location. After arrival, robot 3103 informs customer 3101 that the destination has been reached. In some embodiments, robot 3103 then returns to its original position (not shown).

At 3111, customer 3101 asks context aware interactive robot 3103 to guide customer 3101 to a product location.

At 3113, context aware interactive robot 3103 recognizes the speech of customer 3101. In some embodiments, the speech is recognized using natural language understanding.

At 3115, context aware interactive robot 3103 sends the recognized speech results to AICoRE server 3105 for further analysis.

At 3117, AICoRE server 3105 checks for product locations from a semantic location map. In various embodiments, the semantic location map fuses spatial information with product information.

At 3119, AICoRE server 3105 generates a path from the current position of context aware interactive robot 3103 to the appointed product location. For example, a path is determined that starts from the current location of customer 3101 and robot 3103 and ends at the location of the desired product.

At 3121, AICoRE server 3105 sends command(s) to context aware interactive robot 3103 to move to the destination and to inform customer 3101 of its intended guidance.

At 3123, context aware interactive robot 3103 generates a sentence and/or image as notice to customer 3101 of its intended guidance.

At 3125, context aware interactive robot 3103 sends notice to customer 3101 of its intended guidance. For example, context aware interactive robot 3103 presents the path to the desired product to customer 3101. In some embodiments, the path is presented on a display of robot 3103 and/or one or more sentences related to the intended guidance is presented audibly using natural language generation via speakers of robot 3103. In various embodiments, customer 3101 is informed by context aware interactive robot 3103 that context aware interactive robot 3103 is prepared to guide customer 3101 to the location of the desired product.

At 3127, context aware interactive robot 3103 moves to the product location. For example, context aware interactive robot 3103 follows the generated path from the current location to the product location.

At 3129, context aware interactive robot 3103 generates a notice for customer 3101 of their arrival at the goal position. For example, once context aware interactive robot 3103 arrives at the product location, a notice to inform customer 3101 is generated.

At 3131, context aware interactive robot 3103 sends notice to customer 3101 of their arrival at the product location. For example, context aware interactive robot 3103 informs customer 3101 that they have arrived at the location of the product. In some embodiments, the notice is presented on a display of robot 3103 and/or one or more sentences related to the arrival is presented audibly using natural language generation via speakers of robot 3103.

Figure 32:
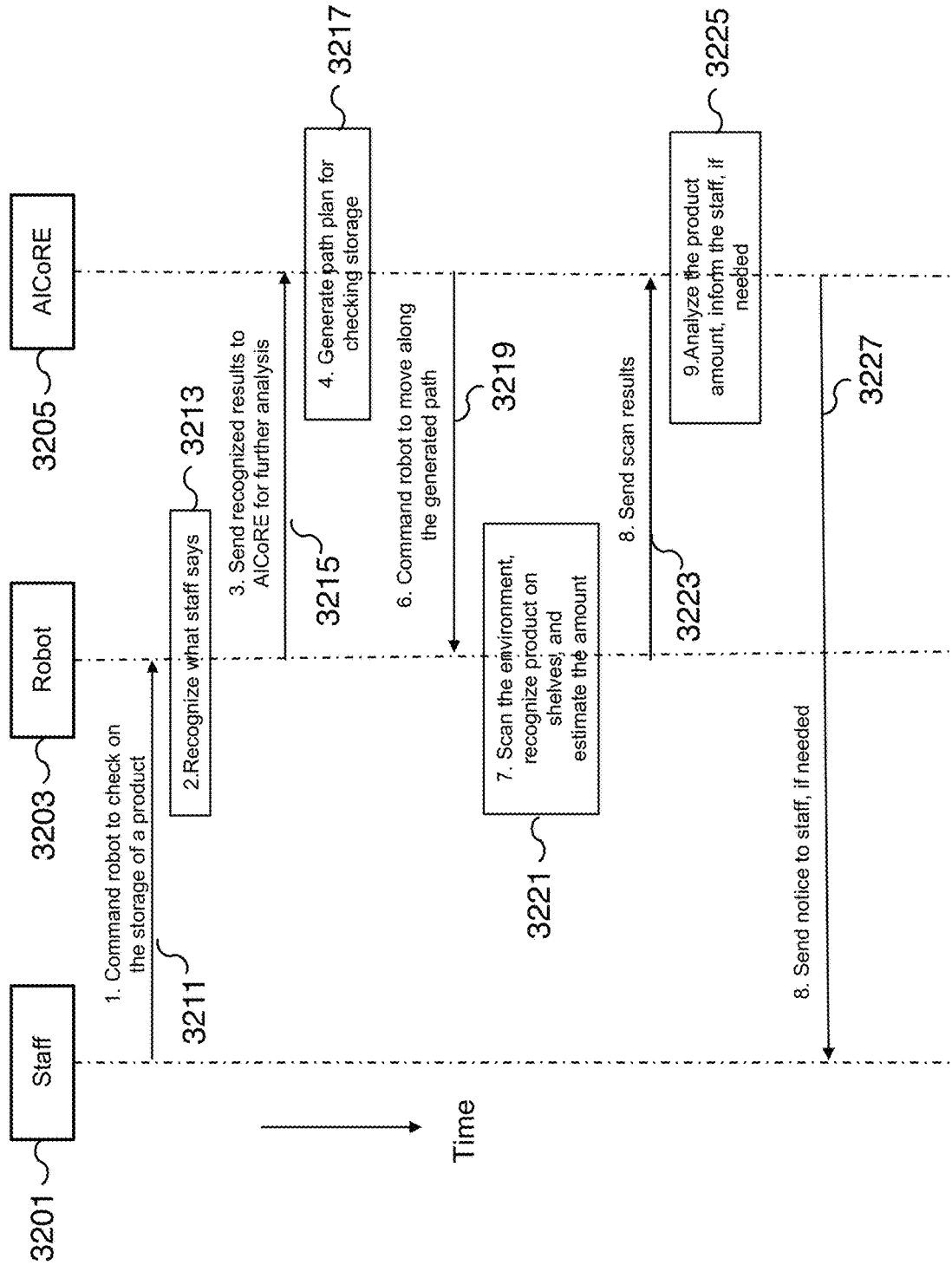
FIG. 32 is an interaction diagram illustrating an embodiment of a process for verifying inventory for a desired product using a context aware interactive robot.

FIG. 32 is an interaction diagram illustrating an embodiment of a process for verifying inventory for a desired product using a context aware interactive robot. In some embodiments, the process is performed by the context aware interactive robot system of FIG. 19. In some embodiments, the process of FIG. 32 uses context aware interactive robot 2001 of FIG. 20. In the example shown, the process describes the interactions between staff 3201, context aware interactive robot 3203, and AICoRE server 3205. In some embodiments, context aware interactive robot 3203 is context aware interactive robot 1905 of FIG. 19 and/or context aware interactive robot 2001 of FIG. 20. In some embodiments, AICoRE server 3205 is AICoRE server 1911 of FIG. 19 and corresponds to AICoRE server module 2107 of FIG. 21.

In the example shown, staff 3201 commands robot 3203 to check the inventory of a product. Robot 3203 recognizes the speech command of staff 3201 and sends the recognized speech to AICoRE server 3205 for further analysis. AICoRE server 3205 generates a path for robot 3203 to check the inventory storage locations. AICoRE server 3205 sends a path and related command(s) to robot 3203. After receiving the commands, robot 3203 starts to move according to the path received. As robot 3203 moves along the path, it scans for and recognizes the desired product on shelves. The information of recognized products and related locations is sent back to AICoRE server 3205. In some embodiments, robot 3203 uses a semantic location map, products, and tags to estimate the rough location of shelves. Robot 3203 may distinguish walls from shelves by the presence of tags and products on the semantic location map. The depth of the shelves may be determined by the average depth of a group of tags on the same shelf. In some embodiments, the depletion of a product is detected when the difference between the depth of the shelf and the depth of the product is above a certain threshold. In various embodiments, AICoRE server 3205 compares the received information with the information stored in a semantic location map. Based on the comparison, AICoRE server 3205 will notify staff 3201 to replenish a product, if needed.

At 3211, staff 3201 commands context aware interactive robot 3203 to check on the storage of a product. For example, staff 3201 is a retail staff worker at a retail location and is verifying the inventory of a product including the number of the product in stock and the locations where the product is being stored. The inventory check includes determining all the storage locations of a particular product. Using robot 3203, staff 3201 issues a command to robot 3203 to check where the product is being stored.

At 3213, context aware interactive robot 3203 recognizes the speech of staff 3201. In some embodiments, the speech is recognized using natural language understanding.

At 3215, context aware interactive robot 3203 sends the recognized speech results to AICoRE server 3205 for further analysis.

At 3217, AICoRE server 3205 generates a path for checking the storage of the desired product. For example, the path may traverse through the entire retail environment to confirm the locations of the product. In some embodiments, the path may only traverse areas that are potential storage locations of the product. In some embodiments, the path is generated using a semantic location map.

At 3219, AICoRE server 3205 sends command(s) to context aware interactive robot 3203 to move along the generated path. In some embodiments, one or more commands may be needed to direct context aware interactive robot 3203 to move along the path.

At 3221, context aware interactive robot 3203 scans the environment, recognizes the product on shelves, and estimates the amount of product stored. For example, context aware interactive robot 3203 scans its surrounding environment as it traverses along the generated path. As it scans, context aware interactive robot 3203 performs object and tag recognition to identify the desired product. The location of any recognized product is stored and the count of the recognized product is updated to estimate the total number of the stored product.

At 3223, context aware interactive robot 3203 sends scan results to AICoRE server 3205. For example, the scan results including the location(s) and total storage count of the product are sent to AICoRE server 3205 for further analysis.

At 3225, AICoRE server 3205 analyzes the product amount and informs staff 3201 of the analysis results, if needed. For example, AICoRE server 3205 analyzes the count and associated location of the product and may determine that the product needs to be resupplied. Based on the analysis, AICoRE server 3205 may determine a notice to staff 3201 is appropriate.

At 3227, AICoRE server 3205 sends a notice to staff 3201, if needed. For example, in the event product inventory is low, AICoRE server 3205 informs staff 3201 that the product needs to be resupplied. In various embodiments, additional notices may be appropriate. For example, AICoRE server 3205 may inform staff 3201 that certain items of the product are stored in the wrong location. As another example, AICoRE server 3205 may inform staff 3201 that certain storage locations of the product are low while other locations are not. AICoRE server 3205 may suggest moving some inventory from one location to another based on the analysis results.

Figure 33:
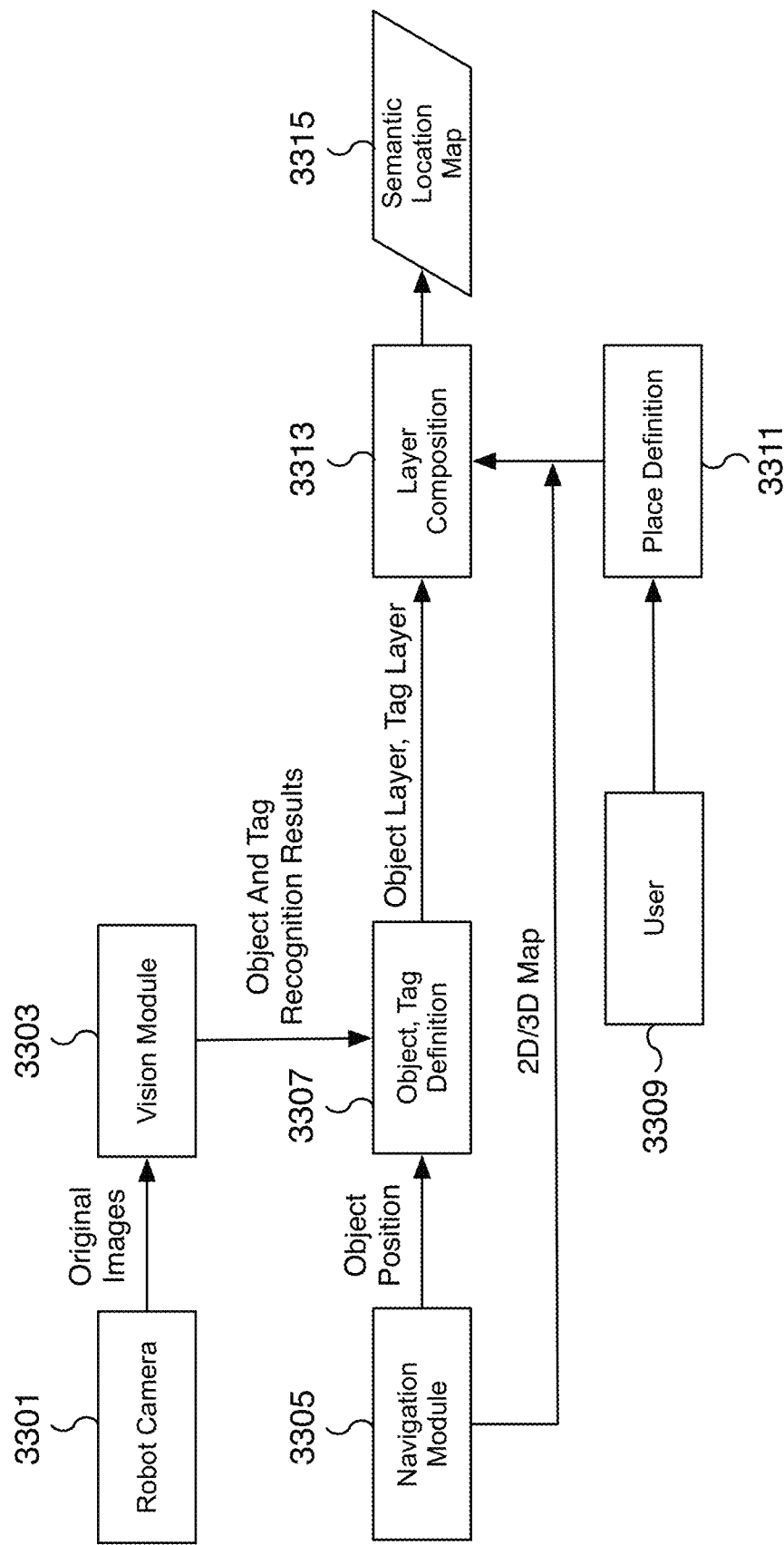
FIG. 33 is a flow diagram illustrating an embodiment of a process for generating a semantic location map using layer composition.

FIG. 33 is a flow diagram illustrating an embodiment of a process for generating a semantic location map using layer composition. In some embodiments, the process is performed by an information fusion module such as information fusion module 2115 of FIG. 21 using the results of a vision module such as vision module 2111 of FIG. 21 and an autonomous navigation module such as autonomous navigation module 2109 of FIG. 21. The process of FIG. 33 may be performed for a retail environment where a context aware interactive robot is located to generate a map that fuses product information of products available in the retail environment with spatial information of the retail environment. In addition, the process of FIG. 33 uses a place layer that may be created by a human operator. In the example shown, the process of FIG. 33 uses layer composition on input that includes a 2D/3D map, a tag layer, an object layer, and a place layer to generate a semantic location map. In some embodiments, the resulting semantic location map 3315 is 2D/3D map with product information 2123 of FIG. 21.

At 3301, a context aware interactive robot such as context aware interactive robot 1905 of FIG. 19 and/or context aware interactive robot 2001 of FIG. 20 captures original images using the robot's camera. The original images are fed to a vision module such as vision module 2111 of FIG. 21.

At 3303, a vision module processes original images and generates object and tag recognition results. In various embodiments, the vision module utilizes a tag recognition module and an object recognition module. In some embodiments, the vision module uses the process of FIG. 22 for tag recognition and the process of FIG. 23 for object recognition.

At 3305, a navigation module outputs an object position and a 2D/3D map. For example, the navigation module outputs the current location of the robot and a spatial map of the robot's surroundings.

At 3307, recognized objects and tags are defined in their respective layers. For example, an object layer is created using object recognition results and a tag layer is created using tag recognition results. In various embodiments, the corresponding layers include object and tag product information.

At 3309 a human user provides place input. For example a human user provides place information such as the location (and associated information) of restrooms, food courts, rest areas, cashiers, changing rooms, exits, elevators, escalators, etc. for a retail location as input for a place definition. In various embodiments, a human operator based on place locations of the retail environment curates the place layer.

At 3311, places are defined in a place layer using the input from the user at 3309.

At 3313, layer composition is performed. For example, using as inputs an object layer, a tag layer, a place layer, and a 2D/3D map, the various layers are composited to generate a semantic location map. The position of each product tag information from the tag layer and the position of each object label from the object layer is added to the semantic location map. In some embodiments, the tag layer contains the tag information clustered into object categories and the object layer contains object information clustered into object categories.

At 3315, a semantic location map is generated. An area (e.g., a grid location) where both the tag layer and the object layer have the same object category is denoted with a high confidence value on the semantic location map. In some embodiments, areas where the tag layer and object layer differ have a confidence value that depends on the spatial proximity of the object category to areas of the semantic location map with high confidence values. The place information is added on the semantic location map directly from the place layer.

FIG. 34 is diagram illustrating the progression of an embodiment of a process for creating a semantic location map. The progression depicts component maps 2D/3D map 3401, tag layer map 3403, object layer map 3405, and place layer map 3407 used to generate final semantic location map 3409. In various embodiments, the component maps are used to create a final semantic map. In some embodiments, the process depicted by FIG. 34 is used by an information fusion module such as information fusion module 2115 of FIG. 21 to generate a 2D/3D map with product information such as 2D/3D map with product information 2123 of FIG. 21. In some embodiments, the different component maps of FIG. 34 are representative of the layers used by the process of FIG. 33.

In the example shown, 2D/3D map 3401 includes 2D/3D map colored grids at locations (1, 1), (2, 1), (3, 1), (4, 1), (5, 1), (6, 1), (7, 1), (8, 1), (8, 2), (8, 3), (8, 4), (8, 5), (8, 6), (8, 7), and (8, 8). The 2D/3D map colored grids represent obstacles at their respective locations such as walls that the robot cannot traverse.

Tag layer map 3403 is created using the result of tag detection and tag recognition. Tag layer map 3403 has a tag layer colored grid at location (3,3) based on the result of tag detection and recognition. The tag layer colored grid at location (3,3) contains information such as the brand, object category, price, etc. of a detected and recognized tag.

Object layer map 3405 is created using the result of object detection and recognition. Colored layer map 3405 has an object layer colored grid at locations (3, 3), (3, 4), and (3, 5). The object layer colored grids at locations (3, 3), (3, 4), and (3, 5) contain object category and other related information of detected and recognized objects.

Place layer map 3407 contains place information and is associated with the location of places such as a restroom, food court, shopping area, etc. In some embodiments, a human operator provides place information. In the example shown, place layer map 3407 contains place layer colored grids at each of the grid locations bounded by the corners (1, 1) and (4, 6).

Final semantic location map 3409 contains information from 2D/3D map 3401, tag layer map 3403, object layer map 3405, and place layer map 3407. An information fusion module determines an object category based on the information of tag layer map 3403 and object layer map 3405. Final semantic location map 3409 further includes a confidence value (not shown). Grid areas where both tag layer map 3403 and object layer map 3405 have the same object category are assigned a high confidence value. For example, the location (3, 3) has a high confidence value. In contrast, the locations (3, 4) and (3, 5) have lower confidence values than location (3, 3) since tag layer map 3403 and object layer map 3405 have inconsistent values at those locations.

FIG. 35 is diagram illustrating several embodiments of a costmap used for path planning. In various embodiments, the costmaps 3501, 3503, and 3505 are costmaps used by a path planning module such as path planning module 2711 of FIG. 27. In the example shown, costmap 3501 depicts a path with the shortest distance from a robot's position to the goal position. Costmap 3501 contains no negative or positive weight values to influence path finding from deviating from the shortest path. In costmap 3501, the location (2, 2) is the robot position and the location (7, 7) is the goal position. The line connecting locations (2, 2) and (7, 7) is the shortest path.

In contrast, costmap 3503 depicts negative weight values, for example, to indicate walls (or other obstacles). The path found for costmap 3503 takes a longer path than the path of costmap 3501 to avoid locations with negative weight values (i.e., the locations representing walls) to reach the goal position from the robot location. Costmap 3503 contains negative weight values at locations (4, 4) and (4, 5). The path of costmap 3503 avoids the negative weight values and connects the robot position to the goal position.

As another example, costmap 3505 shows both negative and positive weight values. Costmap 3505 contains positive weight values at locations (2, 6), (3, 6), (4, 6), (2, 7), (3, 7), (4, 7), (2, 8), (3, 8), and (4, 8). The positive weight values indicate locations near objects that are complementary to the product at the goal position. In various embodiments, the locations of objects (such as complementary objects) are not assigned positive weight values to prevent creating a path that collides with an object. Similar to costmap 3503, costmap 3505 contains negative weight values at locations (4, 4) and (4, 5). The optimal path of costmap 3505 is the path that passes through a subset of locations with positive weight values (i.e., locations associated with or near objects that are complementary to the product at the goal position) while also avoiding locations with negative weight values.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    analyzing a plurality of images captured using a camera included in a robotic system;
    generating a spatial map using a sensor included in the robotic system;
    generating a semantic location map using at least the analyzed plurality of captured images and the generated spatial map;
    receiving a natural language input and a product photo input from a user referencing a desired product item;
    recognizing a speech recognition result from the natural language input;
    sending the speech recognition result to a reasoning engine, wherein the reasoning engine includes an adaptive interactive cognitive reasoning engine utilizing an artificial intelligence memory data structure that includes a robotic system part and a user part, and the artificial intelligence memory data structure is configured to store information associated with a conversation history and one or more cases for cased based reasoning;
    receiving one or more commands for the robotic system from the reasoning engine in response to sending the recognized speech recognition result;
    performing the received one or more commands, including by performing an object recognition of the product photo input at the robotic system in response to the one or more commands from the reasoning engine of a remote system; and
    providing a feedback to the user based on at least one of the one or more commands.

2. The method of claim 1, wherein analyzing the plurality of images captured using the camera includes determining a tag recognition result on the plurality of captured images.

3. The method of claim 2, wherein determining the tag recognition result includes outputting a tag layer including product information associated with a recognized tag.

4. The method of claim 1, wherein analyzing the plurality of images captured using the camera includes determining an object recognition result using the plurality of captured images.

5. The method of claim 4, wherein determining the object recognition result includes outputting an object layer containing product information associated with a recognized object.

6. The method of claim 1, wherein generating the semantic location map includes using a place layer.

7. The method of claim 6, wherein the place layer is curated using an input by a human operator.

8. The method of claim 6, wherein the place layer identifies a location of a restroom, a food court, a rest area, a cashier, a changing room, an exit, an elevator, or an escalator.

9. The method of claim 6, wherein generating the semantic location map includes performing a layer composition using the generated spatial map, a tag layer, an object layer, and the place layer.

10. The method of claim 1, wherein the semantic location map includes product information and navigational information.

11. The method of claim 1, wherein a costmap is created based on the desired product item.

12. The method of claim 11, wherein the costmap includes cost values corresponding to complementary objects of the desired product item.

13. The method of claim 1, wherein the sensor includes a lidar sensor.

14. The method of claim 1, wherein the feedback to the user is generated using natural language generation.

15. The method of claim 1, wherein the user is recognized using face recognition.

16. The method of claim 1, wherein the reasoning engine is located on a remote computer server accessible via a network connection.

17. The method of claim 1, wherein at least one of the one or more commands is used to control a motor to navigate the robotic system to a location of the desired product item.

18. A method, comprising:
    receiving a natural language input and a product photo input from a user referencing a desired product item;
    recognizing a speech recognition result from the natural language input;
    sending the speech recognition result to a reasoning engine, wherein the reasoning engine includes an adaptive interactive cognitive reasoning engine utilizing an artificial intelligence memory data structure that includes a robotic system part and a user part, and the artificial intelligence memory data structure is configured to store information associated with a conversation history and one or more cases for cased based reasoning;
    receiving one or more commands for a robotic system from the reasoning engine in response to sending the recognized speech recognition result;
    performing an object recognition of the product photo input at the robotic system in response to the one or more commands from the reasoning engine of a remote system;
    receiving a path to a location of the desired product item, wherein the path is determined using a mapping that maps physical regions to weight values and at least a portion of the weight values is associated with objects complementary to the desired product item; and
    providing to the user a notice of an intent to provide a guidance to the location of the desired product item.

19. A robotic system, comprising:
    a processor;
    a motorized base;

a lidar sensor;
a camera sensor;
a microphone;
a display;
a network interface; and
a memory coupled with the processor, wherein the memory is configured to provide the processor with instructions which when executed cause the processor to:
analyze a plurality of images captured using the camera sensor;
generate a spatial map using the lidar sensor;
generate a semantic location map using at least the analyzed plurality of captured images and the generated spatial map;
receive a natural language input via the microphone and a product photo input from a user referencing a desired product item;
recognize a speech recognition result from the natural language input;
send via the network interface the speech recognition result to a reasoning engine, wherein the reasoning engine includes an adaptive interactive cognitive reasoning engine utilizing an artificial intelligence memory data structure that includes a robotic system part and a user part, and the artificial intelligence memory data structure is configured to store information associated with a conversation history and one or more cases for cased based reasoning;
receive via the network interface one or more commands from the reasoning engine in response to sending the recognized speech recognition result;
perform the received one or more commands, including by being configured to perform an object recognition of the product photo input at the robot system in response to the one or more commands from the reasoning engine of a remote system; and
provide a feedback to the user based on at least one of the one or more commands.

20. The robotic system of claim 19, wherein at least one of the one or more commands is used to control a motor to navigate the robotic system to a location of the desired product item.

* * * * *

UNITED STATES PATENT AND TRADEMARK OFFICE
CERTIFICATE OF CORRECTION

| | |
|---|---|
| PATENT NO. | : 11,151,992 B2 |
| APPLICATION NO. | : 16/227474 |
| DATED | : October 19, 2021 |
| INVENTOR(S) | : Run Cui et al. |

It is certified that error appears in the above-identified patent and that said Letters Patent is hereby corrected as shown below:

On the Title Page

Item (73), assignee, address, after "AIBrain Corporation", insert --, Seoul (KR)--.

Signed and Sealed this
Eleventh Day of October, 2022

Katherine Kelly Vidal
*Director of the United States Patent and Trademark Office*